United States Patent [19]

Stothers

[11] Patent Number: 4,770,683
[45] Date of Patent: Sep. 13, 1988

[54] DISTILLATION PROCESS WITH HIGH THERMO-DYNAMIC EFFICIENCIES

[76] Inventor: William R. Stothers, 48 Woodbrook Road, S., Calgary, Alberta, Canada, T2W 4M6

[21] Appl. No.: 892,239

[22] Filed: Aug. 4, 1986

Related U.S. Application Data

[63] Continuation-in-part of Ser. No. 727,765, Apr. 26, 1985, abandoned.

[51] Int. Cl.[4] .................................................. F25J 3/02
[52] U.S. Cl. ........................................ 62/25; 62/28; 62/41
[58] Field of Search .................................. 62/23–34, 62/36, 41–44

[56] References Cited

U.S. PATENT DOCUMENTS

| 4,157,904 | 6/1979 | Campbell et al. | 62/27 |
| 4,217,759 | 8/1980 | Shenoy | 62/23 X |
| 4,352,685 | 10/1982 | Swallow | 62/28 |
| 4,421,535 | 12/1983 | Mehra | 62/23 X |

FOREIGN PATENT DOCUMENTS

| 1091572 | 12/1980 | Canada . | |
| 90469 | 10/1963 | European Pat. Off. | 62/28 |
| 2702424 | 7/1977 | Fed. Rep. of Germany | 62/28 |
| 1539604 | 1/1979 | United Kingdom | 62/28 |
| 2102930 | 2/1983 | United Kingdom | 62/28 |

Primary Examiner—Steven E. Warner
Attorney, Agent, or Firm—Adrian D. Battison; Stanley G. Ade

[57] ABSTRACT

A process for distillation of two materials of differing boiling points particularly propane, ethane or carbon dioxide from natural gas is described in which the conventional distillation tower is divided into a first tower (102) at higher pressure than a conventional tower and a second tower (104) at lower pressure. Liquid drawn from the first is expanded to the lower pressure through two or more stages (111,112) with cool extracted (65,62) at each stage and used to cool (65,62) gas (51) withdrawn from the top of the first tower to keep the top tray at a required temperature. Gas (19) withdrawn from the second tower (104) is compressed and cooled for return to the first tower as a reflux. The use of the cool from the expanded liquid and the use of the two towers provides an improved thermo-dynamic efficiency and avoids the use of costly turbo-expanders.

8 Claims, 5 Drawing Sheets

TWO TOWER PROCESS

THREE TOWER PROCESS

CO₂ RECOVERY FROM NATURAL GAS

DISTILLATION PROCESS WITH HIGH THERMO-DYNAMIC EFFICIENCIES

This application is a continuaion-in-part of Ser. No. 06/727,765, filed 4-26-85 now abandoned.

CBACKGROUND OF THE INVENTION

This invention relates to a distillation process for the separation of close boiling point materials. Such a process is used in the extraction of various materials generally using a distillation tower and examples of such separations are:

(1) recovering ethane from nature gas;
(2) recovering propane from natural gas;
(3) recovering carbon dioxide from natural gas;
(4) recovering helium from natural gas;
(5) rejecting nitrogen from natural gas;
(6) separating ethane/ethylene;
(7) separating propane/propylene;
(8) separating normal butane/iso-butane;
(9) separating tritium/deuterium/light water;
(10) separating ethyl benzene/styrene;
(11) separating benzene/toluene/xylene.

The use of turbo-expanders has become popular in the last fifteen years for obtaining high recoveries of propane and ethane from natural gas. Early turbo-expander process designs resulted in ethane recoveries of 60% to 80% and propane recoveries of 90% to 98%. In 1978 and 1979 patents were filed by Morgan (Canadian Pat. No. 1,091,572) and Campbell et al (U.S. Pat. No. 4,157,904) which sub-cooled the high pressure low temperature flash liquid and then fed this liquid to the top of the demethanizer. These patents obtained 91% to 92.5% ethane recovery and 98% to 98.4% propane recovery.

Generally the natural gas is "sweetened" to remove sulphur compounds and carbon dioxide and then dehydrated using a molecular sieve adsorption system prior to feed to the turbo-expander plant. The supply gas is then cooled and chilled in the heat exchanger train which can include a gas/gas exchanger in which the residue gas is re-heated, a gas liquid exchanger which recovers "cool" from the demethanizer bottom product, a chiller using a propane refrigeration system and a demethanizer side re-boiler.

The chilled sweet gas is flashed in a high pressure low temperature flash vessel. Vapor from the vessel is expanded through a turbo-expander from which energy is taken to drive a compressor normally used to recompress the residue gas. Process gas leaving the turbo-expander enters a quench-fed demethanizer. Such processes normally achieve ethane recoveries between 60% and 80% and propane recoveries between 90% and 98%.

In the improvement of Campbell et al, liquid from the flash vessel at a temperature near its critical temperature is sub-cooled and introduced into the top of the demethanizer. The gas stream leaving the turbo-expander enters the demethanizer near the bottom. This process results in an improvement in ethane recoveries to approximately 92.5%. However, it operates at low thermodynamic efficiency and requires the use of turbo-expanders which have been found to be complex and expensive to maintain.

SUMMARY OF THE INVENTION

It is one object of the present invention, therefore, to provide an improved distillation process which obtains as good or better separation recoveries but with an improved thermodynamic efficiency and in many cases reduced equipment cost.

According to a first aspect of the invention, therefore, there is provided a method for separating a supply material into two materials of different boiling points comprising feeding supply material to vessel means arranged to form a mixed gas and liquid phase such that one material separates into said liquid phase in said vessel means and the other material separates into said gas phase, said liquid phase including no higher proportion of said other material than a required purity proportion and extracting said materials from said vessel means, characterized in the steps of providing said vessel means as two separate vessels, arranging said supply and said vessels such that the pressure in one of said vessels is higher than the other, transferring material from said liquid phase from said higher pressure vessel to the other vessel, said liquid phase having a proportion of said other material higher than said required purity proportion, and letting said liquid phase down in pressure as it is transferred so as to convert some of said liquid phase to said gas phase and causing cooling thereof.

According to a second aspect of the invention there is provided a method of separating a supply material into two materials at different boiling points comprising feeding supply material to vessel means arranged to form a mixed gas and liquid phase within said vessel means, exchanging said gas and liquid phases such that one material separates into said liquid phase in said vessel means and the other material separates into said gas phase, said liquid phase including no higher proportion of said other material than a required purity proportion, and extracting said materials from said vessel means, characterized in that liquid phase material to be separated is reduced in pressure to cause cooling thereof and cool is transferred therefrom to material at a top end of said vessel means to cool material prior to introduction into a top end of said vessel means to maintain said top end at a required temperature.

Improved efficiency can be obtained therefore by using a liquid in the process preferably that passing between a first portion of the distillation tower and the second low pressure portion of the distillation tower, letting that liquid down in pressure so as to obtain high cooling of the liquid and gas content and extracting that cool for cooling the top end of the distillation tower. The gas at low pressure can be re-compressed for returning to the high pressure portion of the distillation tower.

This technique can enable a significant reduction in power necessary for compression and for cooling and can in some circumstances avoid the use of turbo-expanders which, as explained before, have been found to have a high equipment cost.

The splitting of the distillation tower into a high pressure portion and a low pressure portion enables the high pressure portion to be operated at a much higher pressure than normal thus reducing the amount of re-compression required for ethane and propane recovery from natural gas. In addition the warmer operating temperatures at the high pressure also reduce the possibility of carbon dioxide freezing on the trays which is often a problem in ethane recovery processes. The higher operating temperature also eases the requirement for the refrigerant for the over-head condenser.

The low pressure portion can operate at a much lower pressure than conventional towers thus obtaining a much better separation of the desired products and allowing a much lower re-boiler temperature so that often the re-boiler heat duty can be used to assist in refrigerating the feed.

The high pressure cold separator can be operated above the critical pressure so that the feed gas is now a single phase. This fluid can be expanded using a let down turbine for optimum refrigeration and recovery of energy. In conventional processes this fluid must first be expanded across a valve to a pressure less than the critical pressure where it can be flashed and the vapor is then expanded using a turbo-expander. The conventional process loses the energy that could have been recovered when flashing from the high pressure to that pressure below the critical pressure.

The re-cycled vapor from the low pressure tower can often be totally condensed to provide a very valuable reflux to assist the separation in the high pressure tower.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 3 has more equipment than FIG. 2 but can achieve a higher recovery with less power demand and is more economical for large plants.

DETAILED DESCRIPTION

Figure 1:
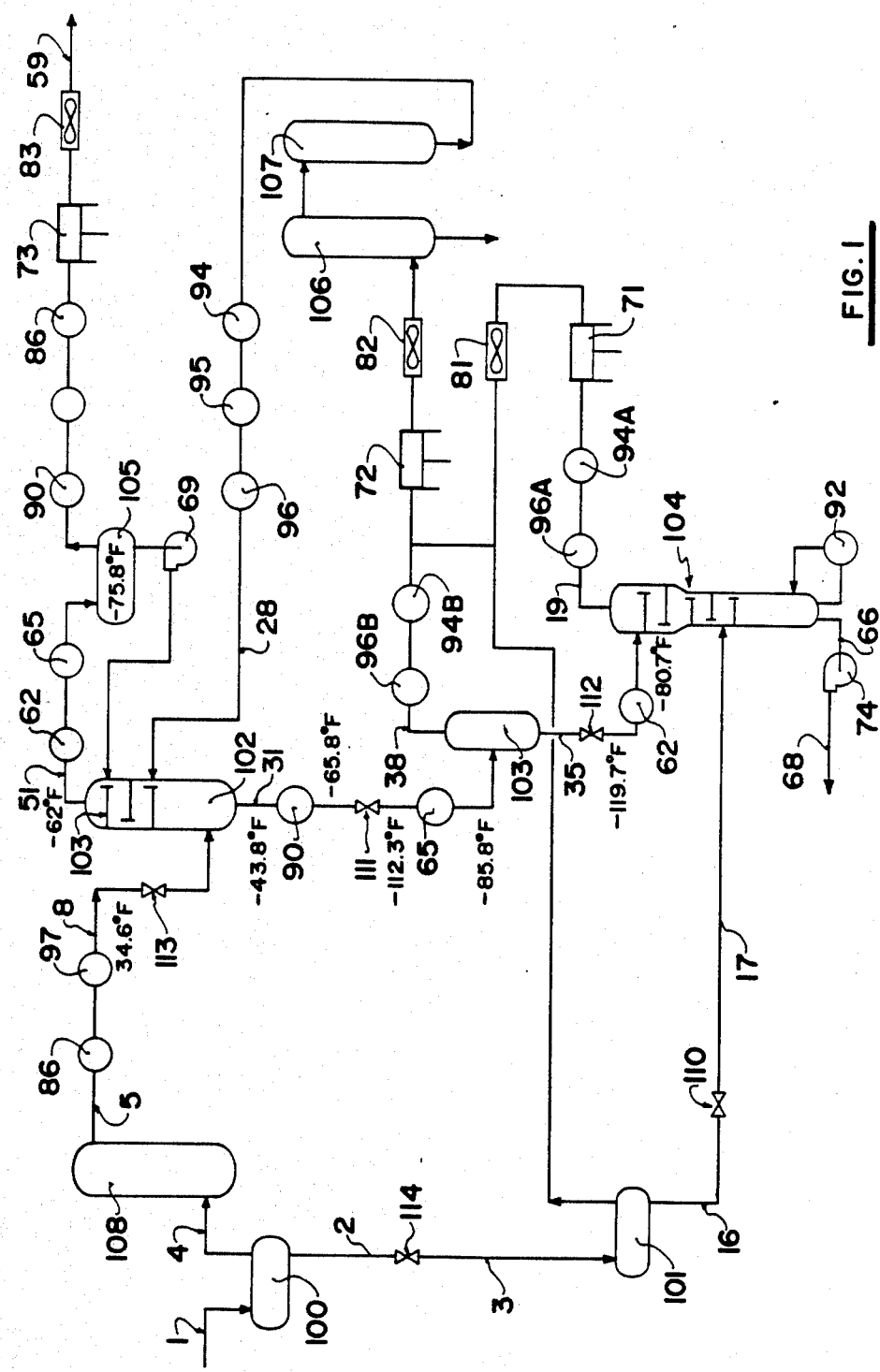
FIG. 1 is a schematic layout according to the invention showing a system suitable for propane or ethane recovery.

The method shown in FIG. 1 is specifically designed for the separation of propane from natural gas. However, it will be appreciated that minor modification of the method can be made as described hereinafter and within the knowledge of a man skilled in the art for the separation of ethane or for other materials as stated above.

Natural gas enters the system on a feed line 1 and is introduced into an inlet plant separator 100 which removes heavy hydro-carbons in the condensed liquid phase. The liquid phase passes via a path to be described in detail hereinafter to a central area of a low pressure distillation tower 104. The gas phase from the vessel 100 passes via a path to be described hereinafter to a high pressure distillation tower 102.

The towers 102 and 104 operate together to form a distillation tower system so that recovered propane and higher boiling point materials are obtained on the line 68 from the bottom of the lower tower and residue gas is obtained on the line 59 from the top of the upper or high pressure tower 102.

The liquids from the vessel 100 are passed along a line 2 through a let down valve 114 to a flash vessel 101 from which the liquid phase which may include asphaltenes on the line 16 are passed to a central area through a let down valve 110 and line 17 to the lower tower 104.

Flash vapor from the vessel 100 leaves via stream 4 and is dehydrated in a molecular sieve dehydrator 108 of conventional form. Vapor from the dehydrator passes along a line 5 through a heat exchanger indicated at 86.

For convenience of illustration heat exchangers are shown as a single circle on the supply line with the corresponding portion of the heat exchanger shown on a separate part of the system and using the same reference numeral. Thus heat exchanger 86 has as its counterpart portion a heat exchanger on the line 59 immediately up stream of a compressor 73 and air cooler 83. Similar heat exchanger systems are shown in the drawing and will be described in more detail hereinafter.

For convenience of explanation and study, various temperature examples are shown on the drawings indicating the temperature of the stream at a particular point in the system while these temperature may not be referred to specifically in this description.

Stream 5 is cooled in the heat exchanger 86 and in a propane refrigerant exchanger 97. The propane refrigerant pressure on exchanger 97 is controlled to maintain the proper bottom product temperature for a stream 31 leaving the bottom of the high pressure tower 102 much in the same way that heat to a re-boiler is controlled to maintain a bottom product or bottom tray temperature in a conventional column.

Stream 8 leaving the exchanger 97 expands across a valve 113 to reduce the pressure from the supply pressure to the order of 750 PSIA. The expanded stream enters the high pressure tower 102 including a plurality of trays schematically indicated at 103. The trays are of a conventional form and act to repeatedly contact gases moving upwardly in tower with liquid moving downwardly in the tower to obtain the proper separation of the higher boiling point materials from the lower boiling point materials. The tower 102 in this example can have twelve theoretical trays which is approximately seventeen actual trays.

The bottom product in liquid phase in stream 31 passes to a heat exchanger 90 which acts as a sub-cooler and takes cool from the corresponding portion 90 shown on the line 59. The stream is then expanded through a valve 111 to a pressure of the order of 216 PSIA thus reducing the temperature significantly as shown. The stream then passes through a further heat exchanger 65 which has as its counter part heat exchanger 65 on a line 51 carrying gas from the top of the lower 102.

The material balance and process conditions at the inlet to and exit from the tower 102 together with the other points in the process are set out in detail in a table hereinafter.

The cooled product in the stream 31 is thus heated by the exchanger 65 and acts at the same time to significantly cool the gas in the stream 51 from the top of the tower 102, as shown by the indicated temperature values. This transfer of cool provides the improved thermodynamic efficiency since the cool obtained from the expanded liquid is directly used to cool the gas phase at the top of the tower 102 to obtain the necessary low temperature at the top of the tower 102 as will be described in more detail hereinafter.

The stream 31 is then introduced into an economizer/separator 103 in the form of a flash vessel. Liquid from the vessel 103 passes along a line 35 through a further let down valve 112 and a further heat exchanger 62 into the top of the lower tower 104. The counter part for the exchanger 62 is found again on line 51 so that again the expansion of the liquid as it passes from the upper tower 102 to the lower tower 104 provides a cooling effect which is directly transmitted to the gas at the top of the tower 102.

The pressure within the lower tower 104 is controlled to be of the order of 45 PSIA in this example. Generally, the pressure is arranged to be significantly less than the pressure of a convention distillation tower in a process of this type.

The lower tower 104 includes a number of trays 103 as previously described in relation to the tower 102. In addition the tower 104 includes a re-boiler 92 of conventional form at the bottom of the tower in order to control the bottom temperature. Liquid phase extracted at the bottom of the tower along the line 66 is transmitted by a pump 74 along the line 68.

Gas phase extracted from the top of the tower 104 along a line 19 has cool extracted by exchangers 96A and 94A which have their counterparts on a line 28 and indicated at 94 and 96 respectively. The gas on line 19 is then compressed in a compressor 71, cooled in an aerial cooler 81, further compressed in a compressor 72 and further cooled in a second aerial cooler 82. The product leading to the compressor 72 is supplemented by gas phase on line 30 from the economizer 103 which again has cool extracted by exchangers 96B, 94B.

From the air cooler 26 the product is passed through an amine contactor for removing carbon dioxide indicated at 106 and a dehydrator 107 prior to passing through the exchangers 94 and 96 and introduction into the top tower 102 at a position above the bottom and below the top. In between the exchangers 94 and 96, a propane refrigerant system similar to or common to the exchanger 97 is applied to the line indicated at 95 for further condensing the product into a mixed liquid and gas phase as it is applied to the tower 102.

The product re-introduced to the mid-section of the tower 102 acts as a reflux to assist in the separation in the tower 102.

The vapor stream leaving the tower 102 on line 51, as previously explained in cooled by the exchangers 62, 65 to condense the stream with liquid and gas phases being separated in a vessel 105. From the vessel 105 thegas phase is extracted on the line 59 and passed through the heat exchangers 90, 96, 86 together with the compressor 73 and aerial cooler 83. Liquid from the vesel 105 is pumped by a pump 69 onto the top tray of the tower 102.

It will be noted therefore that the top tower 102 can be operated at a significantly higher pressure than would be used in a conventional than is of the order of tower in a similar process. The pressure of the conventional process and of the present invention can readily be determined by one skilled in the art by simple experimentation. The temperature gradient is controlled by the temperature of the reflux material from the pump 69. A re-boiler can be applied at the bottom if required but in the present example the bottom temperature is controlled by the refrigerant exchanger 97 which controls the temperature of the material introduced into the bottom of the tower 102. The tower in this example also acts as a flash vessel with the mixed phase being introduced at the bottom and the gas passing from that phase through the trays in exchanging relation therewith to provide the proper separation over the proper temperature gradient.

The expansion of the liquid phase from the top tower 102 obtains sufficient cool to condense the gas phase at the top of the top tower to provide the reflux through the pump 62. Thus the top tray of the tower 102 can be controlled at the required temperature.

The let down or expansion valves 111 and 112 are of the Joule-Thompson type which are simple devices having little or no moving parts and thus are inexpensive to obtain and simple to maintain.

The table of material balance and process conditions for one example is as follows:

|  | Stream Number | | | | | |
| --- | --- | --- | --- | --- | --- | --- |
|  | 8 Feed | 31 Internal Refrigerant | 19 Deethanizer Vapor | 28 Recycle Vapor | 59 Residue Gas | 66 Liquid Product |
| Temperature (F.) | −34.6 | −43.8 | −69.9 | −61.7 | 120.0 | 44.8 |
| Pressure (PSIA) | 809 | 752 | 45 | 751 | 1200 | 46 |
| Flowrate (lb mols/h) | 1585.54 | 525.68 | 206.50 | 456.56 | 1515.00 | 114.66 |
| Composition: | | | | | | |
| N2 | .0079 | .0015 | .0002 | .0019 | .0083 | .0000 |
| CO2 | .0221 | .0317 | .0456 | .0000 | .0121 | .0000 |
| Methane | .8395 | .5024 | .2786 | .6120 | .8880 | .0000 |
| Ethane | .0826 | .2862 | .6030 | .3449 | .0909 | .0002 |
| Propane | .0316 | .1263 | .0686 | .0382 | .0008 | .4858 |
| Butane+ | .0463 | .0519 | .0040 | .0030 | 0 | .5140 |

In an alternative arrangement (not shown) the simple valve 113 could be replaced by a flash vessel followed by a let down turbine with the power from the turbine being used to drive a central gas compressor immediately prior to the compressor 73. Such an arrangement ca be used where the supply pressure is considerably in excess of the acceptable pressure of the top tower 102. The top tower 102 cannot have or operate at a pressure higher than the critical pressure for the material concerned.

In a modification used for ethane recovery, the letdown valves 111 and 112 can each be replaced by a plurality of such valves, each followed by an exchanger communicating cool to the line 541. This can be used to avoid the temperature reaching a low level at which the carbon dioxide freezes.

In a further alternative arrangement the material passing through the exchanger 86 on the line 5 can be divided into a second line which carries exchangers cooperating respectively with the re-boiler 92 and with a further chiller on the outlet line 68 from the bottom of the lower tower 104.

Figure 2:
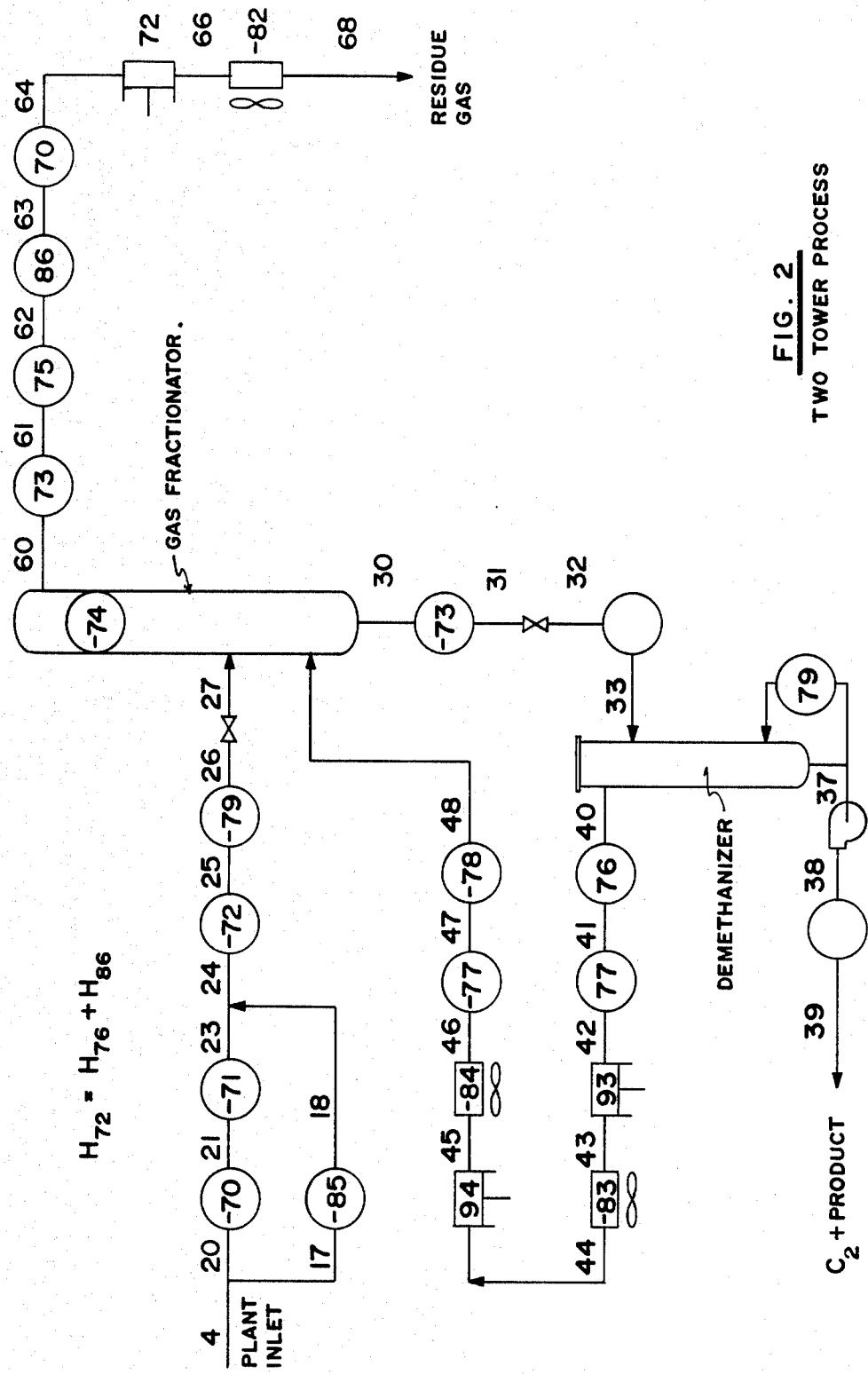
FIG. 2 is a schematic layout according to the invention showing a system suitable for ethane recovery.
Figure 3:
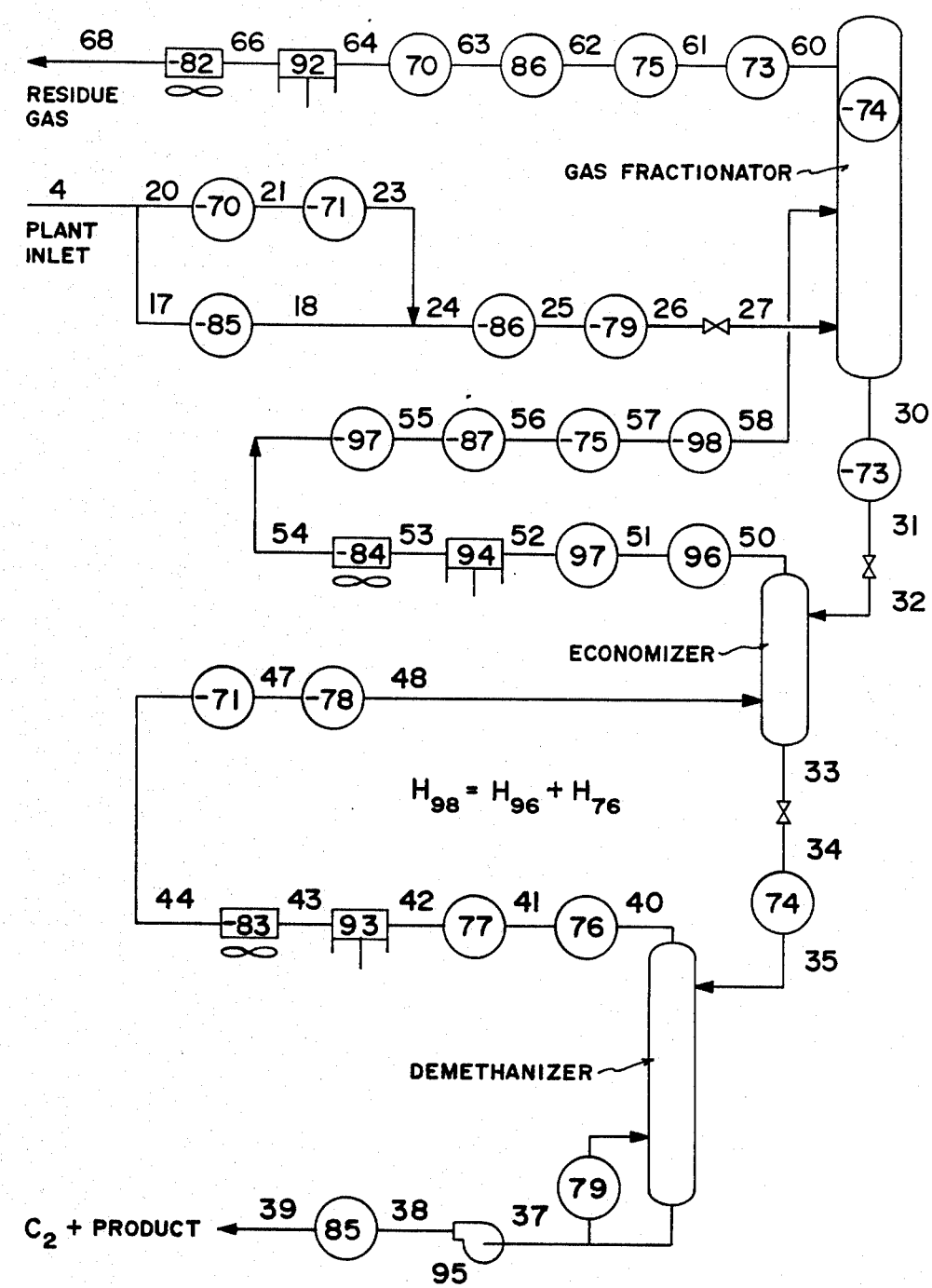
FIG. 3 is a schematic layout according to the invention showing an alternative system suitable for ethane recovery.

Turning now to FIGS. 2 and 3, the conventional turbo-expander process is compared with two methods of this invention as shown in FIGS. 2 and 3.

For convenience of illustration, the heat exchangers in FIGS. 2, 3, 4 and 5 are shown as a single circle on the supply line with the corresponding portion of the heat exchanger shown on a separate part of the system and using the same reference numeral. In some situations, such as Exchanger 72 on FIG. 2, one stream is cooled by two other streams in parallel. This is shown by the equation on FIG. 2: H72=H76+H86. The negative sign with the exchanger number indicates that the stream is being cooled; no sign indicates that the stream is being heated. In the case of compressors, no sign indicates compression, a negative sign indicates a turbo-expander as shown on FIG. 1. Compressor and turbo-expander powers consider an 80% adiabatic efficiency. Pump powers assume a 50% adiabatic efficiency.

The Material Balances for FIGS. 2, 3, 4, and 5 (Tables 10, 16, 23, and 30 respectively) each have a Stream 9, which indicates the error in the computer simulation between the Feed and the sum of the Product Streams. This error is due to the recycle nature of the process. The error can be reduced by continuing the calculation through further iterations or by making "educated" adjustments to the compositions of the recycle streams and repeating the computer simulation.

Tables 3 to 7 and FIG. 1 describe the conditions used for determining Case 1, The Conventional Turbo-Expander Process.

1. Two Tower Process (FIG. 2)

FIG. 2 is a simple form of this invention and should have a cost roughly comparable to the conventional process on plants having a capacity greater than 2,000,000 m3API/d. On smaller plants, where the cost of the turbo-expander is disproportionate, the invention will cost less since no turbo-expander is required. It is thus now possible to economically obtain high recoveries in small plants. Turbo-expanders and liquid expansion turbines can be used in the processes of this patent and are probably economical in capacities over 3,000,000 m3API/d.

Table 8 shows the temperature, pressure, and other stream properties for the process shown on FIG. 2 and the design basis shown on Table 2. Table 9 shows the duties for the heat exchangers and the power required for the pumps and compressors shown on FIG. 2. Table 10 shows the process material balance. Table 11 shows the major stream compositions. Table 12 shows the column temperature, pressure, and other property profiles for the gas fractionator shown on FIG. 2. Table 13 shows the column temperature, pressure, and other property profiles for the demethanizer shown on FIG. 2.

Examining the tables listed above and FIG. 2, it is seen that the dehydrated sweet gas inlet, Stream 4, is split into Stream 17 and Stream 20. Stream 17 is cooled in Exchanger 85 which derives its cool from the C2+ Product, Stream 38. Stream 20 is cooled in Exchanger 70 with Residue Gas, Stream 63, then chilled with Chiller 71 which derives its cool from a refrigeration system. The above two streams are then recombined in Stream 24 which is cooled in Exchanger 72 which derives its cool from two sources, Exchanger 76 which derives its cool from the Cold Recycle Gas, Stream 40, and Exchanger 86 which derives its cool from the Residue Gas, Stream 62. Finally, the gas is partially condensed in the Demethanizer Reboiler, Exchanger 79. The fluid is then flashed from 6120 kPa a to 3585 kPa a resulting in the fluid being approximately 35% liquid at the inlet to the Gas Fractionator.

There is no need for a reboiler on the Gas Fractionator because it is stripped with recycle vapor. The temperature of the recycle vapor is controlled by controlling the refrigerant pressure in the Recycle Chiller, Exchanger 78. Thus if there is too much vapor in Stream 40 for the Recycle Compressor 93, the temperature of recycle vapour, Stream 48 is raised by reducing the refrigeration transferred in the Recycle Chiller, Exchanger 78.

The liquid leaving the Gas Fractionator, Stream 30, is subcooled using the Gas Fractionator Overhead, Stream 60, in Exchanger 73. This liquid is then flashed into the shell side of the Gas Fractionator Condenser, Exchanger 74. The flashing liquid provides cool to the condenser then the flashing liquid enters the Demethanizer. The C2+ product specification is controlled by the Demethanizer Reboiler, Exchanger 79, in the conventional manner.

The recycle vapour leaving the Demethanizer, Stream 40, is heated in two exchangers 76 and 77 then compressed in a two stage compressor. The recycle vapour is then cooled in the Compressor Aftercooler, Exchanger 84 and the Recycle Warm Gas/Gas Exchanger 77, then chilled in the Recycle Chiller, Exchanger 78.

Exchanger 75 has its duty set at 0 because it is not required for the present configuration for ethane recovery. However, it is used in the propane recovery configuration to partially condense the Recycle Gas Stream 48. Other changes are made for propane recovery; the partially condensed recycle stream enters the middle of the Gas Fractionator and the Raw Gas Feed, Stream 27, enters the bottom of the Gas Fractionator. The process control for the gas fractionator is then achieved by varying the refrigerant pressure on the Feed Chiller, Exchanger 71, rather than the Recycle Chiller, Exchanger 78. In the propane recovery situation, the Deethanizer Reboiler, Exchanger 79, is located on Stream 18 following Exchanger 85 rather than on Stream 25 following the Cold Gas/Gas Exchanger 72. Propane recoveries of 98 to 99% can be achieved for this configuration for comparable capital costs and energy requirement as for the conventional process shown on FIG. 1.

2. FIG. 3 THREE TOWER PROCESS

Tables 14 to 20 describe the Three Tower Process of this invention shown on FIG. 3 in a similar fashion to the description of FIG. 2. In the Three Tower Process the separation is improved with a reduction in energy requirement as shown in Table 1. This process will be preferred to that of FIG. 2 for larger plants where the saving in power requirement and the increased recovery make its larger capital expenditure more economical. Note that for very large plants the reduced expense for compression may result in less capital cost for FIG. 3 type designs' than FIG. 2 type designs'. For very large plants a 4 tower process with an economizer tower between each stage may be desirable.

A variation of this process, can add a separator to Stream 48, and remove a portion of the liquid taken from this separator as ethane product. Stream 37 then becomes C3+ Product and the former demethanizer is operated as a deethananizer. The temperature of the Deethanizer Reboiler, Exchanger 79, now is too high to cool Stream 25 and must be located on Stream 18. The advantage of this variation is that ethane product can be produced with fewer pieces of equipment and probably less energy requirement. The disadvantage is that ethane recovery is reduced and some sacrifice in the quality of the ethane product may result.

The chilling train for the raw gas and the cool recovery from the residue gas for the FIG. 3 process is similar to FIG. 2. The Gas Fractionator liquid product is subcooled in Exchanger 73 in similar fashion. The subcooled liquid is flashed into the Economizer Tower which provides a few stages of distillation and also acts in a similar fashion to an economizer in a conventional refrigeration system. This tower heightens the concept of achieving separation while obtaining refrigeration.

Since the vapor leaving the Economizer, Stream 50, is leaner than the feed, Stream 4, it is preferable to give it priority for low temperature chilling and inject it into a higher tray in the Gas Fractionator. Following the Lean Recycle Gas on FIG. 3, Stream 53 leaves the Compressor 94, is cooled in the Lean Gas Aerial Cooler 84, then cooled in the Lean Warm Gas/Gas Exchanger 97. The Lean Recycle Gas, Stream 55, is then chilled in Exchanger 87 using a conventional refrigeration system. The Chilled Lean Recycle Gas, Stream 56 is then partially condensed using Residue Gas in Exchanger 75 and then further condensed in Exchanger 98 using Rich Recycle Gas (Exchanger 76) and Lean Recycle Gas (Exchanger 96).

The Rich Recycle Gas, Stream 40, is compressed, cooled, and temperature controlled in the same manner as the Recycle Stream in FIG. 2. Also, the Feed Chiller, Exchanger 71, is temperature controlled to maintain the proper amount of lean recycle gas.

3. FIG. 4 PROCESSING NATURAL GAS WITH ASPHALTENES

Asphaltenes are heavy naphthenic molecules that must be removed before the molecular sieve dehydrator. A dry gas filter is traditionally placed in front of the dehydrator for this purpose. Some natural gas streams contain too many asphaltenes for them to be practically removed by a filter alone. The process shown on FIG. 4 recovers practically all of the asphaltenes with the Low Temperature Separator and Stabilizer prior to the Dry Gas Filter and Molecular Sieve Dehydrator. Another advantage of this system, is that the bulk of the C5+ Product is recovered by the Stabilizer as stabilized condensate; thus LPG Product is produced by the deethanizer in Stream 37. Other advantages of this system are that the Deethanizer Reboiler, Exchanger 79, operates at a lower temperature and that the Gas Fractionator Condenser, Exchanger 74, requires less methane recycle to obtain the desired amount of chilling.

Figure 4:
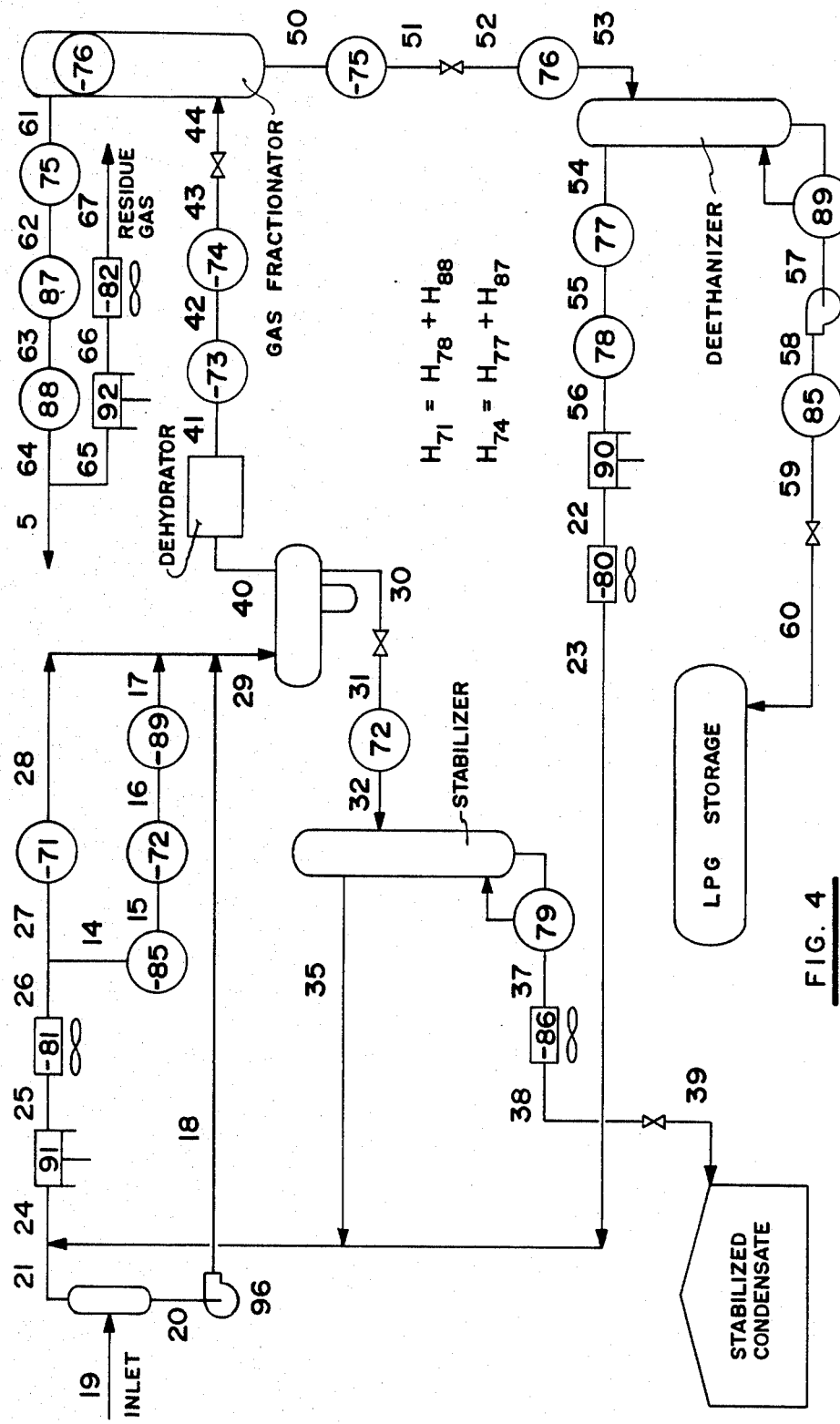
FIG. 4 is schematic layout according to the invention showing a system suitable for ethane or propane recovery from natural gas containing asphaltenes.

Following FIG. 4, Plant Inlet Gas, Stream 19, enters the Inlet Separator at 1140 kPa a. Liquid from this separator, Stream 20, is pumped into the Low Temperature Separator. Vapour from the Inlet Separator joins the Stabilizer Overhead, Stream 35, and the compressed Deethanizer Overhead, Stream 23, and is compressed in Compressor 91 to 3985 kPa a. Stream 25 is cooled with the Aftercooler 81, and then with the cooling train. As in other cryogenic processes, the raw gas stream is split into two streams, Streams 27 and Stream 14. Stream 27 is cooled with the Warm Gas/Gas Exchanger 71 which recovers its cool from the Cool Deethanizer Overhead, Stream 55, in Exchanger 78, and from the Cool Residue Gas, Stream 63, in Exchanger 88.

The other raw gas stream, Stream 14, is cooled with LPG Product Stream 58, in Exchanger 85; further cooled with Low Temperature Liquid, Stream 31, in Exchanger 72; and finally cooled with the Deethanizer Reboiler, Exchanger 89. The two raw gas streams then recombine and enter the Low Temperature Separator at −8.7° C.

If the inlet stream has not been suitably dehydrated, then the conventional process is to spray a solution containing 80% ethylene glycol/water on to the inlet tube sheets of the heat Exchangers mentioned above to prevent hydrate formation. The ethylene glycol/water solution is removed from the Low Temperature Separator and regenerated in the conventional manner.

The Material Balance, Table 23, shows that 99% of the C6+ (n-octane and heavier components) are removed in the Low Temperature Separator and recovered in the stablized condensate in the Stabilizer. Asphaltenes are very much less volatile than n-octane, so essentially all of them are recovered prior to the Dry Gas Filter which is part of the Dehydration Package following Stream 40.

The remainder of the process follows the same principles as described in FIG. 2. Stream 41, leaving the Dehydration Package, is chilled in Exchanger 73 using a conventional refrigeration system. It is partially condensed in Exchanger 74 which derives its cool from Cold Residue Gas, Stream 62, in Exchanger 87, and from Cold Lean Recycle Gas, Stream 54, in Exchanger 77. It is then flashed into the Gas Fractionator.

Liquid from the Gas Fractionator, Stream 50, is subcooled in Exchanger 75 using the Gas Fractionator Overhead, Stream 61. The liquid is then flashed into the Gas Fractionator Condenser, Exchanger 76 before entering the Deethanizer.

LPG and Condensate Product specifications are met in the conventional manner by controlling the tower bottom temperatures with their reboilers, Exchangers 89 and 79 respectively. Exchanger 89 has a temperature controlled bypass between Streams 16 and 17. Exchanger 79 is supplied with a temperature-controlled flow of heating medium.

The Deethanizer Overhead is heated in Exchangers 77 and 78 as previously discussed, then compressed in Compressor 90 with Aftercooler 80.

4. Carbon Dioxide Solid Formation

The ethane recovery processes discussed above were much more resistant to $CO_2$ solid formation than the conventional processes because of their higher operating temperatures and the fact that solids would form at the outlet of expansion valves rather on the distillation trays. These expansion valves can be located very near the heat exchanger or vessel following them. In this manner the freezing gas is immediately warmed or diluted so that the freezing problem is reduced. The freezing problem can be further reduced by using two or more expansion valves with heat exchangers between them rather than one valve. In this manner, natural gas streams with high $CO_2$ contents can be processed for ethane recovery without solid formation problems. Traditionally, $CO_2$ contents above 2% were virtually impossible to treat and the content was preferable less than 1%. The new technology is so adept at handling CO2 that this technology can be used to recover CO2 from natural gas.

5. Carbon Dioxide Recovery from Natural Gas (FIG. 5)

Figure 5:
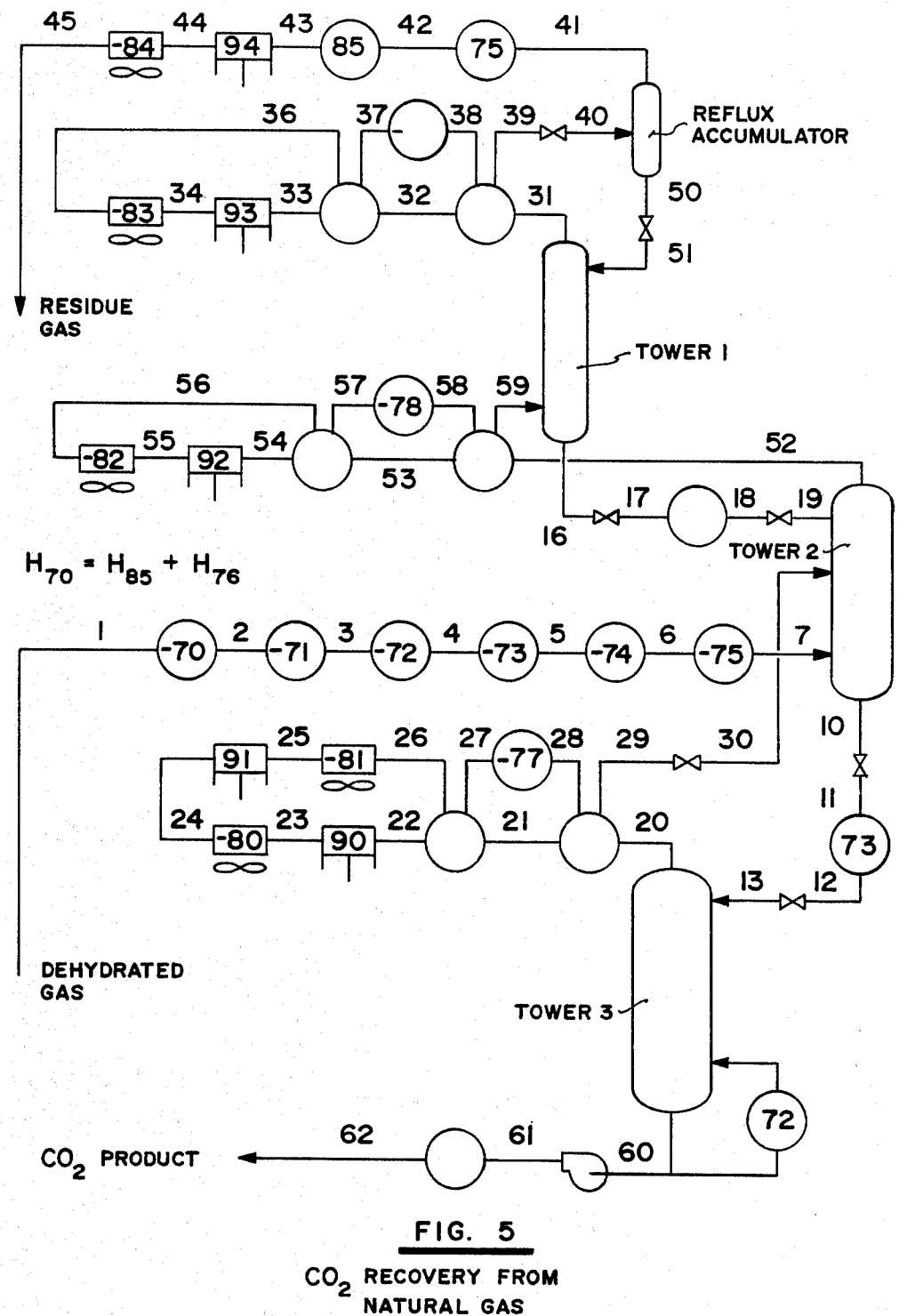
FIG. 5 is a schematic layout according to the invention showing a system suitable for recovering carbon dioxide from natural gas. Such carbon dioxide is often used for miscible flooding to achieve enhanced oil recovery.

FIG. 5 shows one configuration for recovering carbon dioxide from moderately high pressure (2800 kPa a) natural gas. As with propane and ethane recovery, there will be many variations of the process depending upon feed composition and pressure, product values and economics. In fact, this process is much more sensitive to feed composition than the previous processes because the process design must prevent CO2 solid formation.

This process uses the same technology as described in FIGS. 2, 3, and 4. Tables 28 to 35 describe an example of this technology shown on FIG. 5. Following the Inlet Gas, Stream 1, on FIG. 5, is cooled in the Warm Gas Exchanger 70 which derives its cool from the Warm Residue Gas, Stream 42, in Exchanger 85 and the CO2 Product, Stream 61, in Exchanger 76. The feed is then chilled in Exchanger 71 using a conventional refrigeration system. The feed is further cooled using cool from the Reboiler, Exchanger 72, and cool from flashing liquid streams between the towers, Exchangers 73 and 74.

Stream 20, the overhead from the low pressure column, Tower #3, is heat exchanged and compressed with two stages of compression and finally chilled in Exchanger 77 using a conventional refrigeration system. The rich cycle gas is compressed to 6890 kPa a, then flashed to the operating pressure of Tower #2, 2645 kPa a. This results in Stream 30, the rich recycle inlet to Tower #2, having a temperature of −59.5 C. which is very close to its freezing point, −60.6 C. (Table 32). In order to minimize the chance of freezing, the expansion valve between Stream 29 and Stream 30 should be located near Tower #2. The risk for freezing Stream 30 can also be reduced by installing an expansion valve between Stream 59 and Tower #1 and reducing the pressure differential between Streams 29 and 30. Stream 30 will be warmer then and should be injected to a lower tray in Tower #2.

Processing of the Lean Recycle Gas leaving Tower #2 is similar to the other processes above. In order to obtain reflux for Tower #1 while avoiding a reflux problem, it is necessary to compress the Tower #1 overhead as shown. The quality of the residue gas (the amount of CO2 that it contains) is adjusted by adjusting Compressor 93 discharge pressure. Similarly, the amount of Tower #3 overhead vapor is adjusted by adjusting the Compressor 91 discharge pressure. If there were a pressure control valve between Stream 59 and Tower #2, the amount of Tower #2 overhead could be controlled by adjusting the backpressure on that control valve. In the present system, the amount of Tower #2 overhead can be controlled by controlling the amount of refrigeration supplied to Chiller 78. One means of optimizing the operation and obtaining maximum recovery is to control the pressures and refrigeration demands as mentioned above so that the volumes of recycle gas are at plant design and controlling the overhead reflux to produce a specification overhead product. Optimizing the process for a "turn-down situation" (where the plant is processing less than the design volume of inlet gas) will require a consideration of both the process and mechanical design. Similarily, optimizing the operation when treating a feed of different composition to the design composition requires a combined knowledge of the process and the mechanical equipment.

TABLE 3

Conventional Turbo-Expander Process (FIG. 1)
Stream Properties

| Stream | 4 | 22 | 24 | 25 |
|---|---|---|---|---|
| Name | FEED | FEED | FEED | FEED |
| Vapour frac. | 1.0000 | 0.9939 | 0.9669 | 0.9665 |
| Temperature C. | 21.0753 | −14.4720 | −34.2488 | −34.4444 * |
| Pressure Kpa a | 6294.9131 | 6260.4395 | 6225.9658 | 6191.4922 |
| Molar Flow Kgmole/hr | 297.7482 | 297.7482 | 297.7482 | 297.7482 |
| Mass Flow Kg/hr | 5540.7427 | 5540.7427 | 5540.7427 | 5540.7427 |
| Volume Flow M3/hr | 16.7591 | 16.7591 | 16.7591 | 16.7591 |
| Enthalpy KJ/hr | 2.59635E+06 | 2.03601E+06 | 1.64025E+06 | 1.64023E+06 |

| Stream | 26 | 30 | 31 | 32 |
|---|---|---|---|---|
| Name | FEED | LOW TEMP LIQ | LOW TEMP LIQ | LOW TEMP LIQ |
| Vapour frac. | 0.8033 | 0.0000 | 0.5186 | 0.8916 |
| Temperature C. | −57.5729 | −57.5729 | −99.5431 | −33.0278 * |
| Pressure Kpa a | 6157.0186 | 6157.0186 | 1413.4252 * | 1378.9514 |
| Molar Flow Kgmole/hr | 297.7482 | 58.5608 | 58.5608 | 58.5608 |
| Mass Flow Kg/hr | 5540.7427 | 1347.5385 | 1347.5385 | 1347.5385 |
| Volume Flow M3/hr | 16.7591 | 3.6474 | 3.6474 | 3.6474 |
| Enthalpy KJ/hr | 949612.3125 | −37556.4492 | −37556.4492 | 358203.8438 |

| Stream | 37 | 60 | 61 | 62 |
|---|---|---|---|---|
| Name | C2+ PRODUCT | LOW TEMP VAP | EXPANDER OUT | RESIDUE GAS |
| Vapour frac. | 0.0000 | 1.0000 | 0.8129 | 1.0000 |
| Temperature C. | −3.0858 * | −57.5729 | −109.2679 | −106.2850 * |
| Pressure Kpa a | 1399.6356 * | 6157.0186 | 1378.9514 * | 1378.9514 * |
| Molar Flow Kgmole/hr | 24.1077 * | 239.1874 | 239.1874 | 273.6406 * |
| Mass Flow Kg/hr | 966.0270 | 4193.2041 | 4193.2041 | 4574.7158 |
| Volume Flow M3/hr | 2.1285 | 13.1117 | 13.1117 | 14.6307 |
| Enthalpy KJ/hr | −73117.6094 | 987170.0625 | 736226.0625 | 1.32713E+06 |

| Stream | 63 | 64 | 65 | 66 |
|---|---|---|---|---|
| Name | RESIDUE GAS | RESIDUE GAS | RESIDUE GAS | RESIDUE GAS |
| Vapour frac. | 1.0000 | 1.0000 | 1.0000 | 1.0000 |
| Temperature C. | −40.0000 * | 15.5556 * | 42.0263 | 196.1051 |
| Pressure Kpa a | 1344.4777 | 1310.0039 | 1775.3999 * | 8397.8135 |

TABLE 3-continued

Conventional Turbo-Expander Process (FIG. 1)
Stream Properties

| | | | | |
|---|---|---|---|---|
| Molar Flow Kgmole/hr | 273.6406 | 273.6406 | 273.6406 | 273.6406 |
| Mass Flow Kg/hr | 4574.7158 | 4574.7158 | 4574.7158 | 4574.7158 |
| Volume Flow M3/hr | 14.6307 | 14.6307 | 14.6307 | 14.6307 |
| Enthalpy KJ/hr | 2.01775E+06 | 2.57809E+06 | 2.82837E+06 | 4.44477E+06 |

| Stream | 68 |
|---|---|
| Name | RESIDUE GAS |
| Vapour frac. | 1.0000 |
| Temperature C. | 48.8889 * |
| Pressure Kpa a | 8363.3398 * |
| Molar Flow Kgmole/hr | 273.6406 |
| Mass Flow Kg/hr | 4574.7158 |
| Volume Flow M3/hr | 14.6307 |
| Enthalpy KJ/hr | 2.62310E+06 |

TABLE 4

Conventional Turbo-Expander Process (FIG. 1)
Exchanger Duties and Compressor Power

| Stream | 70 | 71 | 72 | 73 |
|---|---|---|---|---|
| Name | WARM GAS/GAS | GAS/LIQ HEX | CHILLER | COLD GAS/GAS |
| Enthalpy KJ/hr | 560338.0625 | 395760.2813 | 21.5396 | 690620.9375 |

| Stream | 79 | 82 | 90 | 91 |
|---|---|---|---|---|
| Name | REBOILER | AFTERCOOLER | EXPANDER | RECOMPRESSOR |
| Enthalpy KJ/hr | 159602.0313 * | 1.82166E+06 | 250943.9844 | 1.61640E+06 |

| Stream | 92 |
|---|---|
| Name | BOOSTER COMP |
| Enthalpy KJ/hr | 250275.2500 |

TABLE 5

CONVENTIONAL Turbo-Expander Process (FIG. 1)
Material Balance

| Stream | 4 | 37 | 62 | 30 |
|---|---|---|---|---|
| Name | FEED | C2+ PRODUCT | RESIDUE GAS | LOW TEMP LIQ |
| Vapour frac. | 1.0000 | 0.0000 | 1.0000 | 0.0000 |
| Temperature C. | 21.0753 | −3.0858 * | −106.2850 * | −57.5729 |
| Pressure Kpa a | 6294.9131 | 1399.6356 * | 1378.9514 * | 6157.0186 |
| Molar Flow Kgmole/hr | 297.7482 | 24.1077 * | 273.6406 * | 58.5608 |
| Mass Flow Kg/hr | 5540.7427 | 966.0270 | 4574.7158 | 1347.5385 |
| Volume Flow M3/hr | 16.7591 | 2.1285 | 14.6307 | 3.6474 |
| Enthalpy KJ/hr | 2.59635E+06 | −73117.6094 | 1.32713E+06 | −37556.4492 |
| Density Kg/m3 | 57.4469 | 511.7144 | 20.3557 | 357.1277 |
| Mole Wt. | 18.6088 | 40.0714 | 16.7180 | 23.0109 |
| Spec. Heat KJ/Kgmole-C | .48.9815 | 106.6243 | 41.0687 | 87.3373 |
| Therm Cond Watt/m-K | 0.0406 | — | 0.0223 | 0.0883 |
| Viscosity Cp | 0.0130 | — | 0.0071 | 0.0447 |
| Sur Tension Dyne/cm | — | — | — | 2.0911 |
| Std Density Kg/m3 | — | — | — | — |
| Z Factor | 0.8335 | — | 0.8163 | 0.2213 |
| N2 Kgmole/hr | 5.0123 | 0.0000 * | 5.0123 * | 0.4208 |
| CO2 Kgmole/hr | 3.4056 | 0.4785 * | 2.9272 * | 0.9749 |
| Methane Kgmole/hr | 262.8470 | 0.1276 * | 262.7194 * | 43.2417 |
| Ethane Kgmole/hr | 15.6641 | 12.7527 * | 2.9113 * | 6.3379 |
| Propane Kgmole/hr | 6.8591 | 6.7906 * | 0.0685 * | 4.2901 |
| i-Butane Kgmole/hr | 1.0422 | 1.0410 * | 0.0012 * | 0.7885 |
| n-Butane Kgmole/hr | 1.4193 | 1.4187 * | 0.0006 * | 1.1371 |
| i-Pentan Kgmole/hr | 0.5360 | 0.5360 * | 0.0000 * | 0.4721 |
| n-Pentan Kgmole/hr | 0.4764 | 0.4764 * | 0.0000 * | 0.4303 |
| n-Hexane Kgmole/hr | 0.3374 | 0.3374 * | 0.0000 * | 0.3219 |
| n-Heptan Kgmole/hr | 0.1488 | 0.1488 * | 0.0000 * | 0.1456 |
| Total Kgmole/hr | 297.7482 | 24.1077 * | 273.6406 * | 58.5608 |

TABLE 6

Conventional Turbo-Expander Process (FIG. 1)
Stream Compositions

| Stream | 4 | 37 | 62 | 30 |
|---|---|---|---|---|
| Name | FEED | C2+ PRODUCT | RESIDUE GAS | LOW TEMP LIQ |
| Vapour frac. | 1.0000 | 0.0000 | 1.0000 | 0.0000 |
| Temperature C. | 21.0753 | −3.0858 * | −106.2850 * | −57.5729 |
| Pressure Kpa a | 6294.9131 | 1399.6356 * | 1378.9514 * | 6157.0186 |

TABLE 6-continued
Conventional Turbo-Expander Process (FIG. 1)
Stream Compositions

| Stream | 4 | 37 | 62 | 30 |
|---|---|---|---|---|
| Molar Flow Kgmole/hr | 297.7482 | 24.1077 * | 273.6406 * | 58.5608 |
| Mass Flow Kg/hr | 5540.7427 | 966.0270 | 4574.7158 | 1347.5385 |
| Volume Flow M3/hr | 16.7591 | 2.1285 | 14.6307 | 3.6474 |
| Enthalpy KJ/hr | 2.59635E+06 | −73117.6094 | 1.32713E+06 | −37556.4492 |
| Density Kg/m3 | 57.4469 | 511.7144 | 20.3557 | 357.1277 |
| Mole Wt. | 18.6088 | 40.0714 | 16.7180 | 23.0109 |
| Spec. Heat KJ/Kgmole-C | 48.9815 | 106.6243 | 41.0687 | 87.3373 |
| Therm Cond Watt/m-K | 0.0406 | — | 0.0223 | 0.0883 |
| Viscosity Cp | 0.0130 | — | 0.0071 | 0.0447 |
| Sur Tension Dyne/cm | — | — | — | 2.0911 |
| Std Density Kg/m3 | — | — | — | — |
| Z Factor | 0.8335 | — | 0.8163 | 0.2213 |
| N2 | 0.0168 | 0.0000 * | 0.0183 * | 0.0072 |
| CO2 | 0.0114 | 0.0198 * | 0.0107 * | 0.0166 |
| Methane | 0.8828 | 0.0053 * | 0.9601 * | 0.7384 |
| Ethane | 0.0526 | 0.5290 * | 0.0106 * | 0.1082 |
| Propane | 0.0230 | 0.2817 * | 0.0003 * | 0.0733 |
| i-Butane | 0.0035 | 0.0432 * | 0.0000 * | 0.0135 |
| n-Butane | 0.0048 | 0.0588 * | 0.0000 * | 0.0194 |
| i-Pentan | 0.0018 | 0.0222 * | 0.0000 * | 0.0081 |
| n-Pentan | 0.0016 | 0.0198 * | 0.0000 * | 0.0073 |
| n-Hexane | 0.0011 | 0.0140 * | 0.0000 * | 0.0055 |
| n-Heptan | 0.0005 | 0.0062 * | 0.0000 * | 0.0025 |

TABLE 7
Conventional Turbo-Expander Process (FIG. 1)
Demethanizer Property Profiles
Hyprotech's Process Simulator HYSIM - Licensed to Bob Stothers
Case Name MACUN70   Date 1980/1/1   Time 8:54:8
TRANSPORT PROPERTIES

| STAGE NO. | VAPOUR | | LIQUID | | SURFACE TENSION DYNE/CM |
|---|---|---|---|---|---|
| | VISCOSITY CP | THERMAL CONDUCTIVITY WATT/M-K | VISCOSITY CP | THERMAL CONDUCTIVITY WATT/M-K | |
| 1 | 0.00711 | 0.02230 | 0.10148 | 0.14760 | 10.0943 |
| 2 | 0.00756 | 0.02282 | 0.13269 | 0.15648 | 12.6567 |
| 3 | 0.00809 | 0.02289 | 0.13963 | 0.15282 | 12.9831 |
| 4 | 0.00833 | 0.02280 | 0.13495 | 0.14725 | 12.4325 |
| 5 | 0.00839 | 0.02290 | 0.12897 | 0.14234 | 11.8139 |
| 6 | 0.00841 | 0.02312 | 0.12389 | 0.13822 | 11.2813 |
| 7 | 0.00844 | 0.02339 | 0.12262 | 0.13552 | 11.0542 |
| 8 | 0.00868 | 0.02428 | 0.15435 | 0.13756 | 12.7862 |
| 9 | 0.00869 | 0.02428 | 0.15287 | 0.13685 | 12.6740 |
| 10 | 0.00876 | 0.02416 | 0.14981 | 0.13521 | 12.4318 |
| 11 | 0.00892 | 0.02378 | 0.14288 | 0.13148 | 11.8595 |
| 12 | 0.00915 | 0.02289 | 0.13108 | 0.12504 | 10.8082 |
| 13 | 0.00928 | 0.02173 | 0.11781 | 0.11777 | 9.5490 |
| 14 | 0.00926 | 0.02109 | 0.10871 | 0.11205 | 8.5659 |
| 15 | 0.00930 | 0.02140 | 0.10847 | 0.10783 | 8.2282 |

TABLE 8
Two Tower Process (FIG. 2)
Stream Properties

| Stream | 4 | 9 | 17 | 18 |
|---|---|---|---|---|
| Name | PLANT INLET | ERROR | GAS/LIQ IN | GAS/LIQ OUT |
| Vapour frac. | 1.0000 | — | 1.0000 | 0.9193 |
| Temperature C. | 21.0753 | — | 21.0753 | −47.1435 |
| Pressure Kpa a | 6294.9131 | — | 6294.9131 | 6191.4917 |
| Molar Flow Kgmole/hr | 297.7482 | 0.0103 | 45.3592 * | 45.3592 |
| Mass Flow Kg/hr | 5540.7427 | 0.1116 | 844.0818 | 844.0818 |
| Volume Flow M3/hr | 16.7591 | 0.0005 | 2.5531 | 2.5531 |
| Enthalpy KJ/hr | 2.59635E+06 | — | 395530.7813 | 200441.0156 |

| Stream | 20 | 21 | 23 | 24 |
|---|---|---|---|---|
| Name | GAS/GAS IN | GAS/GAS OUT | CHILLER OUT | COLD GAS IN |
| Vapour frac. | 1.0000 | 0.9857 | 0.9755 | 0.9696 |
| Temperature C. | 21.0753 | −23.1573 | −30.0856 | −33.0309 |
| Pressure Kpa a | 6294.9131 | 6225.9653 | 6191.4917 | 6191.4917 |
| Molar Flow Kgmole/hr | 252.3890 | 252.3890 | 252.3890 | 297.7482 |
| Mass Flow Kg/hr | 4696.6606 | 4696.6606 | 4696.6606 | 5540.7427 |
| Volume Flow M3/hr | 14.2060 | 14.2060 | 14.2060 | 16.7591 |
| Enthalpy KJ/hr | 2.20082E+06 | 1.58932E+06 | 1.47173E+06 | 1.67218E+06 |

TABLE 8-continued

Two Tower Process (FIG. 2)
Stream Properties

| Stream | 25 | 26 | 27 | 30 |
|---|---|---|---|---|
| Name | REBOILER IN | REBOILER OUT | GAS FRAC IN | GAS FRAC LIQ |
| Vapour frac. | 0.7304 | 0.6003 | 0.6485 | 0.0000 * |
| Temperature C. | −60.0476 | −62.5948 * | −81.1537 | −76.4986 * |
| Pressure Kpa a | 6157.0181 | 6122.5444 | 3585.2734 * | 3585.2734 * |
| Molar Flow Kgmole/hr | 297.7482 | 297.7482 | 297.7482 | 106.0311 * |
| Mass Flow Kg/hr | 5540.7427 | 5540.7427 | 5540.7427 | 2443.3013 |
| Volume Flow M3/hr | 16.7591 | 16.7591 | 16.7591 | 6.6430 |
| Enthalpy KJ/hr | 823984.6875 | 676019.7500 | 676019.7500 | −240615.5625 |

| Stream | 31 | 32 | 33 | 37 |
|---|---|---|---|---|
| Name | SUBCOOLD LIQ | CONDENSER IN | DC2 FEED | C2+ PRODUCT |
| Vapour frac. | 0.0000 | 0.4010 | 0.6928 | 0.0000 |
| Temperature C. | −87.1484 | −132.1353 | −115.2480 | −65.3441 * |
| Pressure Kpa a | 3516.3259 | 379.2116 | 275.7903 * | 282.6850 * |
| Molar Flow Kgmole/hr | 106.0311 | 106.0311 | 106.0311 | 27.2160 * |
| Mass Flow Kg/hr | 2443.3013 | 2443.3013 | 2443.3013 | 1081.5333 |
| Volume Flow M3/hr | 6.6430 | 6.6430 | 6.6430 | 2.3429 |
| Enthalpy KJ/hr | −325302.3125 | −325302.3125 | 20515.0625 | −234289.8750 |

| Stream | 38 | 39 | 40 | 41 |
|---|---|---|---|---|
| Name | C2+ PRODUCT | C2+ PRODUCT | DC1 OVERHEAD | |
| Vapour frac. | 0.0000 | 0.0000 | 1.0000 | 1.0000 |
| Temperature C. | −60.5575 | 15.5556 * | −115.1000 * | −40.0000 * |
| Pressure Kpa a | 6205.2813 * | 6170.8076 | 275.7903 * | 262.0008 |
| Molar Flow Kgmole/hr | 27.2160 | 27.2160 | 78.8150 * | 78.8150 |
| Mass Flow Kg/hr | 1081.5333 | 1081.5333 | 1361.7679 | 1361.7679 |
| Volume Flow M3/hr | 2.3429 | 2.3429 | 4.3000 | 4.3000 |
| Enthalpy KJ/hr | −217786.1563 | −22696.3770 | 402775.1563 | 606865.2500 |

| Stream | 42 | 43 | 44 | 45 |
|---|---|---|---|---|
| Name | 1ST SUCTION | 1ST DISCHARG | 2ND SUCTION | 2ND DISCHARG |
| Vapour frac. | 1.0000 | 1.0000 | 1.0000 | 1.0000 |
| Temperature C. | 32.2222 * | 160.4082 | 51.6667 * | 180.6932 |
| Pressure Kpa a | 248.2112 | 985.9502 | 965.2659 * | 3668.0107 |
| Molar Flow Kgmole/hr | 78.8150 | 78.8150 | 78.8150 | 78.8150 |
| Mass Flow Kg/hr | 1361.7679 | 1361.7679 | 1361.7679 | 1361.7679 |
| Volume Flow M3/hr | 4.3000 | 4.3000 | 4.3000 | 4.3000 |
| Enthalpy KJ/hr | 811394.3125 | 1.21108E+06 | 859362.3125 | 1.26341E+06 |

| Stream | 46 | 47 | 48 | 60 |
|---|---|---|---|---|
| Name | WARM RECYCLE | COOL RECYCLE | CHILLED REC | GASFRAC OVHD |
| Vapour frac. | 1.0000 | 1.0000 | 1.0000 | 1.0000 * |
| Temperature C. | 43.3333 * | −19.6698 | −34.4444 * | −89.9262 * |
| Pressure Kpa a | 3640.4316 | 3612.8525 | 3585.2734 * | 3543.9050 * |
| Molar Flow Kgmole/hr | 78.8150 | 78.8150 | 78.8150 | 270.5219 * |
| Mass Flow Kg/hr | 1361.7679 | 1361.7679 | 1361.7679 | 4459.0972 |
| Volume Flow M3/hr | 4.3000 | 4.3000 | 4.3000 | 14.4157 |
| Enthalpy KJ/hr | 796920.1250 | 592391.0625 | 542950.9375 | 1.09745E+06 |

| Stream | 61 | 62 | 63 | 64 |
|---|---|---|---|---|
| Name | RESIDUE GAS | RESIDUE GAS | RESIDUE GAS | RESIDUE GAS |
| Vapour frac. | 1.0000 | 1.0000 | 1.0000 | 1.0000 |
| Temperature C. | −86.6202 | −86.9536 | −40.0000 * | 15.5556 * |
| Pressure Kpa a | 3516.3259 | 3488.7468 | 3454.2729 | 3419.7991 |
| Molar Flow Kgmole/hr | 270.5219 | 270.5219 | 270.5219 | 270.5219 |
| Mass Flow Kg/hr | 4459.0972 | 4459.0972 | 4459.0972 | 4459.0972 |
| Volume Flow M3/hr | 14.4157 | 14.4157 | 14.4157 | 14.4157 |
| Enthalpy KJ/hr | 1.18214E+06 | 1.18214E+06 | 1.82624E+06 | 2.43775E+06 |

| Stream | 66 | 68 |
|---|---|---|
| Name | SALES GAS | |
| Vapour frac. | 1.0000 | 1.0000 |
| Temperature C. | 102.8382 | 48.8889 * |
| Pressure Kpa a | 8397.8135 | 8363.3398 * |
| Molar Flow Kgmole/hr | 270.5219 | 270.5219 |
| Mass Flow Kg/hr | 4459.0972 | 4459.0972 |
| Volume Flow M3/hr | 14.4157 | 14.4157 |
| Enthalpy KJ/hr | 3.24086E+06 | 2.59570E+06 |

TABLE 9

TWO Tower Process (FIG. 2)
Exchanger Duties and Compressor Powers

| Stream | 70 | 71 | 72 | 73 |
|---|---|---|---|---|
| Name | WARM GAS/GAS | CHILLER DUTY | COLD GAS/GAS | SUBCOOLER |

TABLE 9-continued

TWO Tower Process (FIG. 2)
Exchanger Duties and Compressor Powers

| Enthalpy KJ/hr | 611501.5000 | 117581.6250 | 848195.4375 | 84686.7656 |
|---|---|---|---|---|
| Stream | 74 | 75 | 76 | 77 |
| Name | CONDENSER | | COLD REC GAS | WARM REC GAS |
| Enthalpy KJ/hr | 345817.3750 * | 0.0000 * | 204090.0781 | 204529.0469 |
| Stream | 78 | 79 | 82 | 83 |
| Name | REC CHILLER | DC2 REBOILER | SALES COOLER | 1ST AFTCOOL |
| Enthalpy KJ/hr | 49440.1367 | 147965.0000 * | 645163.4375 | 351724.7813 |
| Stream | 84 | 85 | 86 | 92 |
| Name | 2ND AFTCOOL | LIQ/GAS DUTY | COLD RES GAS | SALES COMP |
| Enthalpy KJ/hr | 466494.5000 | 195089.7813 | 644105.3750 | 803113.0625 |
| Stream | 93 | 94 | 95 | |
| Name | 1ST COMPRESS | 2ND COMPRESS | C2+ PUMP | |
| Enthalpy KJ/hr | 399692.8438 | 404052.2500 | 16503.7148 | |

TABLE 10

Two Tower Process (FIG. 2)
Material Balance

| Stream | 4 | 37 | 60 | 9 | 42 | 33 |
|---|---|---|---|---|---|---|
| Name | PLANT INLET | C2+ PRODUCT | GASFRAC OVHD | ERROR | 1ST SUCTION | DC2 FEED |
| Vapour frac. | 1.0000 | 0.0000 | 1.0000 * | — | 1.0000 | 0.6928 |
| Temperature C. | 21.0753 | −65.3441 * | −89.9262 * | — | 32.2222 * | −115.2480 |
| Pressure Kpa a | 6294.9131 | 282.6850 * | 3543.9050 * | — | 248.2112 | 275.7903 * |
| Molar Flow Kgmole/hr | 297.7482 | 27.2160 * | 270.5219 * | 0.0103 | 78.8150 | 106.0311 |
| Mass Flow Kg/hr | 5540.7427 | 1081.5333 | 4459.0972 | 0.1116 | 1361.7679 | 2443.3013 |
| Volume Flow M3/hr | 16.7591 | 2.3429 | 14.4157 | 0.0005 | 4.3000 | 6.6430 |
| Enthalpy KJ/hr | 2.59635E+06 | −234289.8750 | 1.09745E+06 | — | 811394.3125 | 20515.0625 |
| Density Kg/m3 | 57.4469 | 612.6823 | 69.3735 | — | 1.6985 | 7.2449 |
| Mole Wt. | 18.6088 | 39.7388 | 16.4833 | 10.8341 | 17.2780 | 23.0433 |
| Spec. Heat KJ/Kgmole-C. | 48.9815 | 83.6426 | 95.7635 | — | 37.1313 | 45.6116 |
| Therm Cond Watt/m-K | 0.0406 | 0.1555 | 0.0310 | — | 0.0359 | — |
| Viscosity Cp | 0.0130 | 0.2199 | 0.0093 | — | 0.0116 | — |
| Sur Tension Dyne/cm | — | 16.8716 | — | — | — | — |
| Std Density Kg/m3 | — | 491.3733 | — | — | — | — |
| Z Factor | 0.8335 | 0.0106 | 0.5527 | — | 0.9945 | — |
| N2 Kgmole/hr | 5.0123 | 0.0000 * | 5.0123 * | −0.0000 | 0.0033 | 0.0033 |
| CO2 Kgmole/hr | 3.4056 | 2.0041 * | 1.4032 * | −0.0017 | 2.0579 | 4.0620 |
| Methane Kgmole/hr | 262.8470 | 0.1424 * | 262.6920 * | 0.0125 | 73.9797 | 74.1221 |
| Ethane Kgmole/hr | 15.6641 | 14.2527 * | 1.4118 * | −0.0005 | 2.7164 | 16.9692 |
| Propane Kgmole/hr | 6.8591 | 6.8565 * | 0.0025 * | 0.0000 | 0.0562 | 6.9127 |
| i-Butane Kgmole/hr | 1.0422 | 1.0422 * | 0.0000 * | 0.0000 | 0.0010 | 1.0432 |
| n-Butane Kgmole/hr | 1.4193 | 1.4193 * | 0.0000 * | 0.0000 | 0.0005 | 1.4199 |
| i-Pentan Kgmole/hr | 0.5360 | 0.5360 * | 0.0000 * | −0.0000 | 0.0000 | 0.5360 |
| n-Pentan Kgmole/hr | 0.4764 | 0.4764 * | 0.0000 * | 0.0000 | 0.0000 | 0.4764 |
| n-Hexane Kgmole/hr | 0.3374 | 0.3374 * | 0.0000 * | 0.0000 | 0.0000 | 0.3374 |
| n-Heptan Kgmole/hr | 0.1488 | 0.1488 * | 0.0000 * | 0.0000 | 0.0000 | 0.1488 |
| Total Kgmole/hr | 297.7482 | 27.2160 * | 270.5219 * | 0.0103 | 78.8150 | 106.0311 |

TABLE 11

Two Tower Process (FIG. 2) Stream Compositions

| Stream | | 4 | 37 | 60 |
|---|---|---|---|---|
| Name | | PLANT INLET | C2+ PRODUCT | GASFRAC OVHD |
| Vapour frac. | | 1.0000 | 0.0000 | 1.0000 * |
| Temperature | C. | 21.0753 | −65.3441 * | −89.9262 * |
| Pressure | Kpa a | 6294.9131 | 282.6850 * | 3543.9050 * |
| Molar Flow | Kgmole/hr | 297.7482 | 27.2160 * | 270.5219 * |
| Mass Flow | Kg/hr | 5540.7427 | 1081.5333 | 4459.0972 |
| Volume Flow | M3/hr | 16.7591 | 2.3429 | 14.4157 |
| Enthalpy | KJ/hr | 2.59635E+06 | −234289.8750 | 1.09745E+06 |
| Density | Kg/m3 | 57.4469 | 612.6823 | 69.3735 |
| Mole Wt. | | 18.6088 | 39.7388 | 16.4833 |
| Spec. Heat | KJ/Kgmole-C. | 48.9815 | 83.6426 | 95.7635 |
| Therm Cond | Watt/m-k. | 0.0406 | 0.1555 | 0.0310 |
| Viscosity | Cp | 0.0130 | 0.2199 | 0.0093 |
| Sur Tension | Dyne/cm | — | 16.8716 | — |
| Std Density | Kg/m3 | — | 491.3733 | — |
| Z Factor | | 0.8335 | 0.0106 | 0.5527 |
| N2 | | 0.0168 | 0.0000 * | 0.0185 * |
| CO2 | | 0.0114 | 0.0736 * | 0.0052 * |

TABLE 11-continued

| Two Tower Process (FIG. 2) Stream Compositions | | | | |
|---|---|---|---|---|
| Methane | | 0.8828 | 0.0052 * | 0.9711 * |
| Ethane | | 0.0526 | 0.5237 * | 0.0052 * |
| Propane | | 0.0230 | 0.2519 * | 0.0000 * |
| i-Butane | | 0.0035 | 0.0383 * | 0.0000 * |
| n-Butane | | 0.0048 | 0.0522 * | 0.0000 * |
| i-Pentan | | 0.0018 | 0.0197 * | 0.0000 * |
| n-Pentan | | 0.0016 | 0.0175 * | 0.0000 * |
| n-Hexane | | 0.0011 | 0.0124 * | 0.0000 * |
| n-Heptan | | 0.0005 | 0.0055 * | 0.0000 * |

| Stream | | 42 | 33 |
|---|---|---|---|
| Name | | 1ST SUCTION | DC2 FEED |
| Vapour frac. | | 1.0000 | 0.6928 |
| Temperature | C. | 32.2222 * | −115.2480 |
| Pressure | Kpa a | 248.2112 | 275.7903 * |
| Molar Flow | Kgmole/hr | 78.8150 | 106.0311 |
| Mass Flow | Kg/hr | 1361.7679 | 2443.3013 |
| Volume Flow | M3/hr | 4.3000 | 6.6430 |
| Enthalpy | KJ/hr | 811394.3125 | 20515.0625 |
| Density | Kg/m3 | 1.6985 | 7.2449 |
| Mole Wt. | | 17.2780 | 23.0433 |
| Spec. Heat | KJ/Kgmole-C. | 37.1313 | 45.6116 |
| Therm Cond | Watt/m-k. | 0.0359 | — |
| Viscosity | Cp | 0.0116 | — |
| Sur Tension | Dyne/cm | — | — |
| Std Density | Kg/m3 | — | — |
| Z Factor | | 0.9945 | — |
| N2 | | 0.0000 | 0.0000 |
| CO2 | | 0.0261 | 0.0383 |
| Methane | | 0.9386 | 0.6991 |
| Ethane | | 0.0345 | 0.1600 |
| Propane | | 0.0007 | 0.0652 |
| i-Butane | | 0.0000 | 0.0098 |
| n-Butane | | 0.0000 | 0.0134 |
| i-Pentan | | 0.0000 | 0.0051 |
| n-Pentan | | 0.0000 | 0.0045 |
| n-Hexane | | 0.0000 | 0.0032 |
| n-Heptan | | 0.0000 | 0.0014 |

TABLE 12

Two Tower Process (FIG. 2) Gas Fractionator Tower Profiles

Hyprotech's Process Simulator HYSIM - Licensed to Bob Stothers
Case Name MACUN10    Date 1980/1/1    Time 0:18:45

COMPUTED RESULTS

Feed Conditions

| Feed Stream Number | 27 | |
|---|---|---|
| Enters on stage | 5 | |
| Liquid Fraction | 0.3515 | |
| Temperature | −81.15 | C. |
| Pressure | 3585.27 | Kpa a |
| Flowrate | 297.75 | Kgmole/hr |
| Enthalpy | 676020. | KJ/hr |
| N2 | 5.0123 | Kgmole/hr |
| CO2 | 3.4056 | Kgmole/hr |
| Methane | 262.8470 | Kgmole/hr |
| Ethane | 15.6641 | Kgmole/hr |
| Propane | 6.8591 | Kgmole/hr |
| i-Butane | 1.0422 | Kgmole/hr |
| n-Butane | 1.4193 | Kgmole/hr |
| i-Pentan | 0.5360 | Kgmole/hr |
| n-Pentan | 0.4764 | Kgmole/hr |
| n-Hexane | 0.3374 | Kgmole/hr |
| n-Heptan | 0.1488 | Kgmole/hr |

| Feed Stream Number | 48 | |
|---|---|---|
| Enters on stage | 9 | |
| Liquid Fraction | 0.0000 | |
| Temperature | −34.44 | C. |
| Pressure | 3585.27 | Kpa a |
| Flowrate | 78.82 | Kgmole/hr |
| Enthalpy | 542951. | KJ/hr |
| N2 | 0.0033 | Kgmole/hr |
| CO2 | 2.0579 | Kgmole/hr |
| Methane | 73.9797 | Kgmole/hr |
| Ethane | 2.7164 | Kgmole/hr |
| Propane | 0.0562 | Kgmole/hr |
| i-Butane | 0.0010 | Kgmole/hr |

TABLE 12-continued

Two Tower Process (FIG. 2) Gas Fractionator Tower Profiles

| | |
|---|---|
| n-Butane | 0.0005 Kgmole/hr |
| i-Pentan | 0.0000 Kgmole/hr |
| n-Pentan | 0.0000 Kgmole/hr |
| n-Hexane | 0.0000 Kgmole/hr |
| n-Heptan | 0.0000 Kgmole/hr |

Hyprotech's Process Simulator HYSIM - Licensed to Bob Stothers
Case Name MACUN10    Date 1980/1/1    Time 0:19:9
Stage Variables

| Stage | Press Kpa | Temp Deg C. | Molar Flow Rates | | | Heat Duty GJ/Hour |
|---|---|---|---|---|---|---|
| | | | Liquid | Vapour | Feed | |
| 1 | 3543.91 | −89.926 | 80.64 | 270.52 | | −0.34582 |
| 2 | 3578.38 | −87.934 | 68.91 | 351.16 | | |
| 3 | 3579.36 | −86.373 | 57.20 | 339.43 | | |
| 4 | 3580.35 | −84.742 | 40.66 | 327.72 | | |
| 5 | 3581.33 | −81.889 | 144.90 | 311.19 | 297.75 | |
| 6 | 3582.32 | −81.291 | 145.37 | 117.68 | | |
| 7 | 3583.30 | −80.895 | 144.27 | 118.14 | | |
| 8 | 3584.29 | −80.031 | 138.72 | 117.04 | | |
| 9 | 3585.27 | −76.499 | 106.03 | 111.50 | 78.80 | |

Hyprotech's Process Simulator HYSIM - Licensed to Bob Stothers
Case Name MACUN10    Date 1980/1/1    Time 0:19:57
Products

| | Vapour from Stage Kg Mol/Hour | 1 Mol Frc | Liquid from Stage Kg Mol/Hour | 9 Mol Frc |
|---|---|---|---|---|
| $N_2$ | 5.012 | 0.01853 | 0.003 | 0.00003 |
| $CO_2$ | 1.403 | 0.00519 | 4.062 | 0.03831 |
| Methane | 262.692 | 0.97106 | 74.122 | 0.69906 |
| Ethane | 1.412 | 0.00522 | 16.969 | 0.16004 |
| Propane | 0.003 | 0.00001 | 6.913 | 0.06519 |
| i-Butane | 0.000 | 0.00000 | 1.043 | 0.00984 |
| n-Butane | 0.000 | 0.00000 | 1.420 | 0.01339 |
| i-Pentan | 0.000 | 0.00000 | 0.536 | 0.00506 |
| n-Pentan | 0.000 | 0.00000 | 0.476 | 0.00449 |
| n-Hexane | 0.000 | 0.00000 | 0.337 | 0.00318 |
| n-Heptan | 0.000 | 0.00000 | 0.149 | 0.00140 |
| Total | 270.522 | | 106.031 | |

Hyprotech's Process Simulator HYSIM - Licensed to Bob Stothers
Case Name MACUN10    Date 1980/1/1    Time 0:21:12
PHYSICAL PROPERTIES

VAPOUR LEAVING FROM EACH STAGE

| STAGE | MOL WT | FLOW KG/HOUR | M ACMH | DENSITY KG/M3 | REDUCED TEMP | PRESS |
|---|---|---|---|---|---|---|
| 1 | 16.483 | 4459. | 0.064 | 69.27528 | 0.96083 | 0.76491 |
| 2 | 16.570 | 5819. | 0.085 | 68.31509 | 0.96667 | 0.77082 |
| 3 | 16.656 | 5654. | 0.085 | 66.53973 | 0.97173 | 0.77052 |
| 4 | 16.717 | 5479. | 0.085 | 64.60286 | 0.97802 | 0.77067 |
| 5 | 16.741 | 5210. | 0.086 | 60.82468 | 0.99228 | 0.77136 |
| 6 | 16.618 | 1956. | 0.032 | 60.37632 | 0.99104 | 0.76902 |
| 7 | 16.600 | 1961. | 0.033 | 60.13585 | 0.99123 | 0.76821 |
| 8 | 16.660 | 1950. | 0.033 | 59.65896 | 0.99329 | 0.76735 |
| 9 | 16.905 | 1885. | 0.033 | 57.56644 | 1.00401 | 0.76500 |

LIQUID LEAVING FROM EACH STAGE

| STAGE | MOL WT | FLOW KG/HOUR | M3/HR | DENSITY KG/M3 | REDUCED TEMP | PRESS |
|---|---|---|---|---|---|---|
| 1 | 16.862 | 1360. | 4.690 | 289.88832 | 0.94132 | 0.75836 |
| 2 | 17.334 | 1195. | 3.974 | 300.54875 | 0.93466 | 0.76242 |
| 3 | 17.824 | 1020. | 3.259 | 312.75522 | 0.92531 | 0.76068 |
| 4 | 18.454 | 750. | 2.289 | 327.77443 | 0.91275 | 0.76049 |
| 5 | 20.960 | 3037. | 7.979 | 380.58934 | 0.86444 | 0.76712 |
| 6 | 20.932 | 3043. | 8.027 | 379.01933 | 0.86633 | 0.76650 |
| 7 | 21.014 | 3032. | 7.971 | 380.27147 | 0.86582 | 0.76584 |
| 8 | 21.384 | 2966. | 7.660 | 387.20652 | 0.86093 | 0.76394 |
| 9 | 23.043 | 2443. | 5.877 | 415.65298 | 0.83865 | 0.75982 |

Hyprotech's Process Simulator HYSIM - Licensed to Bob Stothers
Case Name MACUN10    Date 1980/1/1    Time 0:22:58
TRANSPORT PROPERTIES

| | VAPOUR | | LIQUID | | |
|---|---|---|---|---|---|
| STAGE NO. | VISCOSITY CP | THERMAL CONDUCTIVITY WATT/M-K | VISCOSITY CP | THERMAL CONDUCTIVITY WATT/M-K | SURFACE TENSION DYNE/CM |
| 1 | 0.00932 | 0.03103 | 0.03149 | 0.08232 | 1.1461 |
| 2 | 0.00935 | 0.03101 | 0.03328 | 0.08443 | 1.3373 |
| 3 | 0.00934 | 0.03082 | 0.03563 | 0.08722 | 1.6158 |

TABLE 12-continued

Two Tower Process (FIG. 2) Gas Fractionator Tower Profiles

| | | | | | |
|---|---|---|---|---|---|
| 4 | 0.00933 | 0.03065 | 0.03891 | 0.09087 | 2.0216 |
| 5 | 0.00931 | 0.03043 | 0.05318 | 0.10433 | 3.8152 |
| 6 | 0.00929 | 0.03056 | 0.05279 | 0.10396 | 3.7580 |
| 7 | 0.00929 | 0.03059 | 0.05305 | 0.10413 | 3.7841 |
| 8 | 0.00930 | 0.03056 | 0.05473 | 0.10535 | 3.9797 |
| 9 | 0.00935 | 0.03040 | 0.06297 | 0.11071 | 4.9228 |

TABLE 13

Two Tower Process (FIG. 2) Demethanizer Tower Profiles

Hyprotech's Process Simulator HYSIM - Licensed to Bob Stothers
Case Name MACUN10  Date 1980/1/1  Time 0:31:33

COMPUTED RESULTS

Feed Conditions

| Feed Stream Number | 33 | |
|---|---|---|
| Enters on stage | 1 | |
| Liquid Fraction | 0.3072 | |
| Temperature | −115.25 | C. |
| Pressure | 275.79 | Kpa a |
| Flowrate | 106.03 | Kgmole/hr |
| Enthalpy | 20515. | KJ/hr |
| N2 | 0.0033 | Kgmole/hr |
| CO2 | 4.0620 | Kgmole/hr |
| Methane | 74.1221 | Kgmole/hr |
| Ethane | 16.9692 | Kgmole/hr |
| Propane | 6.9127 | Kgmole/hr |
| i-Butane | 1.0432 | Kgmole/hr |
| n-Butane | 1.4199 | Kgmole/hr |
| i-Pentan | 0.5360 | Kgmole/hr |
| n-Pentan | 0.4764 | Kgmole/hr |
| n-Hexane | 0.3374 | Kgmole/hr |
| n-Heptan | 0.1488 | Kgmole/hr |

Hyprotech's Process Simulator HYSIM - Licensed to Bob Stothers
Case Name MACUN10  Date 1980/1/1  Time 0:31:36

Stage Variables

| Stage | Press Kpa | Temp Deg C. | Molar Flow Rates Liquid | Vapour | Feed | Heat Duty GJ/Hour |
|---|---|---|---|---|---|---|
| 1 | 275.79 | −115.099 | 32.57 | 78.82 | 106.03 | |
| 2 | 277.51 | −112.244 | 32.61 | 5.35 | | |
| 3 | 279.24 | −100.784 | 33.36 | 5.39 | | |
| 4 | 280.96 | −81.242 | 35.45 | 6.14 | | |
| 5 | 282.69 | −65.341 | 27.22 | 8.23 | | 0.14795 |

Hyprotech's Process Simulator HYSIM - Licensed to Bob Stothers
Case Name MACUN10  Date 1980/1/1  Time 0:31:45

Products

| | Vapour from Stage Kg Mol/Hour | 1 Mol Frc | Liquid from Stage Kg Mol/Hour | 5 Mol Frc |
|---|---|---|---|---|
| N2 | 0.003 | 0.00004 | 0.000 | 0.00000 |
| CO2 | 2.058 | 0.02611 | 2.004 | 0.07363 |
| Methane | 73.980 | 0.93865 | 0.142 | 0.00523 |
| Ethane | 2.717 | 0.03447 | 14.253 | 0.52369 |
| Propane | 0.056 | 0.00071 | 6.856 | 0.25193 |
| i-Butane | 0.001 | 0.00001 | 1.042 | 0.03829 |
| n-Butane | 0.001 | 0.00001 | 1.419 | 0.05215 |
| i-Pentan | 0.000 | 0.00000 | 0.536 | 0.01969 |
| n-Pentan | 0.000 | 0.00000 | 0.476 | 0.01751 |
| n-Hexane | 0.000 | 0.00000 | 0.337 | 0.01240 |
| n-Heptan | 0.000 | 0.00000 | 0.149 | 0.00547 |
| Total | 78.816 | | 27.216 | |

Hyprotech's Process Simulator HYSIM - Licensed to Bob Stothers
Case Name MACUN10  Date 1980/1/1  Time 0:32:56

PHYSICAL PROPERTIES

VAPOUR LEAVING FROM EACH STAGE

| STAGE | MOL WT | FLOW KG/HOUR | M ACMH | DENSITY KG/M3 | REDUCED TEMP | PRESS |
|---|---|---|---|---|---|---|
| 1 | 17.278 | 1362. | 0.360 | 3.78037 | 0.79925 | 0.05842 |
| 2 | 17.635 | 94. | 0.025 | 3.81045 | 0.80572 | 0.05848 |
| 3 | 19.891 | 107. | 0.027 | 4.02862 | 0.81286 | 0.05698 |
| 4 | 27.410 | 168. | 0.033 | 5.04270 | 0.75295 | 0.05221 |
| 5 | 33.036 | 272. | 0.048 | 5.69496 | 0.70449 | 0.05096 |

LIQUID LEAVING FROM EACH STAGE

| | | FLOW | | DENSITY | REDUCED | |
|---|---|---|---|---|---|---|

TABLE 13-continued

Two Tower Process (FIG. 2)
Demethanizer Tower Profiles

| STAGE | MOL WT | KG/HOUR | M3/HR | KG/M3 | TEMP | PRESS |
|---|---|---|---|---|---|---|
| 1 | 36.107 | 1176. | 1.827 | 643.48749 | 0.49752 | 0.05845 |
| 2 | 36.456 | 1189. | 1.839 | 646.35817 | 0.50351 | 0.05849 |
| 3 | 37.470 | 1250. | 1.915 | 652.49138 | 0.53028 | 0.05774 |
| 4 | 38.183 | 1353. | 2.111 | 641.17559 | 0.58115 | 0.05726 |
| 5 | 39.739 | 1082. | 1.765 | 612.68052 | 0.60963 | 0.05998 |

Hyprotech's Process Simulator HYSIM - Licensed to Bob Stothers
Case Name MACUN10    Date 1980/1/1    Time 0:34: 9
TRANSPORT PROPERTIES

| | VAPOUR | | LIQUID | | |
|---|---|---|---|---|---|
| STAGE NO. | VISCOSITY CP | THERMAL CONDUCTIVITY WATT/M-K | VISCOSITY CP | THERMAL CONDUCTIVITY WATT/M-K | SURFACE TENSION DYNE/CM |
| 1 | 0.00633 | 0.01831 | 0.36011 | 0.20031 | 22.1670 |
| 2 | 0.00644 | 0.01838 | 0.35066 | 0.19818 | 22.0160 |
| 3 | 0.00687 | 0.01815 | 0.31324 | 0.18896 | 21.1076 |
| 4 | 0.00750 | 0.01558 | 0.24864 | 0.17089 | 18.7113 |
| 5 | 0.00756 | 0.01391 | 0.21988 | 0.15545 | 16.8712 |

Hyprotech's Process Simulator HYSIM - Licensed to Bob Stothers
Case Name SHELL610    Date 1980/1/1    Time 6:48:55
Products

| | Vapour from Stage Kg Mol/Hour | 1 Mol Frc | Liquid from Stage Kg Mol/Hour | 10 Mol Frc |
|---|---|---|---|---|
| Hydrogen | 3.915 | 0.00188 | 0.000 | 0.00000 |
| N2 | 66.831 | 0.03206 | 1.635 | 0.00018 |
| H2S | 0.014 | 0.00001 | 0.116 | 0.00001 |
| CO2 | 1209.710 | 0.58039 | 8890.650 | 0.98118 |
| Methane | 785.789 | 0.37700 | 130.867 | 0.01444 |
| Ethane | 16.242 | 0.00779 | 26.700 | 0.00295 |
| Propane | 1.798 | 0.00086 | 11.170 | 0.00123 |
| Total | 2084.300 | | 9061.140 | |

Hyprotech's Process Simulator HYSIM - Licensed to Bob Stothers
Case Name SHELL610    Date 1980/1/1    Time 6:49:53
PHYSICAL PROPERTIES

VAPOUR LEAVING FROM EACH STAGE

| | | FLOW | | DENSITY | REDUCED | |
|---|---|---|---|---|---|---|
| STAGE | MOL WT | KG/HOUR | M ACMH | KG/M3 | TEMP | PRESS |
| 1 | 32.766 | 68294. | 3.173 | 21.52612 | 0.86235 | 0.17413 |
| 2 | 32.784 | 4432. | 0.205 | 21.57129 | 0.86185 | 0.17427 |
| 3 | 32.778 | 4504. | 0.209 | 21.59811 | 0.86182 | 0.17449 |
| 4 | 32.763 | 4553. | 0.211 | 21.61886 | 0.86185 | 0.17472 |
| 5 | 32.744 | 4601. | 0.213 | 21.63665 | 0.86180 | 0.17494 |
| 6 | 32.721 | 4657. | 0.215 | 21.65238 | 0.86159 | 0.17513 |
| 7 | 32.702 | 4728. | 0.218 | 21.66941 | 0.86109 | 0.17524 |
| 8 | 32.734 | 4839. | 0.223 | 21.71471 | 0.85983 | 0.17513 |
| 9 | 33.180 | 5147. | 0.234 | 21.98564 | 0.85494 | 0.17377 |
| 10 | 36.008 | 6761. | 0.287 | 23.58070 | 0.83165 | 0.16612 |

LIQUID LEAVING FROM EACH STAGE

| | | FLOW | | DENSITY | REDUCED | |
|---|---|---|---|---|---|---|
| STAGE | MOL WT | KG/HOUR | M3/HR | KG/M3 | TEMP | PRESS |
| 1 | 43.404 | 399154. | 351.733 | 1134.66520 | 0.72913 | 0.14730 |
| 2 | 43.401 | 399226. | 351.863 | 1134.45226 | 0.72924 | 0.14751 |
| 3 | 43.399 | 399275. | 351.951 | 1134.30609 | 0.72932 | 0.14771 |
| 4 | 43.397 | 399323. | 352.038 | 1134.16244 | 0.72939 | 0.14791 |
| 5 | 43.394 | 399379. | 352.139 | 1133.99545 | 0.72947 | 0.14811 |
| 6 | 43.392 | 399450. | 352.268 | 1133.78310 | 0.72958 | 0.14831 |
| 7 | 43.388 | 399561. | 352.459 | 1133.48374 | 0.72976 | 0.14851 |
| 8 | 43.387 | 399869. | 352.912 | 1132.90289 | 0.73027 | 0.14871 |
| 9 | 43.409 | 401483. | 354.986 | 1130.82985 | 0.73279 | 0.14886 |
| 10 | 43.562 | 394722. | 351.868 | 1121.63561 | 0.74557 | 0.14874 |

Hyprotech's Process Simulator HYSIM - Licensed to Bob Stothers
Case Name SHELL610    Date 1980/1/1    Time 6:51:49
TRANSPORT PROPERTIES

| | VAPOUR | | LIQUID | | |
|---|---|---|---|---|---|
| STAGE NO. | VISCOSITY CP | THERMAL CONDUCTIVITY WATT/M-K | VISCOSITY CP | THERMAL CONDUCTIVITY WATT/M-K | SURFACE TENSION DYNE/CM |
| 1 | 0.01034 | 0.01892 | 0.20880 | 0.17764 | 17.6435 |
| 2 | 0.01034 | 0.01888 | 0.20868 | 0.17759 | 17.6326 |
| 3 | 0.01033 | 0.01888 | 0.20859 | 0.17756 | 17.6253 |
| 4 | 0.01033 | 0.01889 | 0.20852 | 0.17753 | 17.6184 |
| 5 | 0.01033 | 0.01890 | 0.20046 | 0.17749 | 17.6105 |

TABLE 13-continued

Two Tower Process (FIG. 2)
Demethanizer Tower Profiles

| 6 | 0.01032 | 0.01891 | 0.20034 | 0.17745 | 17.6004 |
| 7 | 0.01031 | 0.01893 | 0.20017 | 0.17737 | 17.5847 |
| 8 | 0.01031 | 0.01892 | 0.19975 | 0.17716 | 17.5449 |
| 9 | 0.01035 | 0.01876 | 0.19789 | 0.17614 | 17.3579 |
| 10 | 0.01074 | 0.01772 | 0.18914 | 0.17104 | 16.4346 |

TABLE 14

Three Tower Process (FIG. 3)
Stream Properties

| Stream | | 4 | 9 | 17 | 18 |
|---|---|---|---|---|---|
| Name | | PLANT INLET | ERROR | WARM RAW GAS | COOL RAW GAS |
| Vapour frac. | | 1.0000 | — | 1.0000 | 0.9031 |
| Temperature | F. | 69.9355 | — | 69.9355 | −57.3960 |
| Pressure | Psia | 912.9997 | — | 912.9997 | 897.9997 |
| Molar Flow | Lbmole/hr | 656.4217 | 0.0455 | 99.9999 * | 99.9999 |
| Mass Flow | Lb/hr | 12215.2314 | −0.5766 | 1860.8795 | 1860.8795 |
| Volume Flow | Barrel/Day | 2529.8782 | 0.0826 | 385.4040 | 385.4040 |
| Enthalpy | Btu/hr | 2.46251E+06 | — | 375141.1875 | 179007.8281 |

| Stream | | 20 | 21 | 23 | 24 |
|---|---|---|---|---|---|
| Name | | WARM RAW GAS | COOL RAW GAS | CHILLED RAW | CHILLED RAW |
| Vapour frac. | | 1.0000 | 0.9861 | 0.9640 | 0.9574 |
| Temperature | F. | 69.9355 | −9.1004 | −31.8409 | −36.2363 |
| Pressure | Psia | 912.9997 | 902.9997 | 897.9997 | 897.9997 |
| Molar Flow | Lbmole/hr | 556.4218 | 556.4218 | 556.4218 | 656.4217 |
| Mass Flow | Lb/hr | 10354.3516 | 10354.3516 | 10354.3516 | 12215.2314 |
| Volume Flow | Barrel/Day | 2144.4741 | 2144.4741 | 2144.4741 | 2529.8782 |
| Enthalpy | Btu/hr | 2.08736E+06 | 1.51253E+06 | 1.29993E+06 | 1.47894E+06 |

| Stream | | 25 | 26 | 27 | 30 |
|---|---|---|---|---|---|
| Name | | COLD RAW GAS | COLD RAW GAS | GAS FRAC INL | GAS FRAC LIQ |
| Vapour frac. | | 0.0000 | 0.7743 | 0.7602 | 0.0000 * |
| Temperature | F. | −67.4425 | −74.0000 * | −107.3899 | −110.4128 * |
| Pressure | Psia | 892.9997 | 887.9998 | 519.9998 * | 519.9998 * |
| Molar Flow | Lbmole/hr | 656.4217 | 656.4217 | 656.4217 | 238.9932 * |
| Mass Flow | Lb/hr | 12215.2314 | 12215.2314 | 12215.2314 | 5356.3555 |
| Volume Flow | Barrel/Day | 2529.8782 | 2529.8782 | 2529.8782 | 1015.5453 |
| Enthalpy | Btu/hr | 944303.0625 | 850510.7500 | 850510.7500 | −224713.2188 |

| Stream | | 31 | 32 | 33 | 34 |
|---|---|---|---|---|---|
| Name | | SUBCOOLD LIQ | ECON INLET | ECON OUTLET | CONDENSER IN |
| Vapour frac. | | 0.0000 | 0.2884 | 0.0000 | 0.1630 |
| Temperature | F. | −127.4152 | −178.4724 | −163.5756 * | −196.8716 |
| Pressure | Psia | 509.9998 | 132.0000 * | 133.0000 * | 50.0000 |
| Molar Flow | Lbmole/hr | 238.9932 | 238.9932 | 142.6576 * | 142.6576 |
| Mass Flow | Lb/hr | 5356.3555 | 5356.3555 | 4075.0251 | 4075.0251 |
| Volume Flow | Barrel/Day | 1015.5453 | 1015.5453 | 681.8607 | 681.8607 |
| Enthalpy | Btu/hr | −298003.4063 | −298003.4063 | −429011.8750 | −429011.8750 |

| Stream | | 35 | 37 | 38 | 39 |
|---|---|---|---|---|---|
| Name | | DC1 FEED | C2+ LIQUID | C2+ LIQUID | C2+ LIQUID |
| Vapour frac. | | 0.5103 | 0.0000 | 0.0000 | 0.0000 |
| Temperature | F. | −145.4947 | −87.2529 * | −78.6350 | 60.0000 * |
| Pressure | Psia | 40.0000 * | 41.0000 * | 899.9997 * | 894.9997 |
| Molar Flow | Lbmole/hr | 142.6576 | 63.2049 * | 63.2049 | 63.2049 |
| Mass Flow | Lb/hr | 4075.0251 | 2487.6819 | 2487.6819 | 2487.6819 |
| Volume Flow | Barrel/Day | 681.8607 | 371.0230 | 371.0230 | 371.0230 |
| Enthalpy | Btu/hr | −133393.2188 | −232856.2969 | −216540.4375 | −20407.1055 |

| Stream | | 4 | 9 | 17 | 18 |
|---|---|---|---|---|---|
| Name | | PLANT INLET | ERROR | WARM RAW GAS | COOL RAW GAS |
| Vapour frac. | | 1.0000 | — | 1.0000 | 0.9031 |
| Temperature | C. | 21.0753 | — | 21.0753 | −49.6645 |
| Pressure | Kpa a | 6294.9131 | — | 6294.9131 | 6191.4917 |
| Molar Flow | Kgmole/hr | 297.7482 | 0.0207 | 45.3592 * | 45.3592 |
| Mass Flow | Kg/hr | 5540.7427 | −0.2616 | 844.0818 | 844.0818 |
| Volume Flow | M3/hr | 16.7591 | 0.0005 | 2.5531 | 2.5531 |
| Enthalpy | KJ/hr | 2.59635E+06 | — | 395530.7813 | 188737.2344 |

| Stream | | 20 | 21 | 23 | 24 |
|---|---|---|---|---|---|
| Name | | WARM RAW GAS | COOL RAW GAS | CHILLED RAW | CHILLED RAW |
| Vapour frac. | | 1.0000 | 0.9861 | 0.9640 | 0.9574 |
| Temperature | C. | 21.0753 | −22.8336 | −35.4672 | −37.9090 |
| Pressure | Kpa a | 6294.9131 | 6225.9653 | 6191.4917 | 6191.4917 |
| Molar Flow | Kgmole/hr | 252.3890 | 252.3890 | 252.3890 | 297.7482 |
| Mass Flow | Kg/hr | 4696.6606 | 4696.6606 | 4696.6606 | 5540.7427 |
| Volume Flow | M3/hr | 14.2060 | 14.2060 | 14.2060 | 16.7591 |

TABLE 14-continued
Three Tower Process (FIG. 3)
Stream Properties

| Enthalpy | KJ/hr | 2.20082E+06 | 1.59473E+06 | 1.37059E+06 | 1.55932E+06 |
|---|---|---|---|---|---|
| Stream | | 25 | 26 | 27 | 30 |
| Name | | COLD RAW GAS | COLD RAW GAS | GAS FRAC INL | GAS FRAC LIQ |
| Vapour frac. | | 0.0000 | 0.7743 | 0.7602 | 0.0000 * |
| Temperature | C. | −55.2459 | −58.8889 * | −77.4388 | −79.1182 * |
| Pressure | Kpa a | 6157.0181 | 6122.5444 | 3585.2734 * | 3585.2734 * |
| Molar Flow | Kgmole/hr | 297.7482 | 297.7482 | 297.7482 | 108.4056 * |
| Mass Flow | Kg/hr | 5540.7427 | 5540.7427 | 5540.7427 | 2429.6050 |
| Volume Flow | M3/hr | 16.7591 | 16.7591 | 16.7591 | 6.7275 |
| Enthalpy | KJ/hr | 995627.6250 | 896737.5625 | 896737.5625 | −236926.7813 |
| Stream | | 31 | 32 | 33 | 34 |
| Name | | SUBCOOLD LIQ | ECON INLET | ECON OUTLET | CONDENSER IN |
| Vapour frac. | | 0.0000 | 0.2884 | 0.0000 | 0.1630 |
| Temperature | C. | −88.5640 | −116.9291 | −108.6531 * | −127.1509 |
| Pressure | Kpa a | 3516.3259 | 910.1079 * | 917.0026 * | 344.7379 |
| Molar Flow | Kgmole/hr | 108.4056 | 108.4056 | 64.7085 * | 64.7085 |
| Mass Flow | Kg/hr | 2429.6050 | 2429.6050 | 1848.4026 | 1848.4026 |
| Volume Flow | M3/hr | 6.7275 | 6.7275 | 4.5170 | 4.5170 |
| Enthalpy | KJ/hr | −314200.4375 | −314200.4375 | −452329.4375 | −452329.4375 |
| Stream | | 35 | 37 | 38 | 39 |
| Name | | DC1 FEED | C2+ LIQUID | C2+ LIQUID | C2+ LIQUID |
| Vapour frac. | | 0.5103 | 0.0000 | 0.0000 | 0.0000 |
| Temperature | C. | −98.6082 | −66.2516 * | −61.4639 | 15.5556 * |
| Pressure | Kpa a | 275.7903 * | 282.6850 * | 6205.2813 * | 6170.8076 |
| Molar Flow | Kgmole/hr | 64.7085 | 28.6693 * | 28.6693 | 28.6693 |
| Mass Flow | Kg/hr | 1848.4026 | 1128.3949 | 1128.3949 | 1128.3949 |
| Volume Flow | M3/hr | 4.5170 | 2.4578 | 2.4578 | 2.4578 |
| Enthalpy | KJ/hr | −140643.3750 | −245512.4531 | −228309.7969 | −21516.2676 |
| Stream | | 40 | 41 | 42 | 43 |
| Name | | RICH REC GAS | RICH REC GAS | RICH REC GAS | RICH REC GAS |
| Vapour frac. | | 1.0000 | 1.0000 | 1.0000 | 1.0000 |
| Temperature | C. | −98.3559 * | −88.7562 | 32.2222 * | 154.8530 |
| Pressure | Kpa a | 275.7903 * | 262.0008 | 248.2112 | 992.8450 |
| Molar Flow | Kgmole/hr | 36.0382 * | 36.0382 | 36.0382 | 36.0382 |
| Mass Flow | Kg/hr | 720.5903 | 720.5903 | 720.5903 | 720.5903 |
| Volume Flow | M3/hr | 2.0596 | 2.0596 | 2.0596 | 2.0596 |
| Enthalpy | KJ/hr | 204204.8438 | 216567.0000 | 375997.0938 | 558298.7500 |
| Stream | | 44 | 47 | 48 | 50 |
| Name | | RICH REC GAS | RICH REC GAS | ECON INLET | LEAN REC GAS |
| Vapour frac. | | 1.0000 | 1.0000 | 1.0000 | 1.0000 |
| Temperature | C. | 51.6667 * | −63.2283 | −63.5434 | −116.6819 * |
| Pressure | Kpa a | 972.1607 | 944.5817 | 917.0026 * | 910.1079 * |
| Molar Flow | Kgmole/hr | 36.0382 | 36.0382 | 36.0382 | 79.7354 * |
| Mass Flow | Kg/hr | 720.5903 | 720.5903 | 720.5903 | 1301.7927 |
| Volume Flow | M3/hr | 2.0596 | 2.0596 | 2.0596 | 4.2701 |
| Enthalpy | KJ/hr | 398264.5313 | 238834.4531 | 238834.4531 | 376987.2500 |
| Stream | | 51 | 52 | 53 | 54 |
| Name | | LEAN REC GAS | LEAN REC GAS | LEAN REC GAS | LEAN REC GAS |
| Vapour frac. | | 1.0000 | 1.0000 | 1.0000 | 1.0000 |
| Temperature | C. | −88.7562 | 32.2222 * | 172.1851 | 43.3333 * |
| Pressure | Kpa a | 889.4236 | 868.7394 | 3730.0637 | 3702.4846 |
| Molar Flow | Kgmole/hr | 79.7354 | 79.7354 | 79.7354 | 79.7354 |
| Mass Flow | Kg/hr | 1301.7927 | 1301.7927 | 1301.7927 | 1301.7927 |
| Volume Flow | M3/hr | 4.2701 | 4.2701 | 4.2701 | 4.2701 |
| Enthalpy | KJ/hr | 460240.8438 | 807988.8125 | 1.23575E+06 | 803972.8750 |
| Stream | | 55 | 56 | 57 | 58 |
| Name | | LEAN REC GAS | LEAN REC GAS | LEAN REC GAS | LEAN REC GAS |
| Vapour frac. | | 1.0000 | 1.0000 | 1.0000 | 0.7506 |
| Temperature | C. | −61.0147 | −61.2540 | −85.9784 | −89.9250 |
| Pressure | Kpa a | 3674.9055 | 3647.3264 | 3612.8525 | 3578.3787 * |
| Molar Flow | Kgmole/hr | 79.7354 | 79.7354 | 79.7354 | 79.7354 |
| Mass Flow | Kg/hr | 1301.7927 | 1301.7927 | 1301.7927 | 1301.7927 |
| Volume Flow | M3/hr | 4.2701 | 4.2701 | 4.2701 | 4.2701 |
| Enthalpy | KJ/hr | 456224.9063 | 456224.9063 | 342542.8438 | 246927.0625 |
| Stream | | 60 | 61 | 62 | 63 |
| Name | | RESIDUE GAS | RESIDUE GAS | RESIDUE GAS | RESIDUE GAS |
| Vapour frac. | | 1.0000 * | 1.0000 | 1.0000 | 1.0000 |
| Temperature | C. | −91.3418 * | −88.7562 | −83.0648 | −40.0000 * |
| Pressure | Kpa a | 3537.0103 * | 3509.4312 | 3481.8521 | 3447.3782 |
| Molar Flow | Kgmole/hr | 269.0583 * | 269.0583 | 269.0583 | 269.0583 |
| Mass Flow | Kg/hr | 4412.6094 | 4412.6094 | 4412.6094 | 4412.6094 |
| Volume Flow | M3/hr | 14.3007 | 14.3007 | 14.3007 | 14.3007 |

TABLE 14-continued

Three Tower Process (FIG. 3)
Stream Properties

| Enthalpy | KJ/hr | 1.06364E+06 | 1.14091E+06 | 1.25460E+06 | 1.81830E+06 |
|---|---|---|---|---|---|
| Stream | | 64 | 66 | 68 | |
| Name | | RESIDUE GAS | RESIDUE GAS | RESIDUE GAS | |
| Vapour frac. | | 1.0000 | 1.0000 | 1.0000 | |
| Temperature | C. | 15.5556 * | 103.2331 | 48.8889 * | |
| Pressure | Kpa a | 3412.9043 | 8397.8135 | 8363.3398 * | |
| Molar Flow | Kgmole/hr | 269.0583 | 269.0583 | 269.0583 | |
| Mass Flow | Kg/hr | 4412.6094 | 4412.6094 | 4412.6094 | |
| Volume Flow | M3/hr | 14.3007 | 14.3007 | 14.3007 | |
| Enthalpy | KJ/hr | 2.42438E+06 | 3.22616E+06 | 2.58199E+06 | |

TABLE 15
THREE Tower Process (FIG. 3)
Exchanger Duties and Compressor Power

| Stream | | 70 | 71 | 73 | 74 |
|---|---|---|---|---|---|
| Name | | WARM GAS/GAS | RAW CHILLER | SUBCOOLER | CONDENSER |
| Enthalpy | KJ/hr | 606083.2500 | 224148.2188 | 77273.6406 | 311686.0625 * |
| Stream | | 75 | 76 | 77 | 78 |
| Name | | CRYOGEN CHIL | COLD RICH RG | WARM RICH RG | RICH CHILLER |
| Enthalpy | KJ/hr | 113682.0703 | 12362.1523 | 159430.0781 | 0.0000 * |
| Stream | | 79 | 82 | 83 | 84 |
| Name | | DC1 REBOILER | SALES COOLER | RICH COOLER | LEAN COOLER |
| Enthalpy | KJ/hr | 98890.0703 * | 644174.8750 | 160034.2188 | 431783.6250 |
| Stream | | 85 | 86 | 87 | 92 |
| Name | | LIQ/GAS DUTY | COLD GAS/GAS | RICH CHILLER | SALES COMP |
| Enthalpy | KJ/hr | 206793.5313 | 563700.3125 | 0.0000 * | 801782.8125 |
| Stream | | 93 | 94 | 95 | 96 |
| Name | | RICH REC COM | LEAN REC COM | C2+ PUMP | COLD LEAN RG |
| Enthalpy | KJ/hr | 182301.6563 | 427767.7188 | 17202.6504 | 83253.6094 |
| Stream | | 97 | 98 | | |
| Name | | WARM LEAN RG | CRYOGEN COND | | |
| Enthalpy | KJ/hr | 347748.0000 | 95615.7656 | | |

TABLE 16
Three Tower Process (FIG. 3)
Material Balance

| Stream | | 4 | 37 | 60 | 9 |
|---|---|---|---|---|---|
| Name | | PLANT INLET | C2+ LIQUID | RESIDUE GAS | ERROR |
| Vapour frac. | | 1.0000 | 0.0000 | 1.0000 * | — |
| Temperature | C. | 21.0753 | −66.2516 * | −91.3418 * | — |
| Pressure | Kpa a | 6294.9131 | 282.6850 * | 3537.0103 * | — |
| Molar Flow | Kgmole/hr | 297.7482 | 28.6693 * | 269.0583 * | 0.0207 |
| Mass Flow | Kg/hr | 5540.7427 | 1128.3949 | 4412.6094 | −0.2616 |
| Volume Flow | M3/hr | 16.7591 | 2.4578 | 14.3007 | 0.0005 |
| Enthalpy | KJ/hr | 2.59635E+06 | −245512.4531 | 1.06364E+06 | — |
| Density | Kg/m3 | 57.4469 | 613.1561 | 71.2335 | — |
| Mole Wt. | | 18.6088 | 39.3590 | 16.4002 | −12.6599 |
| Spec. Heat | KJ/Kgmole-C. | 48.9815 | 82.9568 | 103.8304 | — |
| Therm Cond | Watt/m-K. | 0.0406 | 0.1561 | 0.0313 | — |
| Viscosity | Cp | 0.0130 | 0.2184 | 0.0093 | — |
| Sur Tension | Dyne/cm | — | 16.8615 | — | — |
| Std Density | Kg/m3 | — | 488.8882 | — | — |
| Z Factor | | 0.8335 | 0.0105 | 0.5387 | — |
| N2 | Kgmole/hr | 5.0123 | 0.0000 * | 5.0122 * | 0.0002 |
| CO2 | Kgmole/hr | 3.4056 | 2.2396 * | 1.1779 * | −0.0118 |
| Methane | Kgmole/hr | 262.8470 | 0.1543 * | 262.6423 * | 0.0504 |
| Ethane | Kgmole/hr | 15.6641 | 15.4553 * | 0.2259 * | −0.0172 |
| Propane | Kgmole/hr | 6.8591 | 6.8598 * | 0.0000 * | −0.0008 |
| i-Butane | Kgmole/hr | 1.0422 | 1.0422 * | 0.0000 * | −0.0000 |
| n-Butane | Kgmole/hr | 1.4193 | 1.4193 * | 0.0000 * | −0.0000 |
| i-Pentan | Kgmole/hr | 0.5360 | 0.5360 * | 0.0000 * | −0.0000 |
| n-Pentan | Kgmole/hr | 0.4764 | 0.4764 * | 0.0000 * | −0.0000 |
| n-Hexane | Kgmole/hr | 0.3374 | 0.3374 * | 0.0000 * | −0.0000 |
| n-Heptan | Kgmole/hr | 0.1488 | 0.1488 * | 0.0000 * | 0.0000 |
| Total | Kgmole/hr | 297.7482 | 28.6693 * | 269.0583 * | 0.0207 |
| Stream | | 48 | 58 | 32 | 35 |
| Name | | ECON INLET | LEAN REC GAS | ECON INLET | DC1 FEED |

TABLE 16-continued

Three Tower Process (FIG. 3)
Material Balance

| | | | | | |
|---|---|---|---|---|---|
| Vapour frac. | | 1.0000 | 0.7506 | 0.2884 | 0.5103 |
| Temperature | C. | −63.5434 | −89.9250 | −116.9291 | −98.6082 |
| Pressure | Kpa a | 917.0026 * | 3578.3787 * | 910.1079 * | 275.7903 * |
| Molar Flow | Kgmole/hr | 36.0382 | 79.7354 | 108.4056 | 64.7085 |
| Mass Flow | Kg/hr | 720.5903 | 1301.7927 | 2429.6050 | 1848.4026 |
| Volume Flow | M3/hr | 2.0596 | 4.2701 | 6.7275 | 4.5170 |
| Enthalpy | KJ/hr | 238834.4531 | 246927.0625 | −314200.4375 | −140643.3750 |
| Density | Kg/m3 | 11.4031 | 87.2113 | 57.6247 | 10.9260 |
| Mole Wt. | | 19.9952 | 16.3264 | 22.4122 | 28.5651 |
| Spec. Heat | KJ/Kgmole-C. | 37.5708 | 115.2043 | 56.6370 | 54.3779 |
| Therm Cond | Watt/m-K. | 0.0231 | — | — | — |
| Viscosity | Cp | 0.0084 | — | — | — |
| Sur Tension | Dyne/cm | — | — | — | — |
| Std Density | Kg/m3 | — | — | — | — |
| Z Factor | | 0.9226 | — | — | — |
| N2 | Kgmole/hr | 0.0002 | 0.4903 | 0.4903 | 0.0002 |
| CO2 | Kgmole/hr | 2.8730 | 0.3416 | 2.5692 | 5.1006 |
| Methane | Kgmole/hr | 28.8661 | 78.4042 | 78.5895 | 29.0513 |
| Ethane | Kgmole/hr | 4.1770 | 0.4872 | 15.9253 | 19.6151 |
| Propane | Kgmole/hr | 0.1174 | 0.0116 | 6.8706 | 6.9764 |
| i-Butane | Kgmole/hr | 0.0027 | 0.0002 | 1.0424 | 1.0449 |
| n-Butane | Kgmole/hr | 0.0016 | 0.0001 | 1.4195 | 1.4210 |
| i-Pentan | Kgmole/hr | 0.0001 | 0.0000 | 0.5360 | 0.5361 |
| n-Pentan | Kgmole/hr | 0.0000 | 0.0000 | 0.4764 | 0.4765 |
| n-Hexane | Kgmole/hr | 0.0000 | 0.0000 | 0.3374 | 0.3374 |
| n-Heptan | Kgmole/hr | 0.0000 | 0.0000 | 0.1488 | 0.1488 |
| Total | Kgmole/hr | 36.0382 | 79.7354 | 108.4056 | 64.7085 |

TABLE 17

Three Tower Process (FIG. 3)
Stream Compositions

| Stream | | 4 | 37 | 60 |
|---|---|---|---|---|
| Name | | PLANT INLET | C2+ LIQUID | RESIDUE GAS |
| Vapour frac. | | 1.0000 | 0.0000 | 1.0000 * |
| Temperature | C. | 21.0753 | −66.2516 * | −91.3418 * |
| Pressure | Kpa a | 6294.9131 | 282.6850 * | 3537.0103 * |
| Molar Flow | Kgmole/hr | 297.7482 | 28.6693 * | 269.0583 * |
| Mass Flow | Kg/hr | 5540.7427 | 1128.3949 | 4412.6094 |
| Volume Flow | M3/hr | 16.7591 | 2.4578 | 14.3007 |
| Enthalpy | KJ/hr | 2.59635E+06 | −245512.4531 | 1.06364E+06 |
| Density | Kg/m3 | 57.4469 | 613.1561 | 71.2335 |
| Mole Wt. | | 18.6088 | 39.3590 | 16.4002 |
| Spec. Heat | KJ/Kgmole-C. | 48.9815 | 82.9568 | 103.8304 |
| Therm Cond | Watt/m-K. | 0.0406 | 0.1561 | 0.0313 |
| Viscosity | Cp | 0.0130 | 0.2184 | 0.0093 |
| Sur Tension | Dyne/cm | — | 16.8615 | — |
| Std Density | Kg/m3 | — | 488.8882 | — |
| Z Factor | | 0.8335 | 0.0105 | 0.5387 |
| N2 | | 0.0168 | 0.0000 * | 0.0186 * |
| CO2 | | 0.0114 | 0.0781 * | 0.0044 * |
| Methane | | 0.8828 | 0.0054 * | 0.9762 * |
| Ethane | | 0.0526 | 0.5391 * | 0.0008 * |
| Propane | | 0.0230 | 0.2393 * | 0.0000 * |
| i-Butane | | 0.0035 | 0.0364 * | 0.0000 * |
| n-Butane | | 0.0048 | 0.0495 * | 0.0000 * |
| i-Pentan | | 0.0018 | 0.0187 * | 0.0000 * |
| n-Pentan | | 0.0016 | 0.0166 * | 0.0000 * |
| n-Hexane | | 0.0011 | 0.0118 * | 0.0000 * |
| n-Heptan | | 0.0005 | 0.0052 * | 0.0000 * |

| Stream | | 48 | 58 | 32 | 35 |
|---|---|---|---|---|---|
| Name | | ECON INLET | LEAN REC GAS | ECON INLET | DC1 FEED |
| Vapour frac. | | 1.0000 | 0.7506 | 0.2884 | 0.5103 |
| Temperature | C. | −63.5434 | −89.9250 | −116.9291 | −98.6082 |
| Pressure | Kpa a | 917.0026 * | 3578.3787 * | 910.1079 * | 275.7903 * |
| Molar Flow | Kgmole/hr | 36.0382 | 79.7354 | 108.4056 | 64.7085 |
| Mass Flow | Kg/hr | 720.5903 | 1301.7927 | 2429.6050 | 1848.4026 |
| Volume Flow | M3/hr | 2.0596 | 4.2701 | 6.7275 | 4.5170 |
| Enthalpy | KJ/hr | 238834.4531 | 246927.0625 | −314200.4375 | −140643.3750 |
| Density | Kg/m3 | 11.4031 | 87.2113 | 57.6247 | 10.9260 |
| Mole Wt. | | 19.9952 | 16.3264 | 22.4122 | 28.5651 |
| Spec. Heat | KJ/Kgmole-C. | 37.5708 | 115.2043 | 56.6370 | 54.3779 |
| Therm Cond | Watt/m-K. | 0.0231 | — | — | — |
| Viscosity | Cp | 0.0084 | — | — | — |
| Sur Tension | Dyne/cm | — | — | — | — |
| Std Density | Kg/m3 | — | — | — | — |
| Z Factor | | 0.9226 | — | — | — |

TABLE 17-continued

Three Tower Process (FIG. 3)
Stream Compositions

| | | | | |
|---|---|---|---|---|
| N2 | 0.0000 | 0.0061 | 0.0045 | 0.0000 |
| CO2 | 0.0797 | 0.0043 | 0.0237 | 0.0788 |
| Methane | 0.8010 | 0.9833 | 0.7250 | 0.4490 |
| Ethane | 0.1159 | 0.0061 | 0.1469 | 0.3031 |
| Propane | 0.0033 | 0.0001 | 0.0634 | 0.1078 |
| i-Butane | 0.0001 | 0.0000 | 0.0096 | 0.0161 |
| n-Butane | 0.0000 | 0.0000 | 0.0131 | 0.0220 |
| i-Pentan | 0.0000 | 0.0000 | 0.0049 | 0.0083 |
| n-Pentan | 0.0000 | 0.0000 | 0.0044 | 0.0074 |
| n-Hexane | 0.0000 | 0.0000 | 0.0031 | 0.0052 |
| n-Heptan | 0.0000 | 0.0000 | 0.0014 | 0.0023 |

TABLE 18

Three Tower Process (FIG. 3)
Gas Fractionator Tower Profiles

Hyprotech's Process Simulator HYSIM - Licensed to Bob Stothers
Case Name MACUN30    Date 1980/ 1/ 1    Time 1:32:53
COMPUTED RESULTS

Feed Conditions

| Feed Stream Number | 58 | |
|---|---|---|
| Enters on stage | 4 | |
| Liquid Fraction | 0.2494 | |
| Temperature | −89.92 | C. |
| Pressure | 3578.38 | Kpa a |
| Flowrate | 79.74 | Kgmole/hr |
| Enthalpy | 246927. | KJ/hr |
| N2 | 0.4903 | Kgmole/hr |
| CO2 | 0.3416 | Kgmole/hr |
| Methane | 78.4042 | Kgmole/hr |
| Ethane | 0.4872 | Kgmole/hr |
| Propane | 0.0116 | Kgmole/hr |
| i-Butane | 0.0002 | Kgmole/hr |
| n-Butane | 0.0001 | Kgmole/hr |
| i-Pentan | 0.0000 | Kgmole/hr |
| n-Pentan | 0.0000 | Kgmole/hr |
| n-Hexane | 0.0000 | Kgmole/hr |
| n-Heptan | 0.0000 | Kgmole/hr |

| Feed Stream Number | 27 | |
|---|---|---|
| Enters on stage | 12 | |
| Liquid Fraction | 0.2398 | |
| Temperature | −77.44 | C. |
| Pressure | 3585.27 | Kpa a |
| Flowrate | 297.75 | Kgmole/hr |
| Enthalpy | 896738. | KJ/hr |
| N2 | 5.0123 | Kgmole/hr |
| CO2 | 3.4056 | Kgmole/hr |
| Methane | 262.8470 | Kgmole/hr |
| Ethane | 15.6641 | Kgmole/hr |
| Propane | 6.8591 | Kgmole/hr |
| i-Butane | 1.0422 | Kgmole/hr |
| n-Butane | 1.4193 | Kgmole/hr |
| i-Pentan | 0.5360 | Kgmole/hr |
| n-Pentan | 0.4764 | Kgmole/hr |
| n-Hexane | 0.3374 | Kgmole/hr |
| n-Heptan | 0.1488 | Kgmole/hr |

Hyprotech's Process Simulator HYSIM - Licensed to Bob Stothers
Case Name MACUN30    Date 1980/ 1/ 1    Time 1:33:17

Stage Variables

| Stage | Press Kpa | Temp Deg C. | Molar Flow Rates | | | Heat Duty GJ/Hour |
|---|---|---|---|---|---|---|
| | | | Liquid | Vapour | Feed | |
| 1 | 3537.01 | −91.342 | 84.11 | 269.06 | | −0.31169 |
| 2 | 3541.40 | −90.810 | 81.10 | 353.17 | | |
| 3 | 3545.79 | −90.437 | 78.50 | 350.16 | | |
| 4 | 3550.17 | −90.111 | 95.60 | 347.56 | 79.72 | |
| 5 | 3554.56 | −89.690 | 91.25 | 284.94 | | |
| 6 | 3558.95 | −89.095 | 86.38 | 280.59 | | |
| 7 | 3563.34 | −88.357 | 80.78 | 275.72 | | |
| 8 | 3567.72 | −87.442 | 74.41 | 270.12 | | |
| 9 | 3572.11 | −86.316 | 67.34 | 263.75 | | |
| 10 | 3576.50 | −84.945 | 59.04 | 256.69 | | |
| 11 | 3580.89 | −83.151 | 43.63 | 248.38 | | |
| 12 | 3585.27 | −79.118 | 108.41 | 232.97 | 297.75 | |

Hyprotech's Process Simulator HYSIM - Licensed to Bob Stothers

TABLE 18-continued

Three Tower Process (FIG. 3)
Gas Fractionator Tower Profiles

Case Name MACUN30  Date 1980/ 1/ 1  Time 1:34:16

Products

| | Vapour from Stage Kg Mol/Hour | 1 Mol Frc | Liquid from Stage Kg Mol/Hour | 12 Mol Frc |
|---|---|---|---|---|
| N2 | 5.012 | 0.01863 | 0.490 | 0.00452 |
| CO2 | 1.178 | 0.00438 | 2.569 | 0.02370 |
| Methane | 262.642 | 0.97615 | 78.589 | 0.72496 |
| Ethane | 0.226 | 0.00084 | 15.925 | 0.14691 |
| Propane | 0.000 | 0.00000 | 6.871 | 0.06338 |
| i-Butane | 0.000 | 0.00000 | 1.042 | 0.00962 |
| n-Butane | 0.000 | 0.00000 | 1.419 | 0.01309 |
| i-Pentan | 0.000 | 0.00000 | 0.536 | 0.00494 |
| n-Pentan | 0.000 | 0.00000 | 0.476 | 0.00439 |
| n-Hexane | 0.000 | 0.00000 | 0.337 | 0.00311 |
| n-Heptan | 0.000 | 0.00000 | 0.149 | 0.00137 |
| Total | 269.058 | | 108.406 | |

Hyprotech's Process Simulator HYSIM - Licensed to Bob Stothers
Case Name MACUN30  Date 1980/ 1/ 1  Time 1:35:34

PHYSICAL PROPERTIES

VAPOUR LEAVING FROM EACH STAGE

| STAGE | MOL WT | FLOW KG/HOUR | M ACMH | DENSITY KG/M3 | REDUCED TEMP | PRESS |
|---|---|---|---|---|---|---|
| 1 | 16.400 | 4413. | 0.062 | 70.92639 | 0.95642 | 0.76398 |
| 2 | 16.423 | 5800. | 0.082 | 70.55957 | 0.95713 | 0.76371 |
| 3 | 16.455 | 5762. | 0.082 | 70.29640 | 0.95810 | 0.76420 |
| 4 | 16.478 | 5727. | 0.082 | 70.05559 | 0.95911 | 0.76493 |
| 5 | 16.567 | 4720. | 0.068 | 69.80972 | 0.96048 | 0.76549 |
| 6 | 16.631 | 4666. | 0.067 | 69.33809 | 0.96212 | 0.76582 |
| 7 | 16.689 | 4602. | 0.067 | 68.67073 | 0.96432 | 0.76627 |
| 8 | 16.746 | 4523. | 0.067 | 67.79028 | 0.96723 | 0.76689 |
| 9 | 16.801 | 4431. | 0.066 | 66.68371 | 0.97102 | 0.76770 |
| 10 | 16.855 | 4327. | 0.066 | 65.33570 | 0.97590 | 0.76872 |
| 11 | 16.904 | 4199. | 0.066 | 63.48810 | 0.98301 | 0.77002 |
| 12 | 16.919 | 3942. | 0.067 | 58.82507 | 1.00336 | 0.77205 |

LIQUID LEAVING FROM EACH STAGE

| STAGE | MOL WT | FLOW KG/HOUR | M3/HR | DENSITY KG/M3 | REDUCED TEMP | PRESS |
|---|---|---|---|---|---|---|
| 1 | 16.495 | 1387. | 4.946 | 280.47753 | 0.94774 | 0.75888 |
| 2 | 16.635 | 1349. | 4.753 | 283.79282 | 0.94608 | 0.75776 |
| 3 | 16.746 | 1315. | 4.589 | 286.45455 | 0.94466 | 0.75755 |
| 4 | 16.835 | 1609. | 5.576 | 288.57886 | 0.94342 | 0.75782 |
| 5 | 17.044 | 1555. | 5.290 | 293.94449 | 0.94056 | 0.75661 |
| 6 | 17.254 | 1490. | 4.980 | 299.21650 | 0.93752 | 0.75554 |
| 7 | 17.483 | 1412. | 4.631 | 304.92027 | 0.93387 | 0.75474 |
| 8 | 17.744 | 1320. | 4.240 | 311.33508 | 0.92930 | 0.75428 |
| 9 | 18.047 | 1215. | 3.814 | 318.62769 | 0.92354 | 0.75421 |
| 10 | 18.420 | 1087. | 3.323 | 327.23580 | 0.91610 | 0.75468 |
| 11 | 19.037 | 830. | 2.436 | 340.92432 | 0.90359 | 0.75619 |
| 12 | 22.412 | 2430. | 5.990 | 405.54499 | 0.84179 | 0.76752 |

Hyprotech's Process Simulator HYSIM - Licensed to Bob Stothers
Case Name MACUN30  Date 1980/ 1/ 1  Time 1:37:50

TRANSPORT PROPERTIES

| | VAPOUR | | LIQUID | | |
|---|---|---|---|---|---|
| STAGE NO. | VISCOSITY CP | THERMAL CONDUCTIVITY WATT/M-K | VISCOSITY CP | THERMAL CONDUCTIVITY WATT/M-K | SURFACE TENSION DYNE/CM |
| 1 | 0.00933 | 0.03122 | 0.02989 | 0.08024 | 0.9722 |
| 2 | 0.00933 | 0.03120 | 0.03030 | 0.08080 | 1.0124 |
| 3 | 0.00933 | 0.03117 | 0.03066 | 0.08127 | 1.0484 |
| 4 | 0.00933 | 0.03115 | 0.03098 | 0.08167 | 1.0815 |
| 5 | 0.00934 | 0.03105 | 0.03165 | 0.08253 | 1.1523 |
| 6 | 0.00934 | 0.03098 | 0.03239 | 0.08348 | 1.2329 |
| 7 | 0.00934 | 0.03090 | 0.03331 | 0.08461 | 1.3352 |
| 8 | 0.00934 | 0.03080 | 0.03448 | 0.08599 | 1.4699 |
| 9 | 0.00935 | 0.03070 | 0.03598 | 0.08769 | 1.6476 |
| 10 | 0.00935 | 0.03059 | 0.03794 | 0.08981 | 1.8878 |
| 11 | 0.00935 | 0.03047 | 0.04134 | 0.09330 | 2.3149 |
| 12 | 0.00934 | 0.03026 | 0.06103 | 0.10972 | 4.7372 |

| | | | | | |
|---|---|---|---|---|---|
| Molar Flow | Kgmole/hr | 63.4545 | 52.7218 * | 0.7296 * | 10.7296 |
| Mass Flow | Kg/hr | 3008.2058 | 2040.1130 | 67.9293 | 967.9293 |
| Volume Flow | M3/hr | 5.7646 | 4.3169 | 1.4473 | 1.4473 |
| Enthalpy | KJ/hr | −30736.5313 | 793143.3750 | 295021.2188 | −12811.6641 |
| Stream | | 39 | | | |

TABLE 18-continued

Three Tower Process (FIG. 3)
Gas Fractionator Tower Profiles

| Name | | C5+ REID VP | | | |
|---|---|---|---|---|---|
| Vapour frac. | | 0.0000 * | | | |
| Temperature | C. | 37.7778 * | | | |
| Pressure | Kpa a | 81.1159 | | | |
| Molar Flow | Kgmole/hr | 10.7296 | | | |
| Mass Flow | Kg/hr | 967.9293 | | | |
| Volume Flow | M3/hr | 1.4473 | | | |
| Enthalpy | KJ/hr | −12811.6641 | | | |

| Stream | | 40 | 41 | 42 | 43 |
|---|---|---|---|---|---|
| Name | | LOW TEMP GAS | DEHY OUTLET | | |
| Vapour frac. | | 1.0000 | 1.0000 | 0.9311 | 0.8641 |
| Temperature | C. | −8.6641 | −8.7406 | −37.0000 * | −51.5500 |
| Pressure | Kpa a | 3880.0000 | 3870.0000 * | 3835.0000 | 3800.0000 |
| Molar Flow | Kgmole/hr | 608.9576 | 608.9576 | 608.9576 | 608.9576 |
| Mass Flow | Kg/hr | 11813.7881 | 11813.7881 | 11813.7881 | 11813.7881 |
| Volume Flow | M3/hr | 35.4232 | 35.4232 | 35.4232 | 35.4232 |
| Enthalpy | KJ/hr | 4.84553E+06 | 4.84553E+06 | 3.59587E+06 | 2.83075E+06 |

| Stream | | 44 | 50 | 51 | 52 |
|---|---|---|---|---|---|
| Name | | GAS FRAC IN | GAS FRAC LIQ | GAS FRAC LIQ | GAS FRAC LIQ |
| Vapour frac. | | 0.8650 | 0.0000 | 0.0000 | 0.4008 |
| Temperature | C. | −52.9688 | −53.1752 * | −68.2282 | −109.1413 |
| Pressure | Kpa a | 3600.0000 * | 3600.0000 * | 3550.0000 | 175.0000 |
| Molar Flow | Kgmole/hr | 608.9576 | 102.4116 | 102.4116 | 102.4116 |
| Mass Flow | Kg/hr | 11813.7881 | 3111.9280 | 3111.9280 | 3111.9280 |
| Volume Flow | M3/hr | 35.4232 | 7.5570 | 7.5570 | 7.5570 |
| Enthalpy | KJ/hr | 2.83075E+06 | −404555.0625 | −526802.1250 | −526802.1250 |

| Stream | | 53 | 54 | 55 | 56 |
|---|---|---|---|---|---|
| Name | | DC2 FEED | DC2 OVERHEAD | | DC2 RECYCLE |
| Vapour frac. | | 0.6780 | 1.0000 * | 1.0000 | 1.0000 |
| Temperature | C. | −71.2590 | −70.7176 * | −40.0000 * | 35.0000 * |
| Pressure | Kpa a | 140.0000 * | 140.0000 * | 130.0000 | 120.0000 |
| Molar Flow | Kgmole/hr | 102.4116 | 71.8124 * | 71.8124 | 71.8124 |
| Mass Flow | Kg/hr | 3111.9280 | 1670.0835 | 1670.0835 | 1670.0835 |
| Volume Flow | M3/hr | 7.5570 | 4.7552 | 4.7552 | 4.7552 |
| Enthalpy | KJ/hr | 116865.1797 | 505050.1250 | 593723.0000 | 827100.1875 |

| Stream | | 57 | 58 | 59 | 60 |
|---|---|---|---|---|---|
| Name | | LPG PRODUCT | LPG PRODUCT | LPG PRODUCT | LPG REID VP |
| Vapour frac. | | 0.0001 | 0.0000 | 0.0000 | 0.0000 * |
| Temperature | C. | −43.8084 * | −42.6757 | 37.7988 | 37.7778 * |
| Pressure | Kpa a | 147.0000 * | 1520.0000 | 1470.0000 * | 1397.7695 |
| Molar Flow | Kgmole/hr | 30.5992 * | 30.5992 | 30.5992 | 30.5992 |
| Mass Flow | Kg/hr | 1441.8444 | 1441.8444 | 1441.8444 | 1441.8444 |
| Volume Flow | M3/hr | 2.8018 | 2.8018 | 2.8018 | 2.8018 |
| Enthalpy | KJ/hr | −274486.0313 | −269300.9688 | 11026.9502 | 11026.9502 |

| Stream | | 61 | 62 | 63 | 64 |
|---|---|---|---|---|---|
| Name | | RESIDUE GAS | RESIDUE GAS | RESIDUE GAS | |
| Vapour frac. | | 0.9999 | 1.0000 | 1.0000 | 1.0000 |
| Temperature | C. | −71.2282 * | −67.2484 | −40.0000 * | 35.0000 * |
| Pressure | Kpa a | 3550.0000 * | 3525.0000 | 3490.0000 | 3455.0000 |
| Molar Flow | Kgmole/hr | 506.5427 * | 506.5427 | 506.5427 | 506.5427 |
| Mass Flow | Kg/hr | 8701.7588 | 8701.7588 | 8701.7588 | 8701.7588 |
| Volume Flow | M3/hr | 27.8659 | 27.8659 | 27.8659 | 27.8659 |
| Enthalpy | KJ/hr | 2.59148E+06 | 2.71373E+06 | 3.39018E+06 | 4.98767E+06 |

| Stream | | 65 | 66 | 67 | |
|---|---|---|---|---|---|
| Name | | O SUCTION | 3RD DISCHARG | LES GAS | |
| Vapour frac. | | 1.0000 | 1.0000 | 1.0000 | |
| Temperature | C. | 35.0000 | 121.9936 | 48.0000 * | |
| Pressure | Kpa a | 3455.0000 | 8388.3398 * | 8353.3398 | |
| Molar Flow | Kgmole/hr | 494.5427 | 494.5427 | 494.5427 | |
| Mass Flow | Kg/hr | 8495.6143 | 8495.6143 | 8495.6143 | |
| Volume Flow | M3/hr | 27.2058 | 27.2058 | 27.2058 | |
| Enthalpy | KJ/hr | 4.86951E+06 | 6.41811E+06 | 4.72939E+06 | |

TABLE 19

Three Tower Process (FIG. 3)

Hyprotech's Process Simulator HYSIM - Licensed to Bob Stothers
Case Name MACUN30  Date 1980/1/1  Time 1:43:38
COMPUTED RESULTS

| Feed Conditions | |
|---|---|
| Feed Stream Number | 32 |

TABLE 19-continued

Three Tower Process (FIG. 3)

| | | |
|---|---|---|
| Enters on stage | 1 | |
| Liquid Fraction | 0.7116 | |
| Temperature | −116.93 | C |
| Pressure | 910.11 | Kpa a |
| Flowrate | 108.41 | Kgmole/hr |
| Enthalpy | −314200. | KJ/hr |
| N2 | 0.4903 | Kgmole/hr |
| CO2 | 2.5692 | Kgmole/hr |
| Methane | 78.5895 | Kgmole/hr |
| Ethane | 15.9253 | Kgmole/hr |
| Propane | 6.8706 | Kgmole/hr |
| i-Butane | 1.0424 | Kgmole/hr |
| n-Butane | 1.4195 | Kgmole/hr |
| i-Pentan | 0.5360 | Kgmole/hr |
| n-Pentan | 0.4764 | Kgmole/hr |
| n-Hexane | 0.3374 | Kgmole/hr |
| n-Heptan | 0.1488 | Kgmole/hr |

| | | |
|---|---|---|
| Feed Stream Number | 48 | |
| Enters on stage | 3 | |
| Liquid Fraction | 0.0000 | |
| Temperature | −63.54 | C |
| Pressure | 917.00 | Kpa a |
| Flowrate | 36.04 | Kgmole/hr |
| Enthalpy | 238834. | KJ/hr |
| N2 | 0.0002 | Kgmole/hr |
| CO2 | 2.8730 | Kgmole/hr |
| Methane | 28.8661 | Kgmole/hr |
| Ethane | 4.1770 | Kgmole/hr |
| Propane | 0.1174 | Kgmole/hr |
| i-Butane | 0.0027 | Kgmole/hr |
| n-Butane | 0.0016 | Kgmole/hr |
| i-Pentan | 0.0001 | Kgmole/hr |
| n-Pentan | 0.0000 | Kgmole/hr |
| n-Hexane | 0.0000 | Kgmole/hr |
| n-Heptan | 0.0000 | Kgmole/hr |

Hyprotech's Process Simulator HYSIM - Licensed to Bob Stothers
Case Name MACUN30   Date 1980/1/1   Time 1:44:0

Stage Variables

| Stage | Press Kpa | Temp Deg C. | Molar Flow Rates | | | Heat Duty GJ/Hour |
|---|---|---|---|---|---|---|
| | | | Liquid | Vapour | Feed | |
| 1 | 910.11 | −116.682 | 77.03 | 79.74 | 108.41 | |
| 2 | 913.56 | −115.721 | 75.09 | 48.36 | | |
| 3 | 917.00 | −108.653 | 64.71 | 46.42 | 36.04 | |

Hyprotech's Process Simulator HYSIM - Licensed to Bob Stothers
Case Name MACUN30   Date 1980/1/1   Time 1:44:28

Products

| | Vapour from Stage Kg Mol/Hour | 1 Mol Frc | Liquid from Stage Kg Mol/Hour | 3 Mol Frc |
|---|---|---|---|---|
| N2 | 0.490 | 0.00615 | 0.000 | 0.00000 |
| CO2 | 0.342 | 0.00428 | 5.101 | 0.07882 |
| Methane | 78.404 | 0.98331 | 29.051 | 0.44896 |
| Ethane | 0.487 | 0.00611 | 19.615 | 0.30313 |
| Propane | 0.012 | 0.00015 | 6.976 | 0.10781 |
| i-Butane | 0.000 | 0.00000 | 1.045 | 0.01615 |
| n-Butane | 0.000 | 0.00000 | 1.421 | 0.02196 |
| i-Pentan | 0.000 | 0.00000 | 0.536 | 0.00828 |
| n-Pentan | 0.000 | 0.00000 | 0.476 | 0.00736 |
| n-Hexane | 0.000 | 0.00000 | 0.337 | 0.00521 |
| n-Heptan | 0.000 | 0.00000 | 0.149 | 0.00230 |
| Total | 79.735 | | 64.708 | |

Hyprotech's Process Simulator HYSIM - Licensed to Bob Stothers
Case Name MACUN30   Date 1980/1/1   Time 1:45:39

PHYSICAL PROPERTIES

VAPOUR LEAVING FROM EACH STAGE

| STAGE | MOL WT | FLOW KG/HOUR | M ACMH | DENSITY KG/M3 | REDUCED TEMP | PRESS |
|---|---|---|---|---|---|---|
| 1 | 16.326 | 1302. | 0.098 | 13.26088 | 0.81699 | 0.19588 |
| 2 | 16.300 | 788. | 0.060 | 13.19365 | 0.81963 | 0.19620 |
| 3 | 16.673 | 774. | 0.061 | 12.76733 | 0.84739 | 0.19575 |

LIQUID LEAVING FROM EACH STAGE

| STAGE | MOL WT | FLOW KG/HOUR | M3/HR | DENSITY KG/M3 | REDUCED TEMP | PRESS |
|---|---|---|---|---|---|---|
| 1 | 24.875 | 1916. | 3.723 | 514.63485 | 0.63418 | 0.19415 |
| 2 | 25.327 | 1902. | 3.645 | 521.70944 | 0.63123 | 0.19412 |

TABLE 19-continued
Three Tower Process (FIG. 3)

| | | | | | |
|---|---|---|---|---|---|
| 3 | 28.565 | 1848. | 3.254 | 567.91168 | 0.61117 | 0.19017 |

Hyprotech's Process Simulator HYSIM - Licensed to Bob Stothers
Case Name MACUN30  Date 1980/1/1  Time 1:46:33
TRANSPORT PROPERTIES

| | VAPOUR | | LIQUID | | |
|---|---|---|---|---|---|
| STAGE NO. | VISCOSITY CP | THERMAL CONDUCTIVITY WATT/M-K | VISCOSITY CP | THERMAL CONDUCTIVITY WATT/M-K | SURFACE TENSION DYNE/CM |
| 1 | 0.00652 | 0.02041 | 0.14018 | 0.16750 | 13.1410 |
| 2 | 0.00654 | 0.02050 | 0.14398 | 0.16840 | 13.3990 |
| 3 | 0.00679 | 0.02093 | 0.17315 | 0.17365 | 15.2267 |

TABLE 20
Three TowerPProcess (FIG. 3)
Demethanizer Tower Profiles

```
I don't understand TABLE in the current context
type ? or ?? for more information
I don't understand 20: in the current context
type ? or ?? for more information
I don't understand THREE in the current context
type ? or ?? for more information
I don't understand TOWER in the current context
type ? or ?? for more information
I don't understand PROCESS in the current context
type ? or ?? for more information
I don't understand (FIGURE in the current context
type ? or ?? for more information
Enter a COLUMN command
```

Hyprotech's Process Simulator HYSIM - Licensed to Bob Stothers
Case Name MACUN30  Date 1980/1/1  Time 0:9:2
COMPUTED RESULTS

Feed Conditions

| Feed Stream Number | 35 | |
|---|---|---|
| Enters on stage | 1 | |
| Liquid Fraction | 0.4897 | |
| Temperature | −98.61 | C |
| Pressure | 275.79 | Kpa a |
| Flowrate | 64.71 | Kgmole/hr |
| Enthalpy | −140643. | KJ/hr |
| N2 | 0.0002 | Kgmole/hr |
| CO2 | 5.1006 | Kgmole/hr |
| Methane | 29.0513 | Kgmole/hr |
| Ethane | 19.6151 | Kgmole/hr |
| Propane | 6.9764 | Kgmole/hr |
| i-Butane | 1.0449 | Kgmole/hr |
| n-Butane | 1.4210 | Kgmole/hr |
| i-Pentan | 0.5361 | Kgmole/hr |
| n-Pentan | 0.4765 | Kgmole/hr |
| n-Hexane | 0.3374 | Kgmole/hr |
| n-Heptan | 0.1488 | Kgmole/hr |

Hyprotech's Process Simulator HYSIM - Licensed to Bob Stothers
Case Name MACUN30  Date 1980/1/1  Time 0:9:5
Stage Variables

| Stage | Press Kpa | Temp Deg C. | Molar Flow Rates | | | Heat Duty GJ/Hour |
|---|---|---|---|---|---|---|
| | | | Liquid | Vapour | Feed | |
| 1 | 275.79 | −98.356 | 31.69 | 36.04 | 64.71 | |
| 2 | 277.51 | −95.907 | 31.93 | 3.02 | | |
| 3 | 279.24 | −88.811 | 32.72 | 3.26 | | |
| 4 | 280.96 | −77.548 | 34.10 | 4.05 | | |
| 5 | 282.69 | −66.252 | 28.67 | 5.43 | | 0.09889 |

Hyprotech's Process Simulator HYSIM - Licensed to Bob Stothers
Case Name MACUN30  Date 1980/1/1  Time 0:9:14
Products

| | Vapour from Stage Kg Mol/Hour | 1 Mol Frc | Liquid from Stage Kg Mol/Hour | 5 Mol Frc |
|---|---|---|---|---|
| N2 | 0.000 | 0.00001 | 0.000 | 0.00000 |
| CO2 | 2.873 | 0.07972 | 2.240 | 0.07812 |
| Methane | 28.866 | 0.80098 | 0.154 | 0.00538 |
| Ethane | 4.177 | 0.11591 | 15.455 | 0.53909 |
| Propane | 0.117 | 0.00326 | 6.860 | 0.23927 |
| i-Butane | 0.003 | 0.00008 | 1.042 | 0.03635 |
| n-Butane | 0.002 | 0.00005 | 1.419 | 0.04951 |
| i-Pentan | 0.000 | 0.00000 | 0.536 | 0.01870 |

TABLE 20-continued

Three TowerPProcess (FIG. 3)
Demethanizer Tower Profiles

| n-Pentan | 0.000 | 0.00000 | 0.476 | 0.01662 |
| n-Hexane | 0.000 | 0.00000 | 0.337 | 0.01177 |
| n-Heptan | 0.000 | 0.00000 | 0.149 | 0.00519 |
| Total | 36.038 | | 28.669 | |

Hyprotech's Process Simulator HYSIM - Licensed to Bob Stothers
Case Name MACUN30  Date 1980/1/1  Time 0:10:25

PHYSICAL PROPERTIES

VAPOUR LEAVING FROM EACH STAGE

| STAGE | MOL WT | FLOW KG/HOUR | M ACMH | DENSITY KG/M3 | REDUCED TEMP | REDUCED PRESS |
|---|---|---|---|---|---|---|
| 1 | 19.995 | 721. | 0.183 | 3.94039 | 0.81810 | 0.05644 |
| 2 | 20.699 | 62. | 0.015 | 4.04915 | 0.81456 | 0.05626 |
| 3 | 23.300 | 76. | 0.017 | 4.41685 | 0.79397 | 0.05471 |
| 4 | 28.892 | 117. | 0.022 | 5.22470 | 0.73927 | 0.05157 |
| 5 | 33.058 | 180. | 0.031 | 5.72511 | 0.70225 | 0.05080 |

LIQUID LEAVING FROM EACH STAGE

| STAGE | MOL WT | FLOW KG/HOUR | M3/HR | DENSITY KG/M3 | REDUCED TEMP | REDUCED PRESS |
|---|---|---|---|---|---|---|
| 1 | 37.582 | 1191. | 1.860 | 640.20737 | 0.53377 | 0.05793 |
| 2 | 37.720 | 1204. | 1.880 | 640.67459 | 0.54017 | 0.05807 |
| 3 | 38.064 | 1245. | 1.943 | 640.84708 | 0.55891 | 0.05782 |
| 4 | 38.355 | 1308. | 2.064 | 633.55958 | 0.58924 | 0.05765 |
| 5 | 39.359 | 1128. | 1.840 | 613.15855 | 0.61026 | 0.05961 |

Hyprotech's Process Simulator HYSIM - Licensed to Bob Stothers
Case Name MACUN30  Date 1980/1/1  Time 0:11:37

TRANSPORT PROPERTIES

| STAGE NO. | VAPOUR VISCOSITY CP | VAPOUR THERMAL CONDUCTIVITY WATT/M-K | LIQUID VISCOSITY CP | LIQUID THERMAL CONDUCTIVITY WATT/M-K | SURFACE TENSION DYNE/CM |
|---|---|---|---|---|---|
| 1 | 0.00692 | 0.01821 | 0.30530 | 0.18516 | 20.6729 |
| 2 | 0.00701 | 0.01803 | 0.29688 | 0.18312 | 20.4205 |
| 3 | 0.00726 | 0.01716 | 0.27372 | 0.17714 | 19.6445 |
| 4 | 0.00755 | 0.01508 | 0.23929 | 0.16701 | 18.1999 |
| 5 | 0.00755 | 0.01385 | 0.21838 | 0.15611 | 16.8615 |

TABLE 21

Treating Natural Gas Containing Asphaltenes (FIG. 4) Stream Properties

| Stream | | 5 | 9 | 14 | 15 |
|---|---|---|---|---|---|
| Name | | FUEL GAS | ERROR | | |
| Vapour frac. | | 1.0000 | — | 1.0000 | 0.9967 |
| Temperature | C. | 35.0000 | — | 45.0000 | 17.9363 |
| Pressure | Kpa a | 3455.0000 | — | 3950.0000 | 3920.0000 |
| Molar Flow | Kgmole/hr | 12.0000 * | 0.0064 | 200.0000 * | 200.0000 |
| Mass Flow | Kg/hr | 206.1447 | 0.2648 | 4234.9570 | 4234.9570 |
| Volume Flow | M3/hr | 0.6601 | 0.0006 | 12.0614 | 12.0614 |
| Enthalpy | KJ/hr | 118158.0000 | — | 2.13960E+06 | 1.85927E+06 |

| Stream | | 16 | 17 | 18 | 19 |
|---|---|---|---|---|---|
| Name | | | | INLET LIQUID | PLANT INLET |
| Vapour frac. | | 0.9717 | 0.9526 | 0.0000 | 0.9835 |
| Temperature | C. | 4.2312 | −2.8720 | 5.5843 | 3.0000 * |
| Pressure | Kpa a | 3910.0000 | 3880.0000 | 3880.0000 | 1140.0000 * |
| Molar Flow | Kgmole/hr | 200.0000 | 200.0000 | 9.0662 | 547.8779 * |
| Mass Flow | Kg/hr | 4234.9570 | 4234.9570 | 775.7913 | 11111.7988 |
| Volume Flow | M3/hr | 12.0614 | 12.0614 | 1.1834 | 32.1156 |
| Enthalpy | KJ/hr | 1.65927E+06 | 1.54547E+06 | −56890.5742 | 4.97228E+06 |

| Stream | | 20 | 21 | 22 | 23 |
|---|---|---|---|---|---|
| Name | | INLET LIQUID | 1ST SUCTION | 1ST DISCHARG | RECYCLE GAS |
| Vapour frac. | | 0.0000 | 1.0000 | 1.0000 | 1.0000 |
| Temperature | C. | 3.0000 | 3.0000 | 203.3503 | 50.0000 * |
| Pressure | Kpa a | 1140.0000 | 1140.0000 | 1155.0000 | 1140.0000 |
| Molar Flow | Kgmole/hr | 9.0662 | 538.8117 | 71.8124 | 71.8124 |
| Mass Flow | Kg/hr | 775.7913 | 10336.0088 | 1670.0835 | 1670.0835 |
| Volume Flow | M3/hr | 1.1834 | 30.9322 | 4.7552 | 4.7552 |
| Enthalpy | KJ/hr | −63267.7852 | 5.03555E+06 | 1.45617E+06 | 854163.3750 |

| Stream | | 24 | 25 | 26 | 27 |
|---|---|---|---|---|---|
| Name | | 2ND SUCTION | 2ND DISCHARG | | GAS/GAS IN |
| Vapour frac. | | 1.0000 | 1.0000 | 1.0000 | 1.0000 |
| Temperature | C. | 14.1339 | 111.4896 | 45.0000 * | 45.0000 |

TABLE 21-continued

Treating Natural Gas Containing Asphaltenes (FIG. 4) Stream Properties

| | | | | | |
|---|---|---|---|---|---|
| Pressure | Kpa a | 1140.0000 * | 3985.0000 | 3950.0000 | 3950.0000 |
| Molar Flow | Kgmole/hr | 663.3459 | 663.3459 | 663.3459 | 463.3459 |
| Mass Flow | Kg/hr | 14046.2070 | 14046.2070 | 14046.2070 | 9811.2500 |
| Volume Flow | M3/hr | 40.0043 | 40.0043 | 40.0043 | 27.9430 |
| Enthalpy | KJ/hr | 6.68286E+06 | 9.33890E+06 | 7.09649E+06 | 4.95688E+06 |

| Stream | | 28 | 29 | 30 | 31 |
|---|---|---|---|---|---|
| Name | | INLET LIQUID | LOW TEMP IN | LOW TEMP LIQ | LOW TEMP LIQ |
| Vapour frac. | | 0.9160 | 0.9056 | 0.0000 | 0.2187 |
| Temperature | C. | −14.4599 | −8.6641 | −8.6641 | −21.0864 |
| Pressure | Kpa a | 3880.0000 | 3880.0000 * | 3880.0000 | 1270.0000 |
| Molar Flow | Kgmole/hr | 463.3459 | 672.4121 | 63.4545 | 63.4545 |
| Mass Flow | Kg/hr | 9811.2500 | 14821.9961 | 3008.2058 | 3008.2058 |
| Volume Flow | M3/hr | 27.9430 | 41.1877 | 5.7646 | 5.7646 |
| Enthalpy | KJ/hr | 3.12602E+06 | 4.61460E+06 | −230736.5313 | −230736.5313 |

| Stream | | 32 | 35 | 37 | 38 |
|---|---|---|---|---|---|
| Name | | STAB FEED | STAB OVRHEAD | C5+ PRODUCT | C5+ PRODUCT |
| Vapour frac. | | 0.3067 | 1.0000 * | 0.0000 | 0.0000 |
| Temperature | C. | −0.4371 | 49.0660 * | 159.9917 * | 37.3449 |
| Pressure | Kpa a | 1200.0000 * | 1140.0000 * | 1150.0000 * | 1115.0000 |

TABLE 22

Processing Natural Gas Containing Asphaltenes (FIG. 4) Exchanger Duties and Compressor Power

| Stream | | 71 | 72 | 73 | 74 |
|---|---|---|---|---|---|
| Name | | WARM GAS/GAS | GAS/LIQ | CHILLER | COLD GAS/GAS |
| Enthalpy | KJ/hr | 1.83086E+06 | 200000.0000 * | 1.24965E+06 | 765125.0000 |

| Stream | | 75 | 76 | 77 | 78 |
|---|---|---|---|---|---|
| Name | | SUBCOOLER | DC2 CONDENSE | COLD REC GAS | WARM REC GAS |
| Enthalpy | KJ/hr | 122247.0391 | 643667.3125 * | 88672.8516 | 233377.1719 |

| Stream | | 79 | 80 | 81 | 82 |
|---|---|---|---|---|---|
| Name | | STAB REBOIL | 1ST AFTCOOL | 2ND AFTCOOL | 3RD AFTCOOL |
| Enthalpy | KJ/hr | 1.11883E+06 * | 602006.7500 | 2.24241E+06 | 1.68871E+06 |

| Stream | | 85 | 86 | 87 | 88 |
|---|---|---|---|---|---|
| Name | | LPG EXCHANGE | C5+ COOLER | COLD RES GAS | OLD GAS/GAS |
| Enthalpy | KJ/hr | 280327.9063 | 307832.8750 | 676452.1250 | 1.59748E+06 |

| Stream | | 89 | 90 | 91 | 92 |
|---|---|---|---|---|---|
| Name | | DC2 REBOILER | 1ST COMPRESS | 2ND COMPRESS | SALES COMP |
| Enthalpy | KJ/hr | 113806.3672 * | 629069.8750 | 2.65604E+06 | 1.54860E+06 |

| Stream | | 95 | 96 | | |
|---|---|---|---|---|---|
| Name | | LPG PUMP | INLET PUMP | | |
| Enthalpy | KJ/hr | 5185.0742 | 6377.2129 | | |

TABLE 23

Processing Natural Gas Containing Asphaltenes Material Balance

| Stream | | 19 | 37 | 57 | 61 |
|---|---|---|---|---|---|
| Name | | PLANT INLET | C5+ PRODUCT | LPG PRODUCT | RESIDUE GAS |
| Vapour frac. | | 0.9835 | 0.0000 | 0.0001 | 0.9999 |
| Temperature | C. | 3.0000 * | 159.9917 * | −43.8084 * | −71.2282 * |
| Pressure | Kpa a | 1140.0000 * | 1150.0000 * | 147.0000 * | 3550.0000 * |
| Molar Flow | Kgmole/hr | 547.8779 * | 10.7296 * | 30.5992 * | 506.5427 * |
| Mass Flow | Kg/hr | 11111.7988 | 967.9293 | 1441.8444 | 8701.7588 |
| Volume Flow | M3/hr | 32.1156 | 1.4473 | 2.8018 | 27.8659 |
| Enthalpy | KJ/hr | 4.97228E+06 | 295021.2188 | −274486.0313 | 2.59148E+06 |
| Density | Kg/m3 | 10.6961 | 514.6133 | 591.8276 | 53.8822 |
| Mole Wt. | | 20.2815 | 90.2109 | 47.1203 | 17.1787 |
| Spec. Heat | KJ/Kgmole-C. | 42.7273 | 275.3918 | 98.9779 | 58.8834 |
| Therm Cond | Watt/m-K. | — | — | — | — |
| Viscosity | Cp | — | — | — | — |
| Sur Tension | Dyne/cm | — | — | — | — |
| Std Density | Kg/m3 | — | — | — | — |
| Z Factor | | — | — | — | — |
| N2 | Kgmole/hr | 9.8725 * | 0.0000 * | 0.0000 * | 9.8725 * |
| CO2 | Kgmole/hr | 0.1044 * | 0.0000 * | 0.0002 * | 0.1042 * |
| Methane | Kgmole/hr | 465.4894 * | 0.0000 * | 0.0002 * | 465.4875 * |
| Ethane | Kgmole/hr | 33.9973 * | 0.0000 * | 4.2189 * | 29.7761 * |
| Propane | Kgmole/hr | 18.1889 * | 0.0085 * | 16.8796 * | 1.3023 * |
| i-Butane | Kgmole/hr | 3.9973 * | 0.1508 * | 3.8459 * | 0.0000 * |
| n-Butane | Kgmole/hr | 5.3440 * | 0.8043 * | 4.5367 * | 0.0000 * |
| i-Pentan | Kgmole/hr | 2.2859 * | 1.7006 * | 0.5850 * | 0.0000 * |

TABLE 23-continued
Processing Natural Gas Containing Asphaltenes Material Balance

| | | | | | |
|---|---|---|---|---|---|
| n-Pentan | Kgmole/hr | 2.1665 * | 1.7773 * | 0.3891 * | 0.0000 * |
| n-Hexane | Kgmole/hr | 2.1559 * | 2.0387 * | 0.1171 * | 0.0000 * |
| n-Octane | Kgmole/hr | 4.2758 * | 4.2493 * | 0.0265 * | 0.0000 * |
| Total | Kgmole/hr | 547.8779 * | 10.7296 * | 30.5992 * | 506.5427 * |

| Stream | | 30 | 35 | 50 | 54 |
|---|---|---|---|---|---|
| Name | | LOW TEMP LIQ | STAB OVRHEAD | GAS FRAC LIQ | DC2 OVERHEAD |
| Vapour frac. | | 0.0000 | 1.0000 * | 0.0000 | 1.0000 * |
| Temperature | C. | −8.6641 | 49.0660 * | −53.1752 * | −70.7176 * |
| Pressure | Kpa a | 3880.0000 | 1140.0000 * | 3600.0000 * | 140.0000 * |
| Molar Flow | Kgmole/hr | 63.4545 | 52.7218 * | 102.4116 * | 71.8124 * |
| Mass Flow | Kg/hr | 3008.2058 | 2040.1130 | 3111.9280 | 1670.0835 |
| Volume Flow | M3/hr | 5.7646 | 4.3169 | 7.5570 | 4.7552 |
| Enthalpy | KJ/hr | −230736.5313 | 793143.3750 | −404555.0625 | 505050.1250 |
| Density | Kg/m3 | 553.5582 | 18.7276 | 477.3377 | 1.9731 |
| Mole Wt. | | 47.4073 | 38.6958 | 30.3865 | 23.2562 |
| Spec. Heat | KJ/Kgmole-C. | 111.7226 | 77.0316 | 81.8515 | 39.2520 |
| Therm Cond | Watt/m-K. | 0.1156 | 0.0257 | 0.1182 | 0.0176 |
| Viscosity | Cp | 0.1463 | 0.0104 | 0.0956 | 0.0073 |
| Sur Tension | Dyne/cm | 10.3698 | — | 7.9553 | — |
| Std Density | Kg/m3 | 519.2969 | — | 257.7187 | — |
| Z Factor | | 0.1511 | 0.8792 | 0.1253 | 0.9804 |
| N2 | Kgmole/hr | 0.0926 | 0.0926 * | 0.2378 * | 0.2378 * |
| CO2 | Kgmole/hr | 0.0094 | 0.0094 * | 0.0305 * | 0.0303 * |
| Methane | Kgmole/hr | 14.5182 | 14.5178 * | 42.6154 * | 42.6152 * |
| Ethane | Kgmole/hr | 8.8261 | 8.8259 * | 25.9269 * | 21.7080 * |
| Propane | Kgmole/hr | 13.8092 | 13.8010 * | 23.5929 * | 6.7133 * |
| i-Butane | Kgmole/hr | 5.5669 | 5.4157 * | 4.1573 * | 0.3114 * |
| n-Butane | Kgmole/hr | 9.0181 | 8.2118 * | 4.7257 * | 0.1891 * |
| i-Pentan | Kgmole/hr | 2.6818 | 0.9809 * | 0.5903 * | 0.0053 * |
| n-Pentan | Kgmole/hr | 2.4089 | 0.6315 * | 0.3910 * | 0.0019 * |
| n-Hexane | Kgmole/hr | 2.2192 | 0.1804 * | 0.1172 * | 0.0001 * |
| n-Octane | Kgmole/hr | 4.3040 | 0.0547 * | 0.0265 * | 0.0000 * |
| Total | Kgmole/hr | 63.4545 | 52.7218 * | 102.4116 * | 71.8124 * |

| Stream | | 9 |
|---|---|---|
| Name | | ERROR |
| Vapour frac. | | — |
| Temperature | C. | — |
| Pressure | Kpa a | — |
| Molar Flow | Kgmole/hr | 0.0064 |
| Mass Flow | Kg/hr | 0.2648 |
| Volume Flow | M3/hr | 0.0006 |
| Enthalpy | KJ/hr | — |
| Density | Kg/m3 | — |
| Mole Wt. | | 41.3224 |
| Spec. Heat | KJ/Kgmole-C. | — |
| Therm Cond | Watt/m-K. | — |
| Viscosity | Cp | — |
| Sur Tension | Dyne/cm | — |
| Std Density | Kg/m3 | — |
| Z Factor | | — |
| N2 | Kgmole/hr | 0.0000 |
| CO2 | Kgmole/hr | 0.0000 |
| Methane | Kgmole/hr | 0.0017 |
| Ethane | Kgmole/hr | 0.0022 |
| Propane | Kgmole/hr | −0.0015 |
| i-Butane | Kgmole/hr | 0.0006 |
| n-Butane | Kgmole/hr | 0.0030 |
| i-Pentan | Kgmole/hr | 0.0002 |
| n-Pentan | Kgmole/hr | 0.0001 |
| n-Hexane | Kgmole/hr | 0.0000 |
| n-Octane | Kgmole/hr | −0.0000 |
| Total | Kgmole/hr | 0.0064 |

TABLE 24
Processing Natural Gas Containing Asphaltenes (FIG. 4) Stream Compositions

| Stream | | 19 | 37 | 56 | 61 |
|---|---|---|---|---|---|
| Name | | PLANT INLET | C5+ PRODUCT | DC2 RECYCLE | RESIDUE GAS |
| Vapour frac. | | 0.9835 | 0.0000 | 1.0000 | 0.9999 |
| Temperature | C. | 3.0000 * | 159.9917 * | 35.0000 * | −71.2282 * |
| Pressure | Kpa a | 1140.0000 * | 1150.0000 * | 120.0000 | 3550.0000 * |
| Molar Flow | Kgmole/hr | 547.8779 * | 10.7296 * | 71.8124 | 506.5427 * |
| Mass Flow | Kg/hr | 11111.7988 | 967.9293 | 1670.0835 | 8701.7588 |
| Volume Flow | M3/hr | 32.1156 | 1.4473 | 4.7552 | 27.8659 |
| Enthalpy | KJ/hr | 4.97228E+06 | 295021.2188 | 827100.1875 | 2.59148E+06 |
| Density | Kg/m3 | 10.6961 | 514.6133 | 1.0949 | 53.8822 |
| Mole Wt. | | 20.2815 | 90.2109 | 23.2562 | 17.1787 |

TABLE 24-continued

Processing Natural Gas Containing Asphaltenes (FIG. 4) Stream Compositions

| | | | | | |
|---|---|---|---|---|---|
| Spec. Heat | KJ/Kgmole-C. | 42.7273 | 275.3918 | 45.9434 | 58.8834 |
| Therm Cond | Watt/m-K. | — | — | 0.0301 | — |
| Viscosity | Cp | — | — | 0.0109 | — |
| Sur Tension | Dyne/cm | — | — | — | — |
| Std Density | Kg/m3 | — | — | — | — |
| Z Factor | | — | — | 0.9948 | — |
| N2 | | 0.0180 * | 0.0000 * | 0.0033 | 0.0195 * |
| CO2 | | 0.0002 * | 0.0000 * | 0.0004 | 0.0002 * |
| Methane | | 0.8496 * | 0.0000 * | 0.5934 | 0.9190 * |
| Ethane | | 0.0621 * | 0.0000 * | 0.3023 | 0.0588 * |
| Propane | | 0.0332 * | 0.0008 * | 0.0935 | 0.0026 * |
| i-Butane | | 0.0073 * | 0.0141 * | 0.0043 | 0.0000 * |
| n-Butane | | 0.0098 * | 0.0750 * | 0.0026 | 0.0000 * |
| i-Pentan | | 0.0042 * | 0.1585 * | 0.0001 | 0.0000 * |
| n-Pentan | | 0.0040 * | 0.1656 * | 0.0000 | 0.0000 * |
| n-Hexane | | 0.0039 * | 0.1900 * | 0.0000 | 0.0000 * |
| n-Octane | | 0.0078 * | 0.3960 * | 0.0000 | 0.0000 * |
| Stream | | 30 | 35 | 50 | 54 |
| Name | | LOW TEMP LIQ | STAB OVRHEAD | GAS FRAC LIQ | DC2 OVERHEAD |
| Vapour frac. | | 0.0000 | 1.0000 * | 0.0000 | 1.0000 * |
| Temperature | C. | −8.6641 | 49.0660 * | −53.1752 * | −70.7176 * |
| Pressure | Kpa a | 3880.0000 | 1140.0000 * | 3600.0000 * | 140.0000 * |
| Molar Flow | Kgmole/hr | 63.4545 | 52.7218 * | 102.4116 * | 71.8124 * |
| Mass Flow | Kg/hr | 3008.2058 | 2040.1130 | 3111.9280 | 1670.0835 |
| Volume Flow | M3/hr | 5.7646 | 4.3169 | 7.5570 | 4.7552 |
| Enthalpy | KJ/hr | −230736.5313 | 793143.3750 | −404555.0625 | 505050.1250 |
| Density | Kg/m3 | 553.5582 | 18.7276 | 477.3377 | 1.9731 |
| Mole Wt. | | 47.4073 | 38.6958 | 30.3865 | 23.2562 |
| Spec. Heat | KJ/Kgmole-C. | 111.7226 | 77.0316 | 81.8515 | 39.2520 |
| Therm Cond | Watt/m-K. | 0.1156 | 0.0257 | 0.1182 | 0.0176 |
| Viscosity | Cp | 0.1463 | 0.0104 | 0.0956 | 0.0073 |
| Sur Tension | Dyne/cm | 10.3698 | — | 7.9553 | — |
| Std Density | Kg/m3 | 519.2969 | — | 257.7187 | — |
| Z Factor | | 0.1511 | 0.8792 | 0.1253 | 0.9804 |
| N2 | | 0.0015 | 0.0018 * | 0.0023 * | 0.0033 * |
| CO2 | | 0.0001 | 0.0002 * | 0.0003 * | 0.0004 * |
| Methane | | 0.2288 | 0.2754 * | 0.4161 * | 0.5934 * |
| Ethane | | 0.1391 | 0.1674 * | 0.2532 * | 0.3023 * |
| Propane | | 0.2176 | 0.2618 * | 0.2304 * | 0.0935 * |
| i-Butane | | 0.0877 | 0.1027 * | 0.0406 * | 0.0043 * |
| n-Butane | | 0.1421 | 0.1558 * | 0.0461 * | 0.0026 * |
| i-Pentan | | 0.0423 | 0.0186 * | 0.0058 * | 0.0001 * |
| n-Pentan | | 0.0380 | 0.0120 * | 0.0038 * | 0.0000 * |
| n-Hexane | | 0.0350 | 0.0034 * | 0.0011 * | 0.0000 * |
| n-Octane | | 0.0678 | 0.0010 * | 0.0003 * | 0.0000 * |

TABLE 25

Processing Natural Gas Containing Asphaltenes (FIG. 4) Gas Fractionator

Hyprotech's Process Simulator HYSIM - Licensed to Bob Stothers
Case Name AESGKM.130    Date 1980/1/1    Time 0:5:12
***COMPUTED RESULTS***

Feed Conditions

| | | |
|---|---|---|
| Feed Stream Number | 44 | |
| Enters on stage | 10 | |
| Liquid Fraction | 0.1350 | |
| Temperature | −52.97 | C. |
| Pressure | 3600.00 | Kpa a |
| Flowrate | 608.96 | Kgmole/hr |
| Enthalpy | 2830754. | KJ/hr |
| N2 | 10.1103 | Kgmole/hr |
| CO2 | 0.1347 | Kgmole/hr |
| Methane | 508.1042 | Kgmole/hr |
| Ethane | 55.7051 | Kgmole/hr |
| Propane | 24.8940 | Kgmole/hr |
| i-Butane | 4.1575 | Kgmole/hr |
| n-Butane | 4.7267 | Kgmole/hr |
| i-Pentan | 0.5904 | Kgmole/hr |
| n-Pentan | 0.3910 | Kgmole/hr |
| n-Hexane | 0.1172 | Kgmole/hr |
| n-Octane | 0.0265 | Kgmole/hr |

Hyprotech's Process Simulator HYSIM - Licensed to Bob Stothers
Case Name AESGKM.130    Date 1980/1/1    Time 0:5:15
*Stage Variables*

| Stage | Press Kpa | Temp Deg C. | Molar Flow Rates | | | Heat Duty GJ/Hour |
|---|---|---|---|---|---|---|
| | | | Liquid | Vapour | Feed | |

TABLE 25-continued

Processing Natural Gas Containing Asphaltenes (FIG. 4) Gas Fractionator

| | | | | | |
|---|---|---|---|---|---|
| 1 | 3550.00 | −71.228 | 50.03 | 506.54 | −0.64367 |
| 2 | 3585.00 | −60.231 | 35.04 | 556.57 | |
| 3 | 3586.88 | −56.875 | 29.46 | 541.58 | |
| 4 | 3588.75 | −55.550 | 27.20 | 536.01 | |
| 5 | 3590.63 | −54.992 | 26.30 | 533.74 | |
| 6 | 3592.50 | −54.753 | 25.85 | 532.84 | |
| 7 | 3594.38 | −54.619 | 25.32 | 532.39 | |
| 8 | 3596.25 | −54.463 | 24.13 | 531.86 | |
| 9 | 3598.13 | −54.107 | 20.92 | 530.68 | |
| 10 | 3600.00 | −53.175 | 102.41 | 527.46 | 608.95 |

Hyprotech's Process Simulator HYSIM - Licensed to Bob Stothers
Case Name AESGKM.130    Date 1980/1/1    Time 0:5:43
*Products*

| | Vapour from Stage 1 | | Liquid from Stage 10 | |
|---|---|---|---|---|
| | Kg Mol/Hour | Mol Frc | Kg Mol/Hour | Mol Frc |
| N2 | 9.872 | 0.01949 | 0.238 | 0.00232 |
| CO2 | 0.104 | 0.00021 | 0.030 | 0.00030 |
| Methane | 465.488 | 0.91895 | 42.615 | 0.41612 |
| Ethane | 29.776 | 0.05878 | 25.927 | 0.25316 |
| Propane | 1.302 | 0.00257 | 23.593 | 0.23037 |
| i-Butane | 0.000 | 0.00000 | 4.157 | 0.04059 |
| n-Butane | 0.000 | 0.00000 | 4.726 | 0.04614 |
| i-Pentan | 0.000 | 0.00000 | 0.590 | 0.00576 |
| n-Pentan | 0.000 | 0.00000 | 0.391 | 0.00382 |
| n-Hexane | 0.000 | 0.00000 | 0.117 | 0.00114 |
| n-Octane | 0.000 | 0.00000 | 0.026 | 0.00026 |
| Total | 506.543 | | 102.412 | |

Hyprotech's Process Simulator HYSIM - Licensed to Bob Stothers
Case Name AESGKM.130    Date 1980/1/1    Time 0:7:1
PHYSICAL PROPERTIES

VAPOUR LEAVING FROM EACH STAGE

| STAGE | MOL WT | FLOW KG/HOUR | M ACMH | DENSITY KG/M3 | REDUCED TEMP | PRESS |
|---|---|---|---|---|---|---|
| 1 | 17.179 | 8702. | 0.161 | 53.88098 | 1.02670 | 0.76669 |
| 2 | 17.640 | 9818. | 0.196 | 50.16525 | 1.06250 | 0.77336 |
| 3 | 17.711 | 9592. | 0.197 | 48.61880 | 1.07759 | 0.77429 |
| 4 | 17.713 | 9494. | 0.198 | 47.92205 | 1.08494 | 0.77509 |
| 5 | 17.710 | 9453. | 0.198 | 47.64312 | 1.08818 | 0.77568 |
| 6 | 17.709 | 9436. | 0.198 | 47.54356 | 1.08958 | 0.77616 |
| 7 | 17.707 | 9427. | 0.198 | 47.49774 | 1.09039 | 0.77660 |
| 8 | 17.702 | 9415. | 0.199 | 47.42375 | 1.09144 | 0.77703 |
| 9 | 17.687 | 9386. | 0.199 | 47.19811 | 1.09393 | 0.77746 |
| 10 | 17.642 | 9306. | 0.200 | 46.53959 | 1.10062 | 0.77793 |

LIQUID LEAVING FROM EACH STAGE

| STAGE | MOL WT | FLOW KG/HOUR | M3/HR | DENSITY KG/M3 | REDUCED TEMP | PRESS |
|---|---|---|---|---|---|---|
| 1 | 22.312 | 1116. | 2.848 | 391.93538 | 0.84804 | 0.75702 |
| 2 | 25.412 | 890. | 2.089 | 426.09707 | 0.82216 | 0.76867 |
| 3 | 26.891 | 792. | 1.794 | 441.65121 | 0.80854 | 0.77520 |
| 4 | 27.612 | 751. | 1.673 | 448.98901 | 0.80173 | 0.77927 |
| 5 | 27.924 | 734. | 1.624 | 452.05298 | 0.79889 | 0.78134 |
| 6 | 28.063 | 725. | 1.599 | 453.39551 | 0.79769 | 0.78252 |
| 7 | 28.168 | 713. | 1.569 | 454.43593 | 0.79680 | 0.78354 |
| 8 | 28.357 | 684. | 1.499 | 456.38768 | 0.79510 | 0.78504 |
| 9 | 28.867 | 604. | 1.308 | 461.75536 | 0.79021 | 0.78829 |
| 10 | 30.386 | 3112. | 6.518 | 477.33949 | 0.77555 | 0.79687 |

Hyprotech's Process Simulator HYSIM - Licensed to Bob Stothers
Case Name AESGKM.130    Date 1980/1/1    Time 0:8:54
TRANSPORT PROPERTIES

| | VAPOUR | | LIQUID | | |
|---|---|---|---|---|---|
| STAGE NO. | VISCOSITY CP | THERMAL CONDUCTIVITY WATT/M-K | VISCOSITY CP | THERMAL CONDUCTIVITY WATT/M-K | SURFACE TENSION DYNE/CM |
| 1 | 0.00943 | 0.03002 | 0.05894 | 0.10581 | 4.4544 |
| 2 | 0.00968 | 0.03021 | 0.07118 | 0.11027 | 5.6930 |
| 3 | 0.00976 | 0.03034 | 0.07771 | 0.11256 | 6.3428 |
| 4 | 0.00979 | 0.03042 | 0.08104 | 0.11368 | 6.6674 |
| 5 | 0.00980 | 0.03046 | 0.08248 | 0.11412 | 6.8038 |
| 6 | 0.00981 | 0.03048 | 0.08311 | 0.11431 | 6.8623 |
| 7 | 0.00981 | 0.03049 | 0.08360 | 0.11444 | 6.9059 |
| 8 | 0.00981 | 0.03050 | 0.08454 | 0.11472 | 6.9890 |
| 9 | 0.00983 | 0.03054 | 0.08720 | 0.11557 | 7.2279 |
| 10 | 0.00984 | 0.03061 | 0.09560 | 0.11824 | 7.9553 |

TABLE 26

Processing Natural Gas Containing Asphaltene
Depropanizer Column Profiles Hyprotech's Process Simulator HYSIM - Licensed to Bob Stothers
Case Name AESGKM.130  Date 1980/1/1  Time 0:22:25
***COMPUTED RESULTS***

Feed Conditions

| | |
|---|---|
| Feed Stream Number | 53 |
| Enters on stage | 1 |
| Liquid Fraction | 0.3220 |
| Temperature | −71.26 C. |
| Pressure | 140.00 Kpa a |
| Flowrate | 102.41 Kgmole/hr |
| Enthalpy | 116865. KJ/hr |
| N2 | 0.2378 Kgmole/hr |
| CO2 | 0.0305 Kgmole/hr |
| Methane | 42.6154 Kgmole/hr |
| Ethane | 25.9269 Kgmole/hr |
| Propane | 23.5929 Kgmole/hr |
| i-Butane | 4.1573 Kgmole/hr |
| n-Butane | 4.7257 Kgmole/hr |
| i-Pentan | 0.5903 Kgmole/hr |
| n-Pentan | 0.3910 Kgmole/hr |
| n-Hexane | 0.1172 Kgmole/hr |
| n-Octane | 0.0265 Kgmole/hr |

Hyprotech's Process Simulator HYSIM - Licensed to Bob Stothers
Case Name AESGKM.130  Date 1980/1/1  Time 0:22:28
*Stage Variables*

| Stage | Press Kpa | Temp Deg C. | Molar Flow Rates | | | Heat Duty GJ/Hour |
|---|---|---|---|---|---|---|
| | | | Liquid | Vapour | Feed | |
| 1 | 140.00 | −70.718 | 33.08 | 71.81 | 102.41 | |
| 2 | 141.75 | −58.110 | 35.34 | 2.48 | | |
| 3 | 143.50 | −53.726 | 36.13 | 4.74 | | |
| 4 | 145.25 | −51.267 | 36.24 | 5.53 | | |
| 5 | 147.00 | −43.808 | 30.60 | 5.64 | | 0.11381 |

Hyprotech's Process Simulator HYSIM - Licensed to Bob Stothers
Case Name AESGKM.130  Date 1980/1/1  Time 0:22:37
*Products*

| | Vapour from Stage 1 | | Liquid from Stage 5 | |
|---|---|---|---|---|
| | Kg Mol/Hour | Mol Frc | Kg Mol/Hour | Mol Frc |
| N2 | 0.238 | 0.00331 | 0.000 | 0.00000 |
| CO2 | 0.030 | 0.00042 | 0.000 | 0.00001 |
| Methane | 42.615 | 0.59342 | 0.000 | 0.00001 |
| Ethane | 21.708 | 0.30229 | 4.219 | 0.13788 |
| Propane | 6.713 | 0.09348 | 16.880 | 0.55163 |
| i-Butane | 0.311 | 0.00434 | 3.846 | 0.12568 |
| n-Butane | 0.189 | 0.00263 | 4.537 | 0.14826 |
| i-Pentan | 0.005 | 0.00007 | 0.585 | 0.01912 |
| n-Pentan | 0.002 | 0.00003 | 0.389 | 0.01272 |
| n-Hexane | 0.000 | 0.00000 | 0.117 | 0.00383 |
| n-Octane | 0.000 | 0.00000 | 0.026 | 0.00087 |
| Total | 71.812 | | 30.599 | |

Hyprotech's Process Simulator HYSIM - Licensed to Bob Stothers
Case Name AESGKM.130  Date 1980/1/1  Time 0:23:50
PHYSICAL PROPERTIES

VAPOUR LEAVING FROM EACH STAGE

| STAGE | MOL WT | FLOW KG/HOUR | M ACMH | DENSITY KG/M3 | REDUCED TEMP | PRESS |
|---|---|---|---|---|---|---|
| 1 | 23.256 | 1670. | 0.846 | 1.97309 | 0.83115 | 0.02999 |
| 2 | 30.224 | 75. | 0.030 | 2.46594 | 0.72685 | 0.03011 |
| 3 | 33.231 | 157. | 0.058 | 2.70232 | 0.68994 | 0.03041 |
| 4 | 34.124 | 189. | 0.068 | 2.78075 | 0.68606 | 0.03089 |
| 5 | 36.207 | 204. | 0.071 | 2.89192 | 0.68899 | 0.03187 |

LIQUID LEAVING FROM EACH STAGE

| STAGE | MOL WT | FLOW KG/HOUR | M3/HR | DENSITY KG/M3 | REDUCED TEMP | PRESS |
|---|---|---|---|---|---|---|
| 1 | 45.855 | 1517. | 2.437 | 622.37499 | 0.54479 | 0.03330 |
| 2 | 45.258 | 1599. | 2.638 | 606.23793 | 0.58165 | 0.03345 |
| 3 | 45.132 | 1630. | 2.713 | 600.83349 | 0.59400 | 0.03380 |
| 4 | 45.422 | 1646. | 2.746 | 599.40916 | 0.59850 | 0.03431 |
| 5 | 47.120 | 1442. | 2.408 | 598.79915 | 0.60719 | 0.03531 |

Hyprotech's Process Simulator HYSIM - Licensed to Bob Stothers
Case Name AESGKM.130  Date 1980/1/1  Time 0:25:2
TRANSPORT PROPERTIES

| VAPOUR | LIQUID |
|---|---|

TABLE 26-continued

Processing Natural Gas Containing Asphaltene
Depropanizer Column Profiles

| STAGE NO. | VISCOSITY CP | THERMAL CONDUCTIVITY WATT/M-K | VISCOSITY CP | THERMAL CONDUCTIVITY WATT/M-K | SURFACE TENSION DYNE/CM |
|---|---|---|---|---|---|
| 1 | 0.00731 | 0.01760 | 0.30619 | 0.15775 | 19.5794 |
| 2 | 0.00698 | 0.01483 | 0.25408 | 0.14797 | 17.6891 |
| 3 | 0.00679 | 0.01397 | 0.23864 | 0.14468 | 17.0626 |
| 4 | 0.00678 | 0.01390 | 0.23428 | 0.14298 | 16.8361 |
| 5 | 0.00687 | 0.01406 | 0.22867 | 0.13822 | 16.4071 |

TABLE 27

Processing Natural Gas Containing Asphaltenes (FIG. 4)
Stabilizer Column Profiles

Hyprotech's Process Simulator HYSIM - Licensed to Bob Stothers
Case Name AESGKM.130   Date 1980/1/1   Time 0:30:29
***COMPUTED RESULTS***

Feed Conditions

| | |
|---|---|
| Feed Stream Number | 32 |
| Enters on stage | 1 |
| Liquid Fraction | 0.6933 |
| Temperature | −0.44 C. |
| Pressure | 1200.00 Kpa a |
| Flowrate | 63.45 Kgmole/hr |
| Enthalpy | −30737. KJ/hr |
| N2 | 0.0926 Kgmole/hr |
| CO2 | 0.0094 Kgmole/hr |
| Methane | 14.5182 Kgmole/hr |
| Ethane | 8.8261 Kgmole/hr |
| Propane | 13.8092 Kgmole/hr |
| i-Butane | 5.5669 Kgmole/hr |
| n-Butane | 9.0181 Kgmole/hr |
| i-Pentan | 2.6818 Kgmole/hr |
| n-Pentan | 2.4089 Kgmole/hr |
| n-Hexane | 2.2192 Kgmole/hr |
| n-Octane | 4.3040 Kgmole/hr |

Hyprotech's Process Simulator HYSIM - Licensed to Bob Stothers
Case Name AESGKM.130   Date 1980/1/1   Time 0:30:32
*Stage Variables*

| Stage | Press Kpa | Temp Deg C. | Molar Flow Rates Liquid | Vapour | Feed | Heat Duty GJ/Hour |
|---|---|---|---|---|---|---|
| 1 | 1140.00 | 49.066 | 51.91 | 52.72 | 63.45 | |
| 2 | 1141.67 | 82.863 | 60.85 | 41.18 | | |
| 3 | 1143.33 | 95.566 | 62.35 | 50.12 | | |
| 4 | 1145.00 | 105.433 | 61.88 | 51.62 | | |
| 5 | 1146.67 | 116.247 | 59.41 | 51.15 | | |
| 6 | 1148.33 | 132.003 | 53.52 | 48.68 | | |
| 7 | 1150.00 | 159.992 | 10.73 | 42.79 | | 1.11884 |

Hyprotech's Process Simulator HYSIM - Licensed to Bob Stothers
Case Name AESGKM.130   Date 1980/1/1   Time 0:30:47
*Products*

| | Vapour from Stage 1 | | Liquid from Stage 7 | |
|---|---|---|---|---|
| | Kg Mol/Hour | Mol Frc | Kg Mol/Hour | Mol Frc |
| N2 | 0.093 | 0.00176 | 0.000 | 0.00000 |
| CO2 | 0.009 | 0.00018 | 0.000 | 0.00000 |
| Methane | 14.518 | 0.27537 | 0.000 | 0.00000 |
| Ethane | 8.826 | 0.16741 | 0.000 | 0.00000 |
| Propane | 13.801 | 0.26177 | 0.008 | 0.00079 |
| i-Butane | 5.416 | 0.10272 | 0.151 | 0.01406 |
| n-Butane | 8.212 | 0.15576 | 0.804 | 0.07496 |
| i-Pentan | 0.981 | 0.01861 | 1.701 | 0.15850 |
| n-Pentan | 0.632 | 0.01198 | 1.777 | 0.16564 |
| n-Hexane | 0.180 | 0.00342 | 2.039 | 0.19001 |
| n-Octane | 0.055 | 0.00104 | 4.249 | 0.39604 |
| Total | 52.722 | | 10.730 | |

Hyprotech's Process Simulator HYSIM - Licensed to Bob Stothers
Case Name AESGKM.130   Date 1980/1/1   Time 0:32:0
PHYSICAL PROPERTIES

VAPOUR LEAVING FROM EACH STAGE

| STAGE | MOL WT | FLOW KG/HOUR | M ACMH | DENSITY KG/M3 | REDUCED TEMP | PRESS |
|---|---|---|---|---|---|---|
| 1 | 38.696 | 2040. | 0.109 | 18.72761 | 0.99017 | 0.26521 |
| 2 | 54.113 | 2228. | 0.087 | 25.61780 | 0.88592 | 0.29267 |

TABLE 27-continued

Processing Natural Gas Containing Asphaltenes (FIG. 4)
Stabilizer Column Profiles

| | | | | | |
|---|---|---|---|---|---|
| 3 | 58.987 | 2956. | 0.107 | 27.52899 | 0.87517 | 0.30507 |
| 4 | 62.115 | 3206. | 0.113 | 28.49352 | 0.87563 | 0.31340 |
| 5 | 65.193 | 3334. | 0.114 | 29.24127 | 0.88002 | 0.32149 |
| 6 | 69.155 | 3367. | 0.113 | 29.85412 | 0.89116 | 0.33163 |
| 7 | 76.311 | 3266. | 0.106 | 30.81944 | 0.91272 | 0.34914 |

LIQUID LEAVING FROM EACH STAGE

| STAGE | MOL WT | FLOW KG/HOUR | M3/HR | DENSITY KG/M3 | REDUCED TEMP | PRESS |
|---|---|---|---|---|---|---|
| 1 | 61.575 | 3196. | 5.783 | 552.63897 | 0.75943 | 0.30704 |
| 2 | 64.493 | 3924. | 7.549 | 519.75557 | 0.81465 | 0.31586 |
| 3 | 66.950 | 4174. | 8.135 | 513.06397 | 0.82713 | 0.32302 |
| 4 | 69.532 | 4302. | 8.419 | 510.98426 | 0.83342 | 0.33026 |
| 5 | 72.957 | 4335. | 8.482 | 510.97845 | 0.83796 | 0.33949 |
| 6 | 79.097 | 4233. | 8.235 | 514.00144 | 0.84103 | 0.35517 |
| 7 | 90.211 | 968. | 1.880 | 514.82869 | 0.84871 | 0.38442 |

Hyprotech's Process Simulator HYSIM - Licensed to Bob Stothers
Case Name AESGKM.130   Date 1980/1/1   Time 0:33:31
TRANSPORT PROPERTIES

| STAGE NO. | VAPOUR VISCOSITY CP | VAPOUR THERMAL CONDUCTIVITY WATT/M-K | LIQUID VISCOSITY CP | LIQUID THERMAL CONDUCTIVITY WATT/M-K | SURFACE TENSION DYNE/CM |
|---|---|---|---|---|---|
| 1 | 0.01037 | 0.02566 | 0.14420 | 0.09890 | 9.3416 |
| 2 | 0.00989 | 0.02561 | 0.11526 | 0.08830 | 6.7695 |
| 3 | 0.00988 | 0.02622 | 0.11029 | 0.08592 | 6.2030 |
| 4 | 0.00993 | 0.02683 | 0.10880 | 0.08482 | 5.9264 |
| 5 | 0.01003 | 0.02754 | 0.10968 | 0.08414 | 5.7405 |
| 6 | 0.01020 | 0.02865 | 0.10969 | 0.08377 | 5.6467 |
| 7 | 0.01047 | 0.03060 | 0.11426 | 0.08270 | 5.3594 |

TABLE 28

CO2 RECOVERY FROM NATURAL GAS (FIG. 5)
Stream Properties

| Stream | | 1 | 2 | 3 | 4 |
|---|---|---|---|---|---|
| Name | | PLANT INLET | COOL INLET | CHILLED INLE | COLD INLET |
| Vapour frac. | | 1.0000 | 0.7384 | 0.1917 | 0.1655 |
| Temperature | C. | 25.0000 * | −16.6747 | −33.4921 | −36.5218 |
| Pressure | Kpa a | 2800.0000 * | 2775.0000 | 2750.0000 | 2725.0000 |
| Molar Flow | Kgmole/hr | 10385.4014 * | 10385.4014 | 10385.4014 | 10385.4014 |
| Mass Flow | Kg/hr | 417768.5625 | 417768.5625 | 417768.5625 | 417768.5625 |
| Volume Flow | M3/hr | 550.8240 | 550.8240 | 550.8240 | 550.8240 |
| Enthalpy | KJ/hr | 8.63445E+07 | 3.49572E+07 | −4.08999E+07 | −4.61006E+07 |

| Stream | | 5 | 6 | 7 | 10 |
|---|---|---|---|---|---|
| Name | | COLD INLET | COLD INLET | TOWER 2 IN | TOWER 2 LIQ |
| Vapour frac. | | 0.0891 | 0.0887 | 0.0794 | 0.0000 |
| Temperature | C. | −50.0000 * | −50.5795 | −53.6560 | −53.8331 * |
| Pressure | Kpa a | 2700.0000 | 2675.0000 | 2650.0000 | 2650.0000 * |
| Molar Flow | Kgmole/hr | 10385.4014 | 10385.4014 | 10385.4014 | 11144.7090 * |
| Mass Flow | Kg/hr | 417768.5625 | 417768.5625 | 417768.5625 | 462993.0000 |
| Volume Flow | M3/hr | 550.8240 | 550.8240 | 550.8240 | 593.7190 |
| Enthalpy | KJ/hr | −6.41006E+07 | −6.46275E+07 | −6.78210E+07 | −8.47391E+07 |

| Stream | | 11 | 12 | 13 | 16 |
|---|---|---|---|---|---|
| Name | | TOWER 2 LIQ | TOWER 2 LIQ | TOWER 3 IN | TOWER 1 LIQ |
| Vapour frac. | | 0.0370 | 0.1020 | 0.1748 | 0.0000 * |
| Temperature | C. | −56.0000 * | −42.7272 | −53.0000 * | −53.1730 * |
| Pressure | Kpa a | 1995.1183 | 1945.1183 | 1078.5044 | 4510.0000 * |
| Molar Flow | Kgmole/hr | 11144.7090 | 11144.7090 | 11144.7090 | 775.6005 * |
| Mass Flow | Kg/hr | 462993.0000 | 462993.0000 | 462993.0000 | 24162.2441 |
| Volume Flow | M3/hr | 593.7190 | 593.7190 | 593.7190 | 45.2904 |
| Enthalpy | KJ/hr | −8.47391E+07 | −6.67391E+07 | −6.67391E+07 | −2.02202E+06 |

| Stream | | 17 | 18 | 19 | 20 |
|---|---|---|---|---|---|
| Name | | TOWER 1 LIQ | TOWER 1 LIQ | TOWER 2 IN | RICH RECYCLE |
| Vapour frac. | | 0.2127 | 0.2777 | 0.2777 | 1.0000 |
| Temperature | C. | −65.5695 | −61.8000 * | −61.8000 | −53.0117 * |
| Pressure | Kpa a | 2690.0000 | 2640.0000 * | 2640.0000 * | 1078.0000 * |
| Molar Flow | Kgmole/hr | 775.6005 | 775.6005 | 775.6005 | 2084.3000 * |
| Mass Flow | Kg/hr | 24162.2441 | 24162.2441 | 24162.2441 | 68293.9531 |
| Volume Flow | M3/hr | 45.2904 | 45.2904 | 45.2904 | 110.3548 |
| Enthalpy | KJ/hr | −2.02202E+06 | −1.49516E+06 | −1.49516E+06 | 1.32186E+07 |

| Stream | 21 | 22 | 23 | 24 |
|---|---|---|---|---|

TABLE 28-continued

CO2 RECOVERY FROM NATURAL GAS (FIG. 5)
Stream Properties

| Name | | RICH RECYCLE | RICH RECYCLE | RICH RECYCLE | RICH RECYCLE |
|---|---|---|---|---|---|
| Vapour frac. | | 1.0000 | 1.0000 | 1.0000 | 1.0000 |
| Temperature | C. | −40.0000 * | 30.0000 * | 113.9608 | 40.0000 * |
| Pressure | Kpa a | 1063.0000 | 1048.0000 | 2600.0000 * | 2575.0000 |
| Molar Flow | Kgmole/hr | 2084.3000 | 2084.3000 | 2084.3000 | 2084.3000 |
| Mass Flow | Kg/hr | 68293.9531 | 68293.9531 | 68293.9531 | 68293.9531 |
| Volume Flow | M3/hr | 110.3548 | 110.3548 | 110.3548 | 110.3548 |
| Enthalpy | KJ/hr | 1.42573E+07 | 1.97926E+07 | 2.61530E+07 | 1.97039E+07 |

| Stream | | 25 | 26 | 27 | 28 |
|---|---|---|---|---|---|
| Name | | RICH RECYCLE | RICH RECYCLE | RICH RECYCLE | RICH RECYCLE |
| Vapour frac. | | 1.0000 | 1.0000 | 1.0000 | 0.2175 |
| Temperature | C. | 136.6700 | 40.0000 * | −1.3821 | −37.0000 * |
| Pressure | Kap a | 7000.0000 * | 6975.0000 | 6950.0000 | 6915.0000 |
| Molar Flow | Kgmole/hr | 12084.3000 | 2084.3000 | 84.3000 | 2084.3000 |
| Mass Flow | Kg/hr | 68293.9531 | 68293.9531 | 68293.9531 | 68293.9531 |
| Volume Flow | M3/hr | 110.3548 | 110.3548 | 110.3548 | 110.3548 |
| Enthalpy | KJ/hr | 2.66999E+07 | 1.68751E+07 | 1.13398E+07 | −2.31788E+06 |

| Stream | | 29 | 30 | | |
|---|---|---|---|---|---|
| Name | | RICH RECYCLE | RICH RECYCLE | | |
| Vapour frac. | | 0.1557 | 0.4483 | | |
| Temperature | C. | −40.9340 | −59.5289 | | |
| Pressure | Kpa a | 6890.0000 | 2645.0000 * | | |
| Molar Flow | Kgmole/hr | 2084.3000 | 2084.3000 | | |
| Mass Flow | Kg/hr | 68293.9531 | 68293.9531 | | |
| Volume Flow | M3/hr | 110.3548 | 110.3548 | | |
| Enthalpy | KJ/hr | −3.35664E+06 | −3.35664E+06 | | |

| Stream | | 31 | 32 | 33 | 34 |
|---|---|---|---|---|---|
| Name | | TOWER 1 OVHD | TOWER 1 OVHD | TOWER 1 OVHD | TOWER 1 OVHD |
| Vapour frac. | | 1.0000 | 1.0000 | 1.0000 | 1.0000 |
| Temperature | C. | −86.5613 * | −40.0000 * | 30.0000 * | 118.0826 |
| Pressure | Kpa a | 4500.0000 * | 4475.0000 | 4450.0000 | 11030.0000 * |
| Molar Flow | Kgmole/hr | 4739.1123 * | 4739.1123 | 4739.1123 | 4739.1123 |
| Mass Flow | Kg/hr | 82398.6641 | 82398.6641 | 82398.6641 | 82398.6641 |
| Volume Flow | M3/hr | 245.0641 | 245.0641 | 245.0641 | 245.0641 |
| Enthalpy | KJ/hr | 1.66680E+07 | 3.04782E+07 | 4.42419E+07 | 5.83821E+07 |

| Stream | | 36 | 37 | 38 | 39 |
|---|---|---|---|---|---|
| Name | | TOWER 1 OVHD | TOWER 1 OVHD | TOWER 1 OVHD | TOWER 1 OVHD |
| Vapour frac. | | 1.0000 | 1.0000 | 1.0000 | 1.0000 |
| Temperature | C. | 40.0000 * | −17.5416 | −37.0000 * | −71.3393 |
| Pressure | Kpa a | 10990.0000 | 10950.0000 | 10910.0000 | 10870.0000 |
| Molar Flow | Kgmole/hr | 4739.1123 | 4739.1123 | 4739.1123 | 4739.1123 |
| Mass Flow | Kg/hr | 82398.6641 | 82398.6641 | 82398.6641 | 82398.6641 |
| Volume Flow | M3/hr | 245.0641 | 245.0641 | 245.0641 | 245.0641 |
| Enthalpy | KJ/hr | 4.17958E+07 | 2.80321E+07 | 2.21869E+07 | 8.37669E+06 |

| Stream | | 40 | | | |
|---|---|---|---|---|---|
| Name | | TOWER 1 OVHD | | | |
| Vapour frac. | | 0.2790 | | | |
| Temperature | C. | −88.5402 | | | |
| Pressure | Kpa a | 4705.0000 | | | |
| Molar Flow | Kgmole/hr | 4739.1123 | | | |
| Mass Flow | Kg/hr | 82398.6641 | | | |
| Volume Flow | M3/hr | 245.0641 | | | |
| Enthalpy | KJ/hr | 8.37669E+06 | | | |

| Stream | | 41 | 42 | 43 | 44 |
|---|---|---|---|---|---|
| Name | | RESIDUE GAS | RESIDUE GAS | RESIDUE GAS | RESIDUE GAS |
| Vapour frac. | | 1.0000 | 1.0000 | 1.0000 | 1.0000 |
| Temperature | C. | −88.5402 | −54.0000 * | 20.0000 * | 58.5390 |
| Pressure | Kpa a | 4705.0000 | 4665.0000 | 4625.0000 * | 7021.0000 * |
| Molar Flow | Kgmole/hr | 1322.2645 | 1322.2645 | 1322.2645 | 1322.2645 |
| Mass Flow | Kg/hr | 23006.9531 | 23006.9531 | 23006.9531 | 23006.9531 |
| Volume Flow | M3/hr | 67.3341 | 67.3341 | 67.3341 | 67.3341 |
| Enthalpy | KJ/hr | 4.42822E+06 | 7.62175E+06 | 1.17624E+07 | 1.33924E+07 |

| Stream | | 45 | 50 | 51 | 52 |
|---|---|---|---|---|---|
| Name | | RESIDUE GAS | REFLUX | REFLUX | LEAN RECYCLE |
| Vapour frac. | | 1.0000 | 0.0000 | 0.0927 | 1.0000 * |
| Temperature | C. | 50.0000 * | −88.5402 | −89.7443 | −62.4926 * |
| Pressure | Kpa a | 6986.0000 | 4705.0000 | 4500.0000 * | 2640.0000 * |
| Molar Flow | Kgmole/hr | 1322.2645 | 3416.8477 | 3416.8477 | 2099.6677 * |
| Mass Flow | Kg/hr | 23006.9531 | 59391.7109 | 59391.7109 | 47190.8320 |
| Volume Flow | M3/hr | 67.3341 | 177.7300 | 177.7300 | 112.7118 |
| Enthalpy | KJ/hr | 1.29289E+07 | 3.94846E+06 | 3.94846E+06 | 1.20528E+07 |

| Stream | | 53 | 54 | 55 | 56 |
|---|---|---|---|---|---|

TABLE 28-continued

CO2 RECOVERY FROM NATURAL GAS (FIG. 5)
Stream Properties

| Name | | LEAN RECYCLE | LEAN RECYCLE | LEAN RECYCLE | LEAN RECYCLE |
|---|---|---|---|---|---|
| Vapour frac. | | 1.0000 | 1.0000 | 1.0000 | 1.0000 |
| Temperature | C. | −40.0000 * | 30.0000 * | 83.3703 | 40.0000 * |
| Pressure | Kpa a | 2615.0000 | 2590.0000 | 4650.0000 | 4615.0000 |
| Molar Flow | Kgmole/hr | 2099.6677 | 2099.6677 | 2099.6677 | 2099.6677 |
| Mass Flow | Kg/hr | 47190.8320 | 47190.8320 | 47190.8320 | 47190.8320 |
| Volume Flow | M3/hr | 112.7118 | 112.7118 | 112.7118 | 112.7118 |
| Enthalpy | KJ/hr | 1.41230E+07 | 2.00661E+07 | 2.39540E+07 | 2.00677E+07 |

| Stream | | 57 | 58 | 59 | 60 |
|---|---|---|---|---|---|
| Name | | LEAN RECYCLE | LEAN RECYCLE | LEAN RECYCLE | CO2 PRODUCT |
| Vapour frac. | | 1.0000 | 1.0000 | 0.9863 | 0.0000 |
| Temperature | C. | −23.8615 | −37.0000 * | −53.0428 | −47.5295 * |
| Pressure | Kpa a | 4580.0000 | 4545.0000 | 4510.0000 * | 1091.0000 * |
| Molar Flow | Kgmole/hr | 2099.6677 | 2099.6677 | 2099.6677 | 9061.1396 * |
| Mass Flow | Kg/hr | 47190.8320 | 47190.8320 | 47190.8320 | 394722.2188 |
| Volume Flow | M3/hr | 112.7118 | 112.7118 | 112.7118 | 483.4119 |
| Enthalpy | KJ/hr | 1.41246E+07 | 1.27740E+07 | 1.07038E+07 | −7.47548E+07 |

| Stream | | 61 | 62 |
|---|---|---|---|
| Name | | CO2 PRODUCT | CO2 PRODUCT |
| Vapour frac. | | 0.0000 | 1.0000 |
| Temperature | C. | −38.2464 | 20.0000 * |
| Pressure | Kpa a | 14601.0000 | 14566.0000 * |
| Molar Flow | Kgmole/hr | 9061.1396 | 9061.1396 |
| Mass Flow | Kg/hr | 394722.2188 | 394722.2188 |
| Volume Flow | M3/hr | 483.4119 | 483.4119 |
| Enthalpy | KJ/hr | −6.72514E+07 | −2.00047E+07 |

TABLE 29

CO2 Recovery from Natural Gas (FIG. 5)
Exchanger Duties and Compressor power

| Stream | | 70 | 71 | 72 | 73 |
|---|---|---|---|---|---|
| Name | | WARM GAS/GAS | FEED CHILLER | DC1 REBOILER | GAS/LIQ #2 |
| Enthalpy | KJ/hr | 5.13873E+07 | 7.58572E+07 | 5.20067E+06 * | 1.80000E+07 * |

| Stream | | 74 | 75 | 76 | 77 |
|---|---|---|---|---|---|
| Name | | GAS/LIQ #3 | COLD GAS/GAS | GAS/LIQ #1 | RICH CHILLER |
| Enthalpy | KJ/hr | 526864.1250 | 3.19353E+06 | 4.72466E+07 | 1.36577E+07 |

| Stream | | 78 | 79 | 80 | 81 |
|---|---|---|---|---|---|
| Name | | LEAN CHILLER | OVHD CHILLER | 1ST AFTCOOL | 2ND AFTCOOL |
| Enthalpy | KJ/hr | 1.35063E+06 | 5.84519E+06 | 6.44905E+06 | 9.82480E+06 |

| Stream | | 82 | 83 | 84 | 85 |
|---|---|---|---|---|---|
| Name | | 3RD AFTCOOL | 4TH AFTCOOL | 5TH AFTCOOL | WARM RES GAS |
| Enthalpy | KJ/hr | 3.88634E+06 | 1.65863E+07 | 463526.0000 | 4.14065E+06 |

| Stream | | 90 | 91 | 92 | 93 |
|---|---|---|---|---|---|
| Name | | 1ST COMPRESS | 2ND COMPRESS | 3RD COMPRESS | 4TH COMPRESS |
| Enthalpy | KJ/hr | 6.36039E+06 | 6.99597E+06 | 3.88797E+06 | 1.41402E+07 |

| Stream | | 94 | 95 | | |
|---|---|---|---|---|---|
| Name | | 5TH COMPRESS | CO2 PUMP | | |
| Enthalpy | KJ/hr | 1.63004E+06 | 7.50339E+06 | | |

TABLE 30

CO2 Recovery from Natural Gas (FIG. 5)
Material Balance

| Stream | | 1 | 41 | 60 | 9 |
|---|---|---|---|---|---|
| Name | | PLANT INLET | RESIDUE GAS | CO2 PRODUCT | |
| Vapour frac. | | 1.0000 | 1.0000 | 0.0000 | — |
| Temperature | C. | 25.0000 * | −88.5402 | −47.5295 * | — |
| Pressure | Kpa a | 2800.0000 * | 4705.0000 | 1091.0000 * | — |
| Molar Flow | Kgmole/hr | 10385.4014 * | 1322.2645 | 9061.1396 * | 1.9971 |
| Mass Flow | Kg/hr | 417768.5625 | 23006.9531 | 394722.2188 | 39.3932 |
| Volume Flow | M3/hr | 550.8240 | 67.3341 | 483.4119 | 0.0780 |
| Enthalpy | KJ/hr | 8.63445E+07 | 4.42822E+06 | −7.47548E+07 | — |
| Density | Kg/m3 | 53.0194 | 116.1075 | 1121.6316 | — |
| Mole Wt. | | 40.2265 | 17.3997 | 43.5621 | 19.7255 |
| Spec. Heat | KJ/Kgmole-C | 44.9537 | 176.2348 | 81.8874 | — |
| Therm Cond | Watt/m-K | 0.0245 | 0.0374 | 0.1710 | — |
| Viscosity | Cp | 0.0155 | 0.0117 | 0.1891 | — |
| Sur Tension | Dyne/cm | — | — | 16.4346 | — |

TABLE 30-continued

CO2 Recovery from Natural Gas (FIG. 5)
Material Balance

| | | | | | |
|---|---|---|---|---|---|
| Std Density | Kg/m3 | — | — | 801.2128 | — |
| Z Factor | | 0.8570 | 0.4594 | 0.0226 | — |
| Hydrogen | Kgmole/hr | 26.8140 * | 26.7866 | 0.0000 * | 0.0274 |
| N2 | Kgmole/hr | 147.4790 * | 145.5366 | 1.6354 * | 0.3070 |
| H2S | Kgmole/hr | 0.1160 * | 0.0000 | 0.1160 * | 0.0000 |
| CO2 | Kgmole/hr | 8906.0234 * | 14.8683 | 8890.6504 * | 0.5046 |
| Methane | Kgmole/hr | 1266.9810 * | 1134.2388 | 130.8671 * | 1.8751 |
| Ethane | Kgmole/hr | 26.8140 * | 0.8344 | 26.7005 * | −0.7208 |
| Propane | Kgmole/hr | 11.1730 * | 0.0000 | 11.1702 * | 0.0028 |
| Total | Kgmole/hr | 10385.4014 * | 1322.2645 | 9061.1396 * | 1.9971 |

| Stream | | 51 | 19 | 13 | 30 |
|---|---|---|---|---|---|
| Name | | REFLUX | TOWER 2 IN | TOWER 3 IN | RICH RECYCLE |
| Vapour frac. | | 0.0927 | 0.2777 | 0.1748 | 0.4483 |
| Temperature | C. | −89.7443 | −61.8000 | −53.0000 * | −59.5289 |
| Pressure | Kpa a | 4500.0000 * | 2640.0000 * | 1078.5044 | 2645.0000 * |
| Molar Flow | Kgmole/hr | 3416.8477 | 775.6005 | 11144.7090 | 2084.3000 |
| Mass Flow | Kg/hr | 59391.7109 | 24162.2441 | 462993.0000 | 68293.9531 |
| Volume Flow | M3/hr | 177.7300 | 45.2904 | 593.7190 | 110.3548 |
| Enthalpy | KJ/hr | 3.94846E+06 | −1.49516E+06 | −6.67391E+07 | −3.35664E+06 |
| Density | Kg/m3 | 232.3282 | 177.5339 | 139.6074 | 124.8427 |
| Mole Wt. | | 17.3820 | 31.1530 | 41.5438 | 32.7659 |
| Spec. Heat | KJ/Kgmole-C | 185.7925 | 70.4770 | 72.4842 | 62.4287 |
| Therm Cond | Watt/m-K | — | — | — | — |
| Viscosity | Cp | — | — | — | — |
| Sur Tension | Dyne/cm | — | — | — | — |
| Std Density | Kg/m3 | — | — | — | — |
| Z Factor | | — | — | — | — |
| Hydrogen | Kgmole/hr | 25.1014 | 0.7734 | 3.9149 | 3.9153 |
| N2 | Kgmole/hr | 240.8509 | 13.5097 | 68.4562 | 66.8309 |
| H2S | Kgmole/hr | 0.0000 | 0.0020 | 0.1298 | 0.0138 |
| CO2 | Kgmole/hr | 70.2442 | 345.7680 | 10100.0986 | 1209.7102 |
| Methane | Kgmole/hr | 3074.9607 | 280.3562 | 916.4879 | 785.7894 |
| Ethane | Kgmole/hr | 5.6904 | 135.0509 | 42.6535 | 16.2424 |
| Propane | Kgmole/hr | 0.0000 | 0.1403 | 12.9678 | 1.7981 |
| Total | Kgmole/hr | 3416.8477 | 775.6005 | 11144.7090 | 2084.3000 |

| Stream | | 59 | 40 |
|---|---|---|---|
| Name | | LEAN RECYCLE | TOWER 1 OVHD |
| Vapour frac. | | 0.9863 | 0.2790 |
| Temperature | C. | −53.0428 | −88.5402 |
| Pressure | Kpa a | 4510.0000 * | 4705.0000 |
| Molar Flow | Kgmole/hr | 2099.6677 | 4739.1123 |
| Mass Flow | Kg/hr | 47190.8320 | 82398.6641 |
| Volume Flow | M3/hr | 112.7118 | 245.0641 |
| Enthalpy | KJ/hr | 1.07038E+07 | 8.37669E+06 |
| Density | Kg/m3 | 85.1440 | 188.1072 |
| Mole Wt. | | 22.4754 | 17.3869 |
| Spec. Heat | KJ/Kgmole-C | 64.1362 | 207.5904 |
| Therm Cond | Watt/m-K | — | — |
| Viscosity | Cp | — | — |
| Sur Tension | Dyne/cm | — | — |
| Std Density | Kg/m3 | — | — |
| Z Factor | | — | — |
| Hydrogen | Kgmole/hr | 27.5910 | 51.8880 |
| N2 | Kgmole/hr | 159.3602 | 386.3875 |
| H2S | Kgmole/hr | 0.0020 | 0.0000 |
| CO2 | Kgmole/hr | 360.2976 | 85.1125 |
| Methane | Kgmole/hr | 1416.4723 | 4209.1997 |
| Ethane | Kgmole/hr | 135.8043 | 6.5247 |
| Propane | Kgmole/hr | 0.1403 | 0.0000 |
| Total | Kgmole/hr | 2099.6677 | 4739.1123 |

TABLE 31

CO2 Recovery from Natural Gas (FIG. 5)
Stream Compositions

| Stream | | 41 | 60 |
|---|---|---|---|
| Name | | DEHY OUTLET | LPG REID VP |
| Vapour frac. | | 1.0000 | 0.0000 * |
| Temperature | C. | −8.7406 | 37.7778 * |
| Pressure | Kpa a | 3870.0000 * | 1397.7695 |
| Molar Flow | Kgmole/hr | 608.9576 | 30.5992 |
| Mass Flow | Kg/hr | 11813.7881 | 1441.8444 |
| Volume Flow | M3/hr | 35.4232 | 2.8018 |
| Enthalpy | KJ/hr | 4.84553E+06 | 11026.9502 |
| Density | Kg/m3 | 41.5299 | 491.6014 |
| Mole Wt. | | 19.4000 | 47.1203 |

TABLE 31-continued

CO2 Recovery from Natural Gas (FIG. 5)
Stream Compositions

|  |  |  |  |  |  |
|---|---|---|---|---|---|
| Spec. Heat | KJ/Kgmole-C | 48.1491 | 134.8213 |  |  |
| Therm Cond | Watt/m-K | — | 0.0923 |  |  |
| Viscosity | Cp | — | 0.0955 |  |  |
| Sur Tension | Dyne/cm | — | 6.2805 |  |  |
| Std Density | Kg/m3 | — | 525.6946 |  |  |
| Z Factor |  | — | 0.0518 |  |  |
| N2 |  | 0.0166 | 0.0000 |  |  |
| CO2 |  | 0.0002 | 0.0000 |  |  |
| Methane |  | 0.8344 | 0.0000 |  |  |
| Ethane |  | 0.0915 | 0.1379 |  |  |
| Propane |  | 0.0409 | 0.5516 |  |  |
| i-Butane |  | 0.0068 | 0.1257 |  |  |
| n-Butane |  | 0.0078 | 0.1483 |  |  |
| i-Pentan |  | 0.0010 | 0.0191 |  |  |
| n-Pentan |  | 0.0006 | 0.0127 |  |  |
| n-Hexane |  | 0.0002 | 0.0038 |  |  |
| n-Octane |  | 0.0000 | 0.0009 |  |  |

| Stream |  | 51 | 19 | 30 | 59 |
|---|---|---|---|---|---|
| Name |  | GAS FRAC LIQ | PLANT INLET | LOW TEMP LIQ | LPG PRODUCT |
| Vapour frac. |  | 0.0000 | 0.9835 | 0.0000 | 0.0000 |
| Temperature | C. | −68.2282 | 3.0000 * | −8.6641 | 37.7988 |
| Pressure | Kpa a | 3550.0000 | 1140.0000 * | 3880.0000 | 1470.0000 * |
| Molar Flow | Kgmole/hr | 102.4116 | 547.8779 * | 63.4545 | 30.5992 |
| Mass Flow | Kg/hr | 3111.9280 | 11111.7988 | 3008.2058 | 1441.8444 |
| Volume Flow | M3/hr | 7.5570 | 32.1156 | 5.7646 | 2.8018 |
| Enthalpy | KJ/hr | −526802.1250 | 4.97228E+06 | −230736.5313 | 11026.9502 |
| Density | Kg/m3 | 502.0868 | 10.6961 | 553.5582 | 491.5682 |
| Mole Wt. |  | 30.3865 | 20.2815 | 47.4073 | 47.1203 |
| Spec. Heat | KJ/Kgmole-C | 76.8780 | 42.7273 | 111.7226 | 134.6348 |
| Therm Cond | Watt/m-K | 0.1322 | — | 0.1156 | 0.0923 |
| Viscosity | Cp | 0.1167 | — | 0.1463 | 0.0954 |
| Sur Tension | Dyne/cm | 10.1259 | — | 10.3698 | 6.2781 |
| Std Density | Kg/m3 | 257.7187 | — | 519.2969 | 525.6946 |
| Z Factor |  | 0.1261 | — | 0.1511 | 0.0545 |
| N2 |  | 0.0023 | 0.0180 * | 0.0015 | 0.0000 |
| CO2 |  | 0.0003 | 0.0002 * | 0.0001 | 0.0000 |
| Methane |  | 0.4161 | 0.8496 * | 0.2288 | 0.0000 |
| Ethane |  | 0.2532 | 0.0621 * | 0.1391 | 0.1379 |
| Propane |  | 0.2304 | 0.0332 * | 0.2176 | 0.5516 |
| i-Butane |  | 0.0406 | 0.0073 * | 0.0877 | 0.1257 |
| n-Butane |  | 0.0461 | 0.0098 * | 0.1421 | 0.1483 |
| i-Pentan |  | 0.0058 | 0.0042 * | 0.0423 | 0.0191 |
| n-Pentan |  | 0.0038 | 0.0040 * | 0.0380 | 0.0127 |
| n-Hexane |  | 0.0011 | 0.0039 * | 0.0350 | 0.0038 |
| n-Octane |  | 0.0003 | 0.0078 * | 0.0678 | 0.0009 |

| Stream |  | 40 |
|---|---|---|
| Name |  | LOW TEMP GAS |
| Vapour frac. |  | 1.0000 |
| Temperature | C. | −8.6641 |
| Pressure | Kpa a | 3880.0000 |
| Molar Flow | Kgmole/hr | 608.9576 |
| Mass Flow | Kg/hr | 11813.7881 |
| Volume Flow | M3/hr | 35.4232 |
| Enthalpy | KJ/hr | 4.84553E+06 |
| Density | Kg/m3 | 41.6423 |
| Mole Wt. |  | 19.4000 |
| Spec. Heat | KJ/Kgmole-C | 48.1800 |
| Therm Cond | Watt/m-K | 0.0336 |
| Viscosity | Cp | 0.0112 |
| Sur Tension | Dyne/cm | — |
| Std Density | Kg/m3 | — |
| Z Factor |  | 0.8220 |
| N2 |  | 0.0166 |
| CO2 |  | 0.0002 |
| Methane |  | 0.8344 |
| Ethane |  | 0.0915 |
| Propane |  | 0.0409 |
| i-Butane |  | 0.0068 |
| n-Butane |  | 0.0078 |
| i-Pentan |  | 0.0010 |
| n-Pentan |  | 0.0006 |
| n-Hexane |  | 0.0002 |
| n-Octane |  | 0.0000 |

| Stream |  | 1 | 41 | 60 |
|---|---|---|---|---|
| Name |  | PLANT INLET | RESIDUE GAS | CO2 PRODUCT |
| Vapour frac. |  | 1.0000 | 1.0000 | 0.0000 |
| Temperature | C. | 25.0000 * | −88.5402 | −47.5295 * |

TABLE 31-continued
CO2 Recovery from Natural Gas (FIG. 5)
Stream Compositions

| | | | | |
|---|---|---:|---:|---:|
| Pressure | Kpa a | 2800.0000 * | 4705.0000 | 1091.0000 * |
| Molar Flow | Kgmole/hr | 10385.4014 * | 1322.2645 | 9061.1396 * |
| Mass Flow | Kg/hr | 417768.5625 | 23006.9531 | 394722.2188 |
| Volume Flow | M3/hr | 550.8240 | 67.3341 | 483.4119 |
| Enthalpy | KJ/hr | 8.63445E+07 | 4.42822E+06 | −7.47548E+07 |
| Density | Kg/m3 | 53.0194 | 116.1075 | 1121.6316 |
| Mole Wt. | | 40.2265 | | |

| Stream | | 1 | 41 | 60 |
|---|---|---:|---:|---:|
| Name | | PLANT INLET | RESIDUE GAS | CO2 PRODUCT |
| Vapour frac. | | 1.0000 | 1.0000 | 0.0000 |
| Temperature | C. | 25.0000 * | −88.5402 | −47.5295 * |
| Pressure | Kpa a | 2800.0000 * | 4705.0000 | 1091.0000 * |
| Molar Flow | Kgmole/hr | 10385.4014 * | 1322.2645 | 9061.1396 * |
| Mass Flow | Kg/hr | 417768.5625 | 23006.9531 | 394722.2188 |
| Volume Flow | M3/hr | 550.8240 | 67.3341 | 483.4119 |
| Enthalpy | KJ/hr | 8.63445E+07 | 4.42822E+06 | −7.47548E+07 |
| Density | Kg/m3 | 53.0194 | 116.1075 | 1121.6316 |
| Mole Wt. | | 40.2265 | 17.3997 | 43.5621 |
| Spec. Heat | KJ/Kgmole-C | 44.9537 | 176.2348 | 81.8874 |
| Therm Cond | Watt/m-K | 0.0245 | 0.0374 | 0.1710 |
| Viscosity | Cp | 0.0155 | 0.0117 | 0.1891 |
| Sur Tension | Dyne/cm | — | — | 16.4346 |
| Std Density | Kg/m3 | — | — | 801.2128 |
| Z Factor | | 0.8570 | 0.4594 | 0.0226 |
| Hydrogen | | 0.0026 * | 0.0203 | 0.0000 * |
| N2 | | 0.0142 * | 0.1101 | 0.0002 * |
| H2S | | 0.0000 * | 0.0000 | 0.0000 * |
| CO2 | | 0.8576 * | 0.0112 | 0.9812 * |
| Methane | | 0.1220 * | 0.8578 | 0.0144 * |
| Ethane | | 0.0026 * | 0.0006 | 0.0029 * |
| Propane | | 0.0011 * | 0.0000 | 0.0012 * |

| Stream | | 51 | 19 | 13 | 30 |
|---|---|---:|---:|---:|---:|
| Name | | REFLUX | TOWER 2 IN | TOWER 3 IN | RICH RECYCLE |
| Vapour frac. | | 0.0927 | 0.2777 | 0.1748 | 0.4483 |
| Temperature | C. | −89.7443 | −61.8000 | −53.0000 * | −59.5289 |
| Pressure | Kpa a | 4500.0000 * | 2640.0000 * | 1078.5044 | 2645.0000 * |
| Molar Flow | Kgmole/hr | 3416.8477 | 775.6005 | 11144.7090 | 2084.3000 |
| Mass Flow | Kg/hr | 59391.7109 | 24162.2441 | 462993.0000 | 68293.9531 |
| Volume Flow | M3/hr | 177.7300 | 45.2904 | 593.7190 | 110.3548 |
| Enthalpy | KJ/hr | 3.94846E+06 | −1.49516E+06 | −6.67391E+07 | −3.35664E+06 |
| Density | Kg/m3 | 232.3282 | 177.5339 | 139.6074 | 124.8427 |
| Mole Wt. | | 17.3820 | 31.1530 | 41.5438 | 32.7659 |
| Spec. Heat | KJ/Kgmole-C | 185.7925 | 70.4770 | 72.4842 | 62.4287 |
| Therm Cond | Watt/m-K | — | — | — | — |
| Viscosity | Cp | — | — | — | — |
| Sur Tension | Dyne/cm | — | — | — | — |
| Std Density | Kg/m3 | — | — | — | — |
| Z Factor | | — | — | — | — |
| Hydrogen | | 0.0073 | 0.0010 | 0.0004 | 0.0019 |
| N2 | | 0.0705 | 0.0174 | 0.0061 | 0.0321 |
| H2S | | 0.0000 | 0.0000 | 0.0000 | 0.0000 |
| CO2 | | 0.0206 | 0.4458 | 0.9063 | 0.5804 |
| Methane | | 0.8999 | 0.3615 | 0.0822 | 0.3770 |
| Ethane | | 0.0017 | 0.1741 | 0.0038 | 0.0078 |
| Propane | | 0.0000 | 0.0002 | 0.0012 | 0.0009 |

| Stream | | 59 | 40 |
|---|---|---:|---:|
| Name | | LEAN RECYCLE | TOWER 1 OVHD |
| Vapour frac. | | 0.9863 | 0.2790 |
| Temperature | C. | −53.0428 | −88.5402 |
| Pressure | Kpa a | 4510.0000 * | 4705.0000 |
| Molar Flow | Kgmole/hr | 2099.6677 | 4739.1123 |
| Mass Flow | Kg/hr | 47190.8320 | 82398.6641 |
| Volume Flow | M3/hr | 112.7118 | 245.0641 |
| Enthalpy | KJ/hr | 1.07038E+07 | 8.37669E+06 |
| Density | Kg/m3 | 85.1440 | 188.1072 |
| Mole Wt. | | 22.4754 | 17.3869 |
| Spec. Heat | KJ/Kgmole-C | 64.1362 | 207.5904 |
| Therm Cond | Watt/m-K | — | — |
| Viscosity | Cp | — | — |
| Sur Tension | Dyne/cm | — | — |
| Std Density | Kg/m3 | — | — |
| Z Factor | | — | — |
| Hydrogen | | 0.0131 | 0.0109 |
| N2 | | 0.0759 | 0.0815 |
| H2S | | 0.0000 | 0.0000 |
| CO2 | | 0.1716 | 0.0180 |
| Methane | | 0.6746 | 0.8882 |

TABLE 31-continued

CO2 Recovery from Natural Gas (FIG. 5)
Stream Compositions

| | | |
|---|---|---|
| Ethane | 0.0647 | 0.0014 |
| Propane | 0.0001 | 0.0000 |

TABLE 32

CO2 Recovery from Natural Gas
CO2 Freezing Points

| | | | |
|---|---|---|---|
| C | Stream | 7 CO2 freezing point is | −59.879 |
| Stream | 12 CO2 freezing point is | −59.024 C | |
| Stream | 13 CO2 freezing point is | −57.482 C | |
| Stream | 30 CO2 freezing point is | −60.622 C | |
| Stream | 59 CO2 freezing point is | −72.463 C | |
| Stream | 40 CO2 freezing point is | −114.484 C | |
| Stream | 50 CO2 freezing point is | −112.407 C | |
| Stream | 51 CO2 freezing point is | −112.354 C | |
| Stream | 18 CO2 freezing point is | −66.940 C | |
| Stream | 19 CO2 freezing point is | −66.940 C | |

| Stream | 7 | 12 | 13 | 30 |
|---|---|---|---|---|
| Name | TOWER 2 IN | TOWER 2 LIQ | TOWER 3 IN | RICH RECYCLE |
| Temperature C | −53.6560 | −42.7272 | −53.0000 * | −59.5289 |

| Stream | 59 | 40 | 50 | 51 |
|---|---|---|---|---|
| Name | LEAN RECYCLE | TOWER 1 OVHD | REFLUX | REFLUX |
| Temperature C | −53.0428 | −88.5402 | −88.5402 | −89.7443 |

| Stream | 18 | 19 |
|---|---|---|
| Name | TOWER 1 LIQ | TOWER 2 IN |
| Temperature C | −61.8000 * | −61.8000 |

TABLE 33

CO2 Recovery from Natural Gas (FIG. 5)
Tower 1 Column Profiles

Hyprotech's Process Simulator HYSIM - Licensed to Bob Stothers
Case Name SHELL610   Date 1980/ 1/ 1   Time 6:10:33
COMPUTED RESULTS

Feed Conditions

| Feed Stream Number | 51 | |
|---|---|---|
| Enters on stage | 1 | |
| Liquid Fraction | 0.9073 | |
| Temperature | −89.74 | C |
| Pressure | 4500.00 | Kpa a |
| Flowrate | 3416.85 | Kgmole/hr |
| Enthalpy | 3948466. | KJ/hr |
| Hydrogen | 25.1014 | Kgmole/hr |
| N2 | 240.8509 | Kgmole/hr |
| H2S | 0.0000 | Kgmole/hr |
| CO2 | 70.2442 | Kgmole/hr |
| Methane | 3074.9607 | Kgmole/hr |
| Ethane | 5.6904 | Kgmole/hr |
| Propane | 0.0000 | Kgmole/hr |

| Feed Stream Number | 59 | |
|---|---|---|
| Enters on stage | 10 | |
| Liquid Fraction | 0.0137 | |
| Temperature | −53.04 | C |
| Pressure | 4510.00 | Kpa a |
| Flowrate | 2099.67 | Kgmole/hr |
| Enthalpy | 10703807. | KJ/hr |
| Hydrogen | 27.5910 | Kgmole/hr |
| N2 | 159.3602 | Kgmole/hr |
| H2S | 0.0020 | Kgmole/hr |
| CO2 | 360.2976 | Kgmole/hr |
| Methane | 1416.4723 | Kgmole/hr |
| Ethane | 135.8043 | Kgmole/hr |
| Propane | 0.1403 | Kgmole/hr |

Hyprotech's Process Simulator HYSIM - Licensed to Bob Stothers
Case Name SHELL610   Date 1980/ 1/ 1   Time 6:10:37
Stage Variables

| Stage | Press Kpa | Temp Deg C | Molar Flow Rates | | | Heat Duty GJ/Hour |
|---|---|---|---|---|---|---|
| | | | Liquid | Vapour | Feed | |
| 1 | 4500.00 | −86.561 | 2997.02 | 4739.11 | 3415.05 | |
| 2 | 4501.11 | −84.211 | 2584.55 | 4321.09 | | |

TABLE 33-continued

$CO_2$ Recovery from Natural Gas (FIG. 5)
Tower 1 Column Profiles

| | | | | | |
|---|---|---|---|---|---|
| 3 | 4502.22 | −81.606 | 2015.62 | 3908.61 | |
| 4 | 4503.33 | −77.485 | 1436.01 | 3339.69 | |
| 5 | 4504.44 | −70.652 | 1018.66 | 2760.07 | |
| 6 | 4505.56 | −62.483 | 832.37 | 2342.72 | |
| 7 | 4506.67 | −56.934 | 774.53 | 2156.44 | |
| 8 | 4507.78 | −54.451 | 757.18 | 2098.60 | |
| 9 | 4508.89 | −53.514 | 750.74 | 2081.25 | |
| 10 | 4510.00 | −53.173 | 775.60 | 2074.80 | 2099.67 |

Hyprotech's Process Simulator HYSIM - Licensed to Bob Stothers
Case Name SHELL610   Date 1980/ 1/ 1   Time 6:11:24

Products

| | Vapour from Stage 1 | | Liquid from Stage 10 | |
|---|---|---|---|---|
| | Kg Mol/Hour | Mol Frc | Kg Mol/Hour | Mol Frc |
| Hydrogen | 51.888 | 0.01095 | 0.773 | 0.00100 |
| N2 | 386.387 | 0.08153 | 13.510 | 0.01742 |
| H2S | 0.000 | 0.00000 | 0.002 | 0.00000 |
| CO2 | 85.112 | 0.01796 | 345.768 | 0.44581 |
| Methane | 4209.200 | 0.88818 | 280.356 | 0.36147 |
| Ethane | 6.525 | 0.00138 | 135.051 | 0.17412 |
| Propane | 0.000 | 0.00000 | 0.140 | 0.00018 |
| Total | 4739.112 | | 775.600 | |

Hyprotech's Process Simulator HYSIM - Licensed to Bob Stothers
Case Name SHELL610   Date 1980/ 1/ 1   Time 6:12:21

PHYSICAL PROPERTIES

VAPOUR LEAVING FROM EACH STAGE

| STAGE | MOL WT | FLOW KG/HOUR | M ACMH | DENSITY KG/M3 | REDUCED TEMP | PRESS |
|---|---|---|---|---|---|---|
| 1 | 17.387 | 82399. | 0.770 | 106.98844 | 1.00315 | 0.98724 |
| 2 | 17.536 | 75776. | 0.723 | 104.83648 | 1.00204 | 0.97653 |
| 3 | 17.881 | 69889. | 0.695 | 100.59366 | 1.00448 | 0.96787 |
| 4 | 18.478 | 61712. | 0.653 | 94.56502 | 1.01197 | 0.95795 |
| 5 | 19.428 | 53622. | 0.609 | 88.07607 | 1.02618 | 0.94452 |
| 6 | 20.650 | 48377. | 0.574 | 84.34648 | 1.03996 | 0.92799 |
| 7 | 21.601 | 46580. | 0.557 | 83.55990 | 1.04573 | 0.91515 |
| 8 | 22.064 | 46303. | 0.554 | 83.59234 | 1.04719 | 0.90888 |
| 9 | 22.247 | 46302. | 0.553 | 83.67741 | 1.04756 | 0.90646 |
| 10 | 22.319 | 46308. | 0.553 | 83.73256 | 1.04770 | 0.90555 |

LIQUID LEAVING FROM EACH STAGE

| STAGE | MOL WT | FLOW KG/HOUR | M3/HR | DENSITY KG/M3 | REDUCED TEMP | PRESS |
|---|---|---|---|---|---|---|
| 1 | 17.600 | 52748. | 197.470 | 267.08103 | 0.97433 | 0.96402 |
| 2 | 18.131 | 46861. | 165.756 | 282.67140 | 0.96789 | 0.94933 |
| 3 | 19.192 | 38684. | 122.737 | 315.13469 | 0.95346 | 0.92859 |
| 4 | 21.305 | 30595. | 81.088 | 377.24825 | 0.92474 | 0.89377 |
| 5 | 24.884 | 25348. | 53.297 | 475.54196 | 0.88245 | 0.84247 |
| 6 | 28.295 | 23552. | 42.026 | 560.33710 | 0.85521 | 0.79942 |
| 7 | 30.050 | 23275. | 38.847 | 599.05380 | 0.84814 | 0.77912 |
| 8 | 30.737 | 23273. | 37.950 | 613.17751 | 0.84688 | 0.77148 |
| 9 | 31.008 | 23279. | 37.600 | 619.02878 | 0.84645 | 0.76843 |
| 10 | 31.153 | 24162. | 38.788 | 622.84466 | 0.84595 | 0.76666 |

Hyprotech's Process Simulator HYSIM - Licensed to Bob Stothers
Case Name SHELL610   Date 1980/ 1/ 1   Time 6:14:17

TRANSPORT PROPERTIES

| | VAPOUR | | LIQUID | | |
|---|---|---|---|---|---|
| STAGE NO. | VISCOSITY CP | THERMAL CONDUCTIVITY WATT/M-K | VISCOSITY CP | THERMAL CONDUCTIVITY WATT/M-K | SURFACE TENSION DYNE/CM |
| 1 | 0.01128 | 0.03602 | 0.02582 | 0.06917 | 0.3445 |
| 2 | 0.01123 | 0.03574 | 0.02758 | 0.07197 | 0.4636 |
| 3 | 0.01110 | 0.03500 | 0.03139 | 0.07746 | 0.7738 |
| 4 | 0.01096 | 0.03395 | 0.03938 | 0.08737 | 1.5583 |
| 5 | 0.01094 | 0.03287 | 0.05403 | 0.10153 | 3.1558 |
| 6 | 0.01111 | 0.03212 | 0.06828 | 0.11141 | 4.6364 |
| 7 | 0.01131 | 0.03174 | 0.07487 | 0.11455 | 5.2211 |
| 8 | 0.01141 | 0.03158 | 0.07714 | 0.11534 | 5.3950 |
| 9 | 0.01145 | 0.03152 | 0.07803 | 0.11566 | 5.4617 |
| 10 | 0.01147 | 0.03150 | 0.07859 | 0.11596 | 5.5101 |

TABLE 34

CO2 Recovery from Natural Gas (FIG. 5)
Tower #2 Column Profiles

Hyprotech's Process Simulator HYSIM - Licensed to Bob Stothers
Case Name SHELL610   Date 1980/ 1/ 1   Time 6:26:32

Stage Variables

| Stage | Press Kpa | Temp Deg C | Molar Flow Rates | | | Heat Duty GJ/Hour |
|---|---|---|---|---|---|---|
| | | | Liquid | Vapour | Feed | |
| 1 | 2640.00 | −62.493 | 510.55 | 2099.67 | 774.67 | |
| 2 | 2641.43 | −61.315 | 452.85 | 1835.54 | | |
| 3 | 2642.86 | −59.590 | 1587.38 | 1777.85 | 2084.30 | |
| 4 | 2644.29 | −58.438 | 1581.67 | 828.07 | | |
| 5 | 2645.71 | −57.117 | 1585.10 | 822.36 | | |
| 6 | 2647.14 | −55.969 | 1586.76 | 825.80 | | |
| 7 | 2648.57 | −54.931 | 1584.01 | 827.45 | | |
| 8 | 2650.00 | −53.833 | 11144.71 | 824.70 | 10385.40 | |

Hyprotech's Process Simulator HYSIM - Licensed to Bob Stothers
Case Name SHELL610   Date 1980/ 1/ 1   Time 6:25:56

COMPUTED RESULTS

Feed Conditions

| Feed Stream Number | 19 | |
|---|---|---|
| Enters on stage | 1 | |
| Liquid Fraction | 0.7223 | |
| Temperature | −61.80 | C |
| Pressure | 2640.00 | Kpa a |
| Flowrate | 775.60 | Kgmole/hr |
| Enthalpy | −1495162. | KJ/hr |
| Hydrogen | 0.7734 | Kgmole/hr |
| N2 | 13.5097 | Kgmole/hr |
| H2S | 0.0020 | Kgmole/hr |
| CO2 | 345.7680 | Kgmole/hr |
| Methane | 280.3562 | Kgmole/hr |
| Ethane | 135.0509 | Kgmole/hr |
| Propane | 0.1403 | Kgmole/hr |

| Feed Stream Number | 30 | |
|---|---|---|
| Enters on stage | 3 | |
| Liquid Fraction | 0.5517 | |
| Temperature | −59.53 | C |
| Pressure | 2645.00 | Kpa a |
| Flowrate | 2084.30 | Kgmole/hr |
| Enthalpy | −3356640. | KJ/hr |
| Hydrogen | 3.9153 | Kgmole/hr |
| N2 | 66.8309 | Kgmole/hr |
| H2S | 0.0138 | Kgmole/hr |
| CO2 | 1209.7102 | Kgmole/hr |
| Methane | 785.7894 | Kgmole/hr |
| Ethane | 16.2424 | Kgmole/hr |
| Propane | 1.7981 | Kgmole/hr |

| Feed Stream Number | 7 | |
|---|---|---|
| Enters on stage | 8 | |
| Liquid Fraction | 0.9206 | |
| Temperature | −53.66 | C |
| Pressure | 2650.00 | Kpa a |
| Flowrate | 10385.40 | Kgmole/hr |
| Enthalpy | −67821064. | KJ/hr |
| Hydrogen | 26.8140 | Kgmole/hr |
| N2 | 147.4790 | Kgmole/hr |
| H2S | 0.1160 | Kgmole/hr |
| CO2 | 8906.0234 | Kgmole/hr |
| Methane | 1266.9810 | Kgmole/hr |
| Ethane | 26.8140 | Kgmole/hr |
| Propane | 11.1730 | Kgmole/hr |

Hyprotech's Process Simulator HYSIM - Licensed to Bob Stothers
Case Name SHELL610   Date 1980/ 1/ 1   Time 6:27:17

Products

| | Vapour from Stage 1 | | Liquid from Stage 8 | |
|---|---|---|---|---|
| | Kg Mol/Hour | Mol Frc | Kg Mol/Hour | Mol Frc |
| Hydrogen | 27.591 | 0.01314 | 3.915 | 0.00035 |
| N2 | 159.360 | 0.07590 | 68.456 | 0.00614 |
| H2S | 0.002 | 0.00000 | 0.130 | 0.00001 |
| CO2 | 360.298 | 0.17160 | 10100.099 | 0.90627 |
| Methane | 1416.472 | 0.67462 | 916.488 | 0.08224 |
| Ethane | 135.804 | 0.06468 | 42.654 | 0.00383 |
| Propane | 0.140 | 0.00007 | 12.968 | 0.00116 |
| Total | 2099.668 | | 11144.709 | |

Hyprotech's Process Simulator HYSIM - Licensed to Bob Stothers

TABLE 34-continued

CO2 Recovery from Natural Gas (FIG. 5)
Tower #2 Column Profiles

Case Name SHELL610  Date 1980/ 1/ 1  Time 6:28:12

PHYSICAL PROPERTIES

VAPOUR LEAVING FROM EACH STAGE

| STAGE | MOL WT | FLOW KG/HOUR | M ACMH | DENSITY KG/M3 | REDUCED TEMP | REDUCED PRESS |
|---|---|---|---|---|---|---|
| 1 | 22.475 | 47191. | 1.092 | 43.21873 | 0.99954 | 0.52837 |
| 2 | 22.737 | 41734. | 0.972 | 42.94365 | 1.00983 | 0.52503 |
| 3 | 22.987 | 40867. | 0.962 | 42.49892 | 1.02168 | 0.52038 |
| 4 | 23.363 | 19346. | 0.455 | 42.48059 | 1.03754 | 0.52425 |
| 5 | 23.725 | 19510. | 0.456 | 42.80409 | 1.03849 | 0.52168 |
| 6 | 24.012 | 19829. | 0.461 | 43.05540 | 1.03840 | 0.51888 |
| 7 | 24.258 | 20072. | 0.464 | 43.22425 | 1.03926 | 0.51621 |
| 8 | 24.495 | 20201. | 0.467 | 43.29175 | 1.04220 | 0.51325 |

LIQUID LEAVING FROM EACH STAGE

| STAGE | MOL WT | FLOW KG/HOUR | M3/HR | DENSITY KG/M3 | REDUCED TEMP | REDUCED PRESS |
|---|---|---|---|---|---|---|
| 1 | 36.561 | 18666. | 21.948 | 850.33990 | 0.74706 | 0.40851 |
| 2 | 39.301 | 17798. | 18.257 | 974.67885 | 0.73491 | 0.38664 |
| 3 | 40.677 | 64570. | 62.108 | 1039.50602 | 0.73322 | 0.37643 |
| 4 | 40.928 | 64735. | 61.907 | 1045.54310 | 0.73498 | 0.37549 |
| 5 | 41.041 | 65053. | 62.199 | 1045.74618 | 0.73849 | 0.37508 |
| 6 | 41.151 | 65297. | 62.360 | 1046.94054 | 0.74154 | 0.37459 |
| 7 | 41.304 | 65425. | 62.235 | 1051.11949 | 0.74411 | 0.37372 |
| 8 | 41.544 | 462993. | 436.600 | 1060.30578 | 0.74658 | 0.37213 |

Hyprotech's Process Simulator HYSIM - Licensed to Bob Stothers
Case Name SHELL610  Date 1980/ 1/ 1  Time 6:40:12

TRANSPORT PROPERTIES

| STAGE NO. | VAPOUR VISCOSITY CP | VAPOUR THERMAL CONDUCTIVITY WATT/M-K | LIQUID VISCOSITY CP | LIQUID THERMAL CONDUCTIVITY WATT/M-K | SURFACE TENSION DYNE/CM |
|---|---|---|---|---|---|
| 1 | 0.00979 | 0.02615 | 0.14385 | 0.15613 | 12.5439 |
| 2 | 0.00992 | 0.02630 | 0.17041 | 0.16791 | 14.7317 |
| 3 | 0.01006 | 0.02650 | 0.18300 | 0.17244 | 15.6691 |
| 4 | 0.01025 | 0.02684 | 0.18366 | 0.17197 | 15.6571 |
| 5 | 0.01035 | 0.02680 | 0.18198 | 0.17070 | 15.4577 |
| 6 | 0.01043 | 0.02677 | 0.18067 | 0.16970 | 15.2960 |
| 7 | 0.01050 | 0.02676 | 0.18010 | 0.16904 | 15.1976 |
| 8 | 0.01059 | 0.02681 | 0.18039 | 0.16872 | 15.1639 |

TABLE 35

$CO_2$ Recovery from Natural Gas (FIG. 5) Tower #3 Column Profiles

Hyprotech's Process Simulator HYSIM - Licensed to Bob Stothers
Case Name SHELL610  Date 1980/1/1  Time 6:48:38

COMPUTED RESULTS

| Feed Conditions | | |
|---|---|---|
| Feed Stream Number | 13 | |
| Enters on stage | 1 | |
| Liquid Fraction | 0.8252 | |
| Temperature | −53.00 | C. |
| Pressure | 1078.50 | Kpa a |
| Flowrate | 11144.71 | Kgmole/hr |
| Enthalpy | −66739136. | KJ/hr |
| Hydrogen | 3.9149 | Kgmole/hr |
| N2 | 68.4562 | Kgmole/hr |
| H2S | 0.1298 | Kgmole/hr |
| CO2 | 10100.0986 | Kgmole/hr |
| Methane | 916.4879 | Kgmole/hr |
| Ethane | 42.6535 | Kgmole/hr |
| Propane | 12.9678 | Kgmole/hr |

Hyprotech's Process Simulator HYSIM - Licensed to Bob Stothers
Case Name SHELL610  Date 1980/1/1  Time 6:48:40

Stage Variables

| Stage | Press Kpa | Temp Deg C. | Molar Flow Rates Liquid | Molar Flow Rates Vapour | Molar Flow Rates Feed | Heat Duty GJ/Hour |
|---|---|---|---|---|---|---|
| 1 | 1078.00 | −53.012 | 9196.32 | 2084.30 | 11145.44 | |
| 2 | 1079.44 | −52.985 | 9198.54 | 135.18 | | |
| 3 | 1080.89 | −52.967 | 9200.10 | 137.40 | | |
| 4 | 1082.33 | −52.951 | 9201.65 | 138.96 | | |
| 5 | 1083.78 | −52.931 | 9203.45 | 140.51 | | |
| 6 | 1085.22 | −52.904 | 9205.71 | 142.31 | | |

TABLE 35-continued

CO₂ Recovery from Natural Gas (FIG. 5) Tower #3 Column Profiles

| | | | | | |
|---|---|---|---|---|---|
| 7 | 1086.67 | −52.854 | 9208.95 | 144.57 | |
| 8 | 1088.11 | −52.699 | 9216.26 | 147.81 | |
| 9 | 1089.56 | −51.863 | 9248.90 | 155.12 | |
| 10 | 1091.00 | −47.529 | 9061.14 | 187.76 | 5.20068 |

Hyprotech's Process Simulator HYSIM - Licensed to Bob Stothers
Case Name SHELL610   Date 1980/1/1   Time 6:48:55

Products

| | Vapour from Stage 1 | | Liquid from Stage 10 | |
|---|---|---|---|---|
| | Kg Mol/Hour | Mol Frc | Kg Mol/Hour | Mol Frc |
| Hydrogen | 3.915 | 0.00188 | 0.000 | 0.00000 |
| N2 | 66.831 | 0.03206 | 1.635 | 0.00018 |
| H2S | 0.014 | 0.00001 | 0.116 | 0.00001 |
| CO2 | 1209.710 | 0.58039 | 8890.650 | 0.98118 |
| Methane | 785.789 | 0.37700 | 130.867 | 0.01444 |
| Ethane | 16.242 | 0.00779 | 26.700 | 0.00295 |
| Propane | 1.798 | 0.00086 | 11.170 | 0.00123 |
| Total | 2084.300 | | 9061.140 | |

Hyprotech's Process Simulator HYSIM - Licensed to Bob Stothers
Case Name SHELL610   Date 1980/1/1   Time 6:49:53

PHYSICAL PROPERTIES

VAPOUR LEAVING FROM EACH STAGE

| STAGE | MOL WT | FLOW KG/HOUR | M ACMH | DENSITY KG/M3 | REDUCED TEMP | PRESS |
|---|---|---|---|---|---|---|
| 1 | 32.766 | 68294. | 3.173 | 21.52612 | 0.86235 | 0.17413 |
| 2 | 32.784 | 4432. | 0.205 | 21.57129 | 0.86185 | 0.17427 |
| 3 | 32.778 | 4504. | 0.209 | 21.59811 | 0.86182 | 0.17449 |
| 4 | 32.763 | 4553. | 0.211 | 21.61886 | 0.86185 | 0.17472 |
| 5 | 32.744 | 4601. | 0.213 | 21.63665 | 0.86180 | 0.17494 |
| 6 | 32.721 | 4657. | 0.215 | 21.65238 | 0.86159 | 0.17513 |
| 7 | 32.702 | 4728. | 0.218 | 21.66941 | 0.86109 | 0.17524 |
| 8 | 32.734 | 4839. | 0.223 | 21.71471 | 0.85983 | 0.17513 |
| 9 | 33.180 | 5147. | 0.234 | 21.98564 | 0.85494 | 0.17377 |
| 10 | 36.008 | 6761. | 0.287 | 23.58070 | 0.83165 | 0.16612 |

LIQUID LEAVING FROM EACH STAGE

| STAGE | MOL WT | FLOW KG/HOUR | M3/HR | DENSITY KG/M3 | REDUCED TEMP | PRESS |
|---|---|---|---|---|---|---|
| 1 | 43.404 | 399154. | 351.733 | 1134.66520 | 0.72913 | 0.14730 |
| 2 | 43.401 | 399226. | 351.863 | 1134.45226 | 0.72924 | 0.14751 |
| 3 | 43.399 | 399275. | 351.951 | 1134.30609 | 0.72932 | 0.14771 |
| 4 | 43.397 | 399323. | 352.038 | 1134.16244 | 0.72939 | 0.14791 |
| 5 | 43.394 | 399379. | 352.139 | 1133.99545 | 0.72947 | 0.14811 |
| 6 | 43.392 | 399450. | 352.268 | 1133.78310 | 0.72958 | 0.14831 |
| 7 | 43.388 | 399561. | 352.459 | 1133.48374 | 0.72976 | 0.14851 |
| 8 | 43.387 | 399869. | 352.912 | 1132.90289 | 0.73027 | 0.14871 |
| 9 | 43.409 | 401483. | 354.986 | 1130.82985 | 0.73279 | 0.14886 |
| 10 | 43.562 | 394722. | 351.868 | 1121.63561 | 0.74557 | 0.14874 |

Hyprotech's Process Simulator HYSIM - Licensed to Bob Stothers
Case Name SHELL610   Date 1980/1/1   Time 6:51:49

TRANSPORT PROPERTIES

| STAGE NO. | VAPOUR VISCOSITY CP | VAPOUR THERMAL CONDUCTIVITY WATT/M-K | LIQUID VISCOSITY CP | LIQUID THERMAL CONDUCTIVITY WATT/M-K | SURFACE TENSION DYNE/CM |
|---|---|---|---|---|---|
| 1 | 0.01034 | 0.01892 | 0.20880 | 0.17764 | 17.6435 |
| 2 | 0.01034 | 0.01888 | 0.20868 | 0.17759 | 17.6326 |
| 3 | 0.01033 | 0.01888 | 0.20859 | 0.17756 | 17.6253 |
| 4 | 0.01033 | 0.01889 | 0.20852 | 0.17753 | 17.6184 |
| 5 | 0.01033 | 0.01890 | 0.20046 | 0.17749 | 17.6105 |
| 6 | 0.01032 | 0.01891 | 0.20034 | 0.17745 | 17.6004 |
| 7 | 0.01031 | 0.01893 | 0.20017 | 0.17737 | 17.5847 |
| 8 | 0.01031 | 0.01892 | 0.19975 | 0.17716 | 17.5449 |
| 9 | 0.01035 | 0.01876 | 0.19789 | 0.17614 | 17.3579 |
| 10 | 0.01074 | 0.01772 | 0.18914 | 0.17104 | 16.4346 |

I claim:

1. A method comprising separating a supply material into two materials of different boiling points including feeding supply material to vessel means arranged to form a mixed gas and liquid phase such that one material separates into said liquid phase in said vessel means and the other material separates into said gas phase, said liquid phase including no higher proportion of said other material than a required purity proportion and extracting said materials from said vessel means, providing said vessel means as two separate vessels, arranging said supply and said vessels such that the pressure in one of said vessels is higher than the other, transferring material from said liquid phase from said higher pressure vessel to the other vessel, said liquid phase having a proportion of said other material higher than said required purity proportion, letting said liquid phase down in pressure through valve means different from a turbo-expander as it is transferred so as to converts some of said liquid phase to said gas phase and causing cooling thereof, and transferring heat from a material being separated adjacent an upper end of said higher pressure vessel and said let down liquid phase such that the cooled let down liquid phase cools said material being separated and retains said upper end of said higher pressure vessel at a required low temperature.

2. A method according to claim 1 wherein the pressure in the higher pressure vessel is higher than that of a conventional tower for the materials and the pressure in the other vessel is lower than that of the conventional tower.

3. A method according to claim 1 wherein the liquid is let down in pressure in at least two steps and subsequent to each step cool is extracted therefrom.

4. A method according to claim 1 wherein said cooled material to be separated comprises material in gas phase withdrawn from the higher pressure vessel and wherein said cooling causes condensation of the material and the condensed liquid phase is returned to the higher pressure vessel.

5. A method according to claim 4 wherein the condensed material is returned at a top end of the vessel and is controlled in temperature to maintain said top end at a sufficiently low temperature to obtain a required purity proportion.

6. A method according to claim 1 including withdrawing material in gas phase from said other vessel, compressing said withdrawn material and introducing the compressed withdrawn material to said higher pressure vessel for further separation.

7. A method according to claim 6 wherein the compressed withdrawn material is introduced into said higher pressure vessel at a position below a top end thereof and prior to introduction thereto is cooled to form a mixed phase.

8. Apparatus comprising means for separating a supply material into two materials of different boiling points including vessel means having means for contacting gas and liquid phases within said vessel, means for exchanging said gas and liquid phases, means for introducing a supply material into said vessel means and means for extracting liquid phase from said vessel means wherein said vessel means comprises a first and a second separate vessels, means for maintaining pressure within said first vessel higher than a pressure within said second vessel, means for communicating liquid phase from said first of said vessels to the second vessel, let down valve means in said communicating means different from a turbo-expander for letting down the pressure of said liquid phase to cool said liquid phase, heat exchange means arranged to exchange heat from a material being separated adjacent an upper end of said first vessel to said reduced pressure material so as to cool said material being separated to form a condensate.

* * * * *